US011065850B2

(12) United States Patent
Sunagawa et al.

(10) Patent No.: US 11,065,850 B2
(45) Date of Patent: Jul. 20, 2021

(54) LAMINATE

(71) Applicant: OJI HOLDINGS CORPORATION, Tokyo (JP)

(72) Inventors: Hirokazu Sunagawa, Tokyo (JP); Hayato Fushimi, Chiba (JP); Go Banzashi, Chiba (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 73 days.

(21) Appl. No.: 15/760,898

(22) PCT Filed: Sep. 14, 2016

(86) PCT No.: PCT/JP2016/077088
§ 371 (c)(1),
(2) Date: Mar. 16, 2018

(87) PCT Pub. No.: WO2017/047632
PCT Pub. Date: Mar. 23, 2017

(65) Prior Publication Data
US 2018/0264788 A1    Sep. 20, 2018

(30) Foreign Application Priority Data

Sep. 18, 2015 (JP) .............................. JP2015-185305
Nov. 16, 2015 (JP) .............................. JP2015-223845
Jan. 20, 2016 (JP) .............................. JP2016-008854
Feb. 29, 2016 (JP) .............................. JP2016-038360

(51) Int. Cl.
| | |
|---|---|
| *B32B 27/10* | (2006.01) |
| *B32B 27/02* | (2006.01) |
| *B32B 5/02* | (2006.01) |
| *B32B 7/12* | (2006.01) |
| *B32B 27/08* | (2006.01) |
| *B32B 27/12* | (2006.01) |
| *D21H 27/30* | (2006.01) |
| *C09J 133/14* | (2006.01) |
| *C09J 175/14* | (2006.01) |
| *D21H 19/82* | (2006.01) |
| *B32B 27/30* | (2006.01) |
| *B32B 27/36* | (2006.01) |
| *B32B 27/38* | (2006.01) |

(52) U.S. Cl.
CPC ............... *B32B 27/10* (2013.01); *B32B 5/02* (2013.01); *B32B 7/12* (2013.01); *B32B 27/02* (2013.01); *B32B 27/08* (2013.01); *B32B 27/308* (2013.01); *B32B 27/365* (2013.01); *B32B 27/38* (2013.01); *C09J 133/14* (2013.01); *D21H 19/824* (2013.01); *D21H 27/30* (2013.01); *B32B 2255/12* (2013.01); *B32B 2255/26* (2013.01)

(58) Field of Classification Search
None
See application file for complete search history.

(56) References Cited

U.S. PATENT DOCUMENTS

| | | | | |
|---|---|---|---|---|
| 7,390,760 | B1* | 6/2008 | Chen | A61F 13/514 442/340 |
| 9,404,016 | B2 | 8/2016 | Oomori et al. | |
| 2002/0088581 | A1* | 7/2002 | Graef | D21H 11/20 162/158 |
| 2012/0125547 | A1* | 5/2012 | Akai | B82Y 30/00 162/9 |
| 2013/0260143 | A1* | 10/2013 | Oomori | C09D 101/286 428/336 |
| 2016/0115249 | A1* | 4/2016 | Noguchi | C08B 5/00 536/62 |
| 2017/0043565 | A1 | 2/2017 | Fushimi et al. | |

FOREIGN PATENT DOCUMENTS

| | | |
|---|---|---|
| CN | 103052499 A | 4/2013 |
| EP | 2 644 371 A1 | 10/2013 |
| EP | 3 135 488 A1 | 3/2017 |
| JP | 2006-316253 A | 11/2006 |
| JP | 2008-24778 A | 2/2008 |
| JP | 2008-106152 A | 5/2008 |
| JP | 2010-023275 A | 2/2010 |
| JP | 2012-167202 A | 9/2012 |
| JP | 2012-252038 A | 12/2012 |
| JP | 2014-065837 A | 4/2014 |
| JP | 2014-079938 A | 5/2014 |
| JP | 2015-146243 A | 8/2015 |
| JP | 2015-146244 A | 8/2015 |
| KR | 10-2013-0040732 A | 4/2013 |
| KR | 10-2013-0140627 A | 12/2013 |
| WO | 2012/070441 A1 | 5/2012 |
| WO | 2015/163281 A1 | 10/2015 |

OTHER PUBLICATIONS

Extended European Search Report dated Feb. 28, 2019 issued by the European Patent Office in counterpart European application No. 16846503.7.
Office Action dated Oct. 30, 2018 from the Japanese Patent Office in counterpart JP Application No. 2015-223845.
International Search Report and Written Opinion dated Dec. 13, 2016, issued by the International Searching Authority in application No. PCT/JP2016/077088.
International Preliminary Report on Patentability dated Mar. 29, 2018, issued by the International Searching Authority in application No. PCT/JP2016/077088.
Communication dated Sep. 3, 2019, issued by the Korean Intellectual Property Office in corresponding application No. 10-2018-7010239.

(Continued)

*Primary Examiner* — Sheeba Ahmed
(74) *Attorney, Agent, or Firm* — Sughrue Mion, PLLC

(57) ABSTRACT

It is an object of the present invention to provide a laminate excellent in interlayer adhesion properties. The present invention relates to a laminate comprising: a fiber layer formed of cellulose fibers having a fiber width of 1000 nm or less; a resin layer; and an adhesive layer provided between the fiber layer and the resin layer.

16 Claims, 8 Drawing Sheets

(56) References Cited

OTHER PUBLICATIONS

Office Action dated Jul. 11, 2019, from the State Intellectual Property Office of the P.R.C. in Chinese Application No. 201680054470.3.
Office Action dated May 6, 2020, from the China National Intellectual Property Administration in Chinese application No. 201680054470.3.
Office Action dated Feb. 3, 2020, issued by the Intellectual Property Office of Taiwan in Taiwanese application No. 105129984.
Office Action dated Jul. 21, 2020, issued by the Korean Intellectual Property Office in Korean Application No. 10-2018-7010239.

* cited by examiner

[Figure 1]
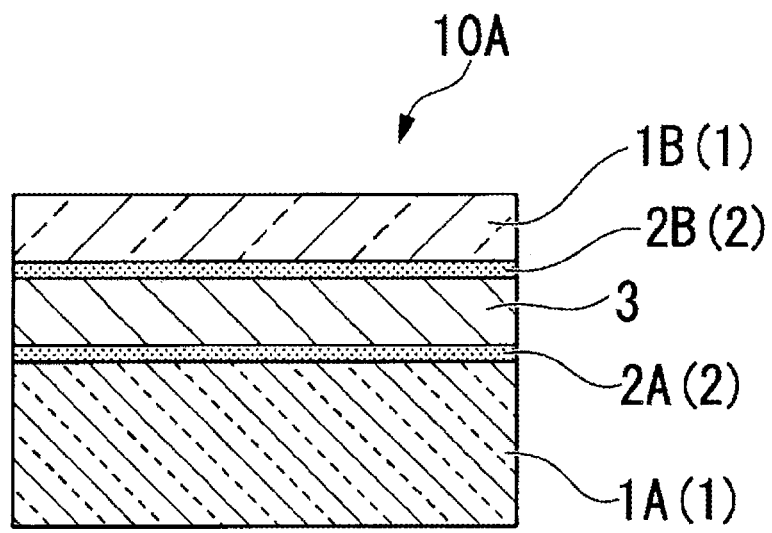
[Figure 2]
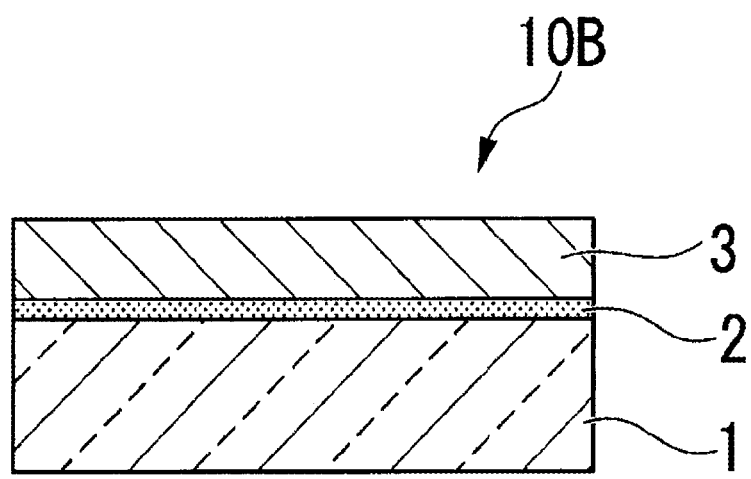

[Figure 3]
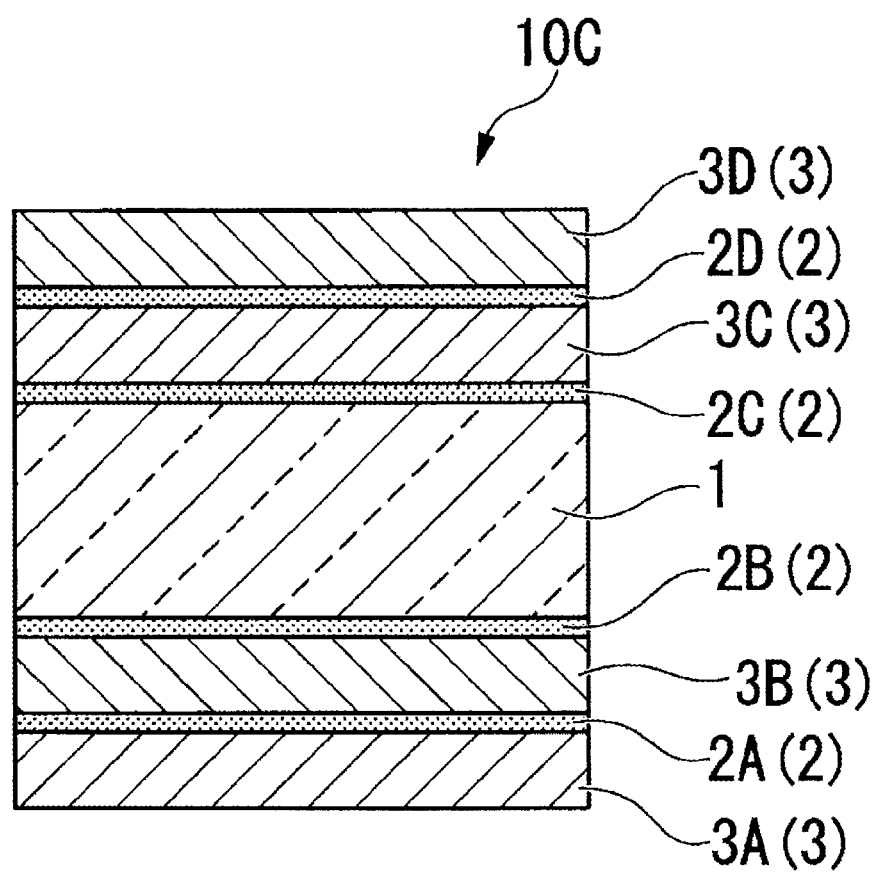

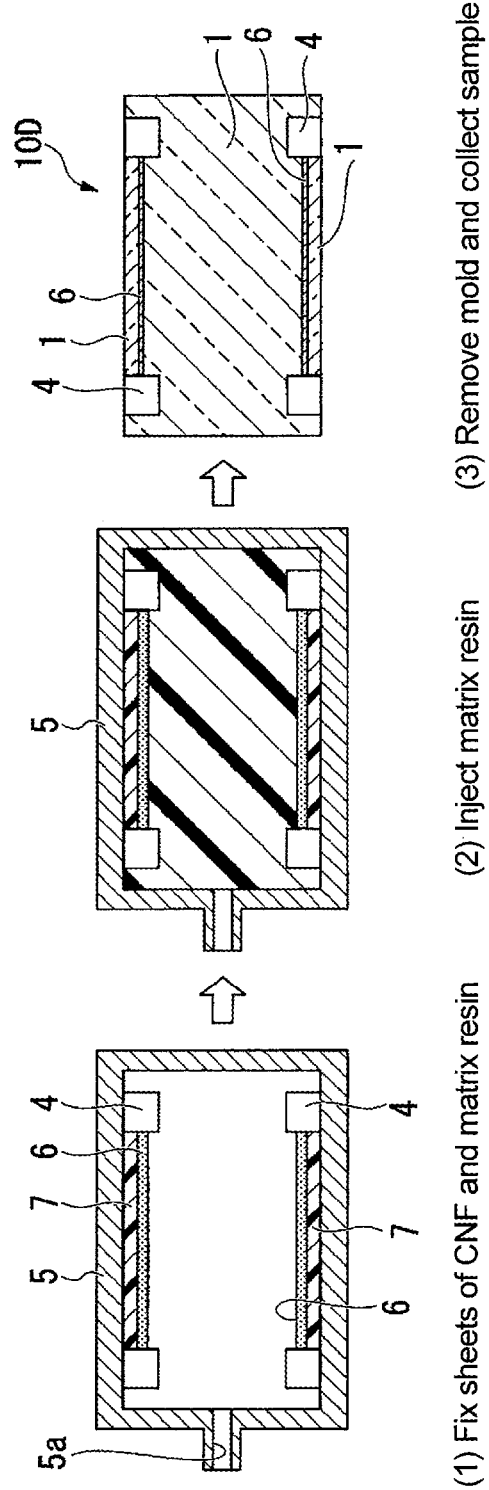

[Figure 5]
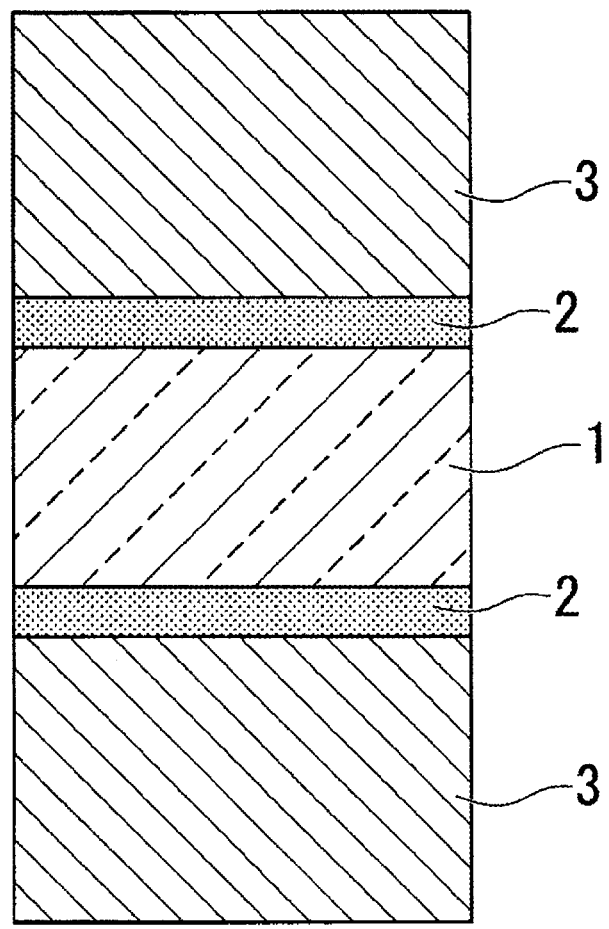

[Figure 6]
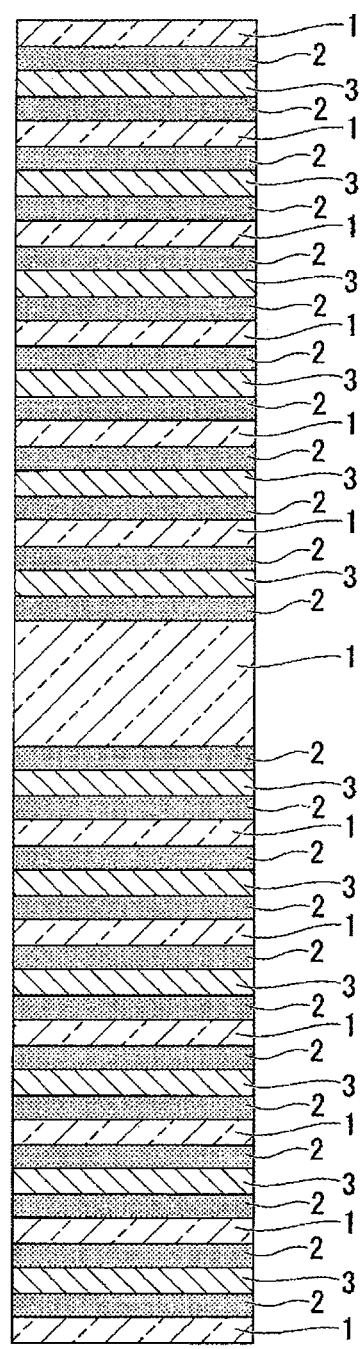

[Figure 7]
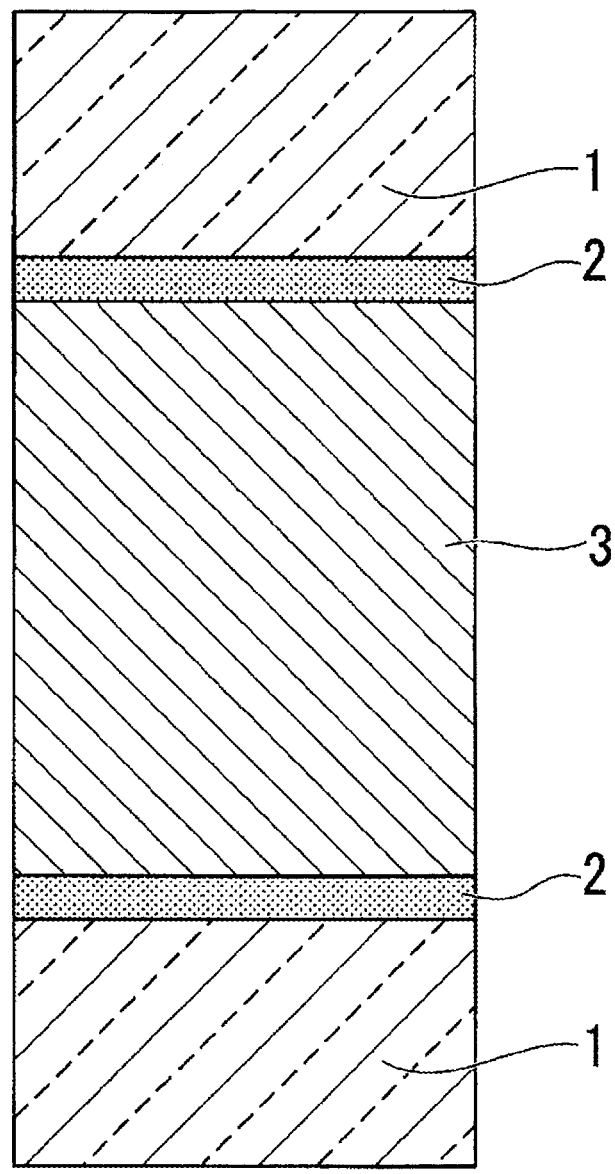

[Figure 8]
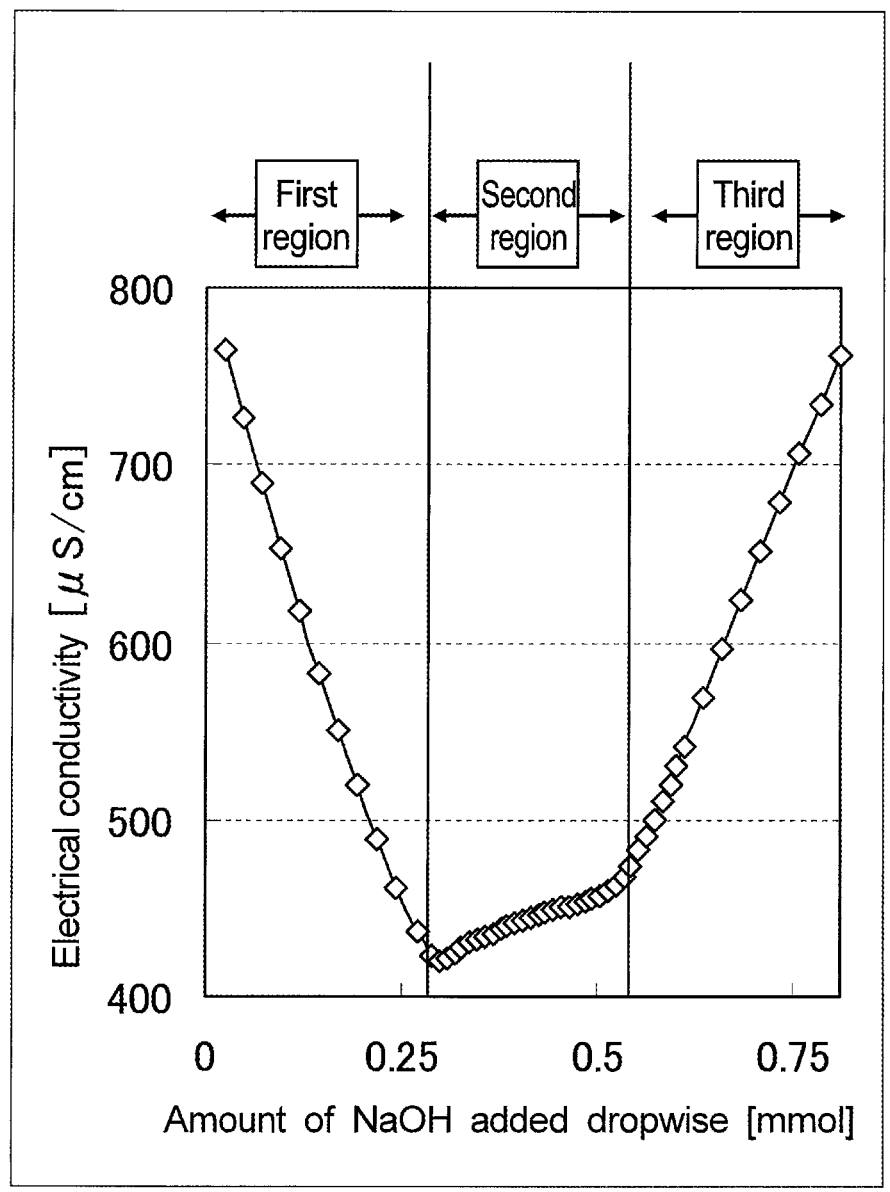

[Figure 9]
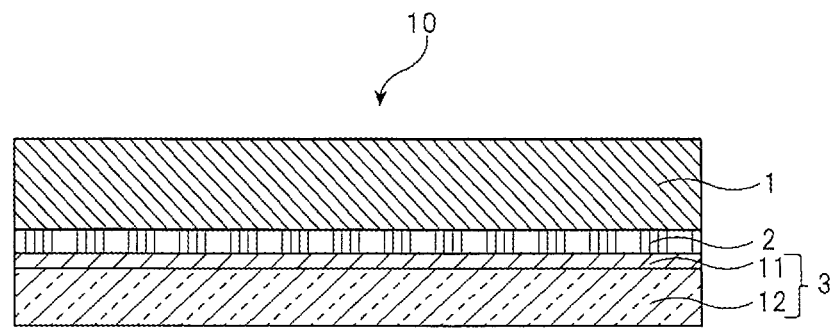
[Figure 10]
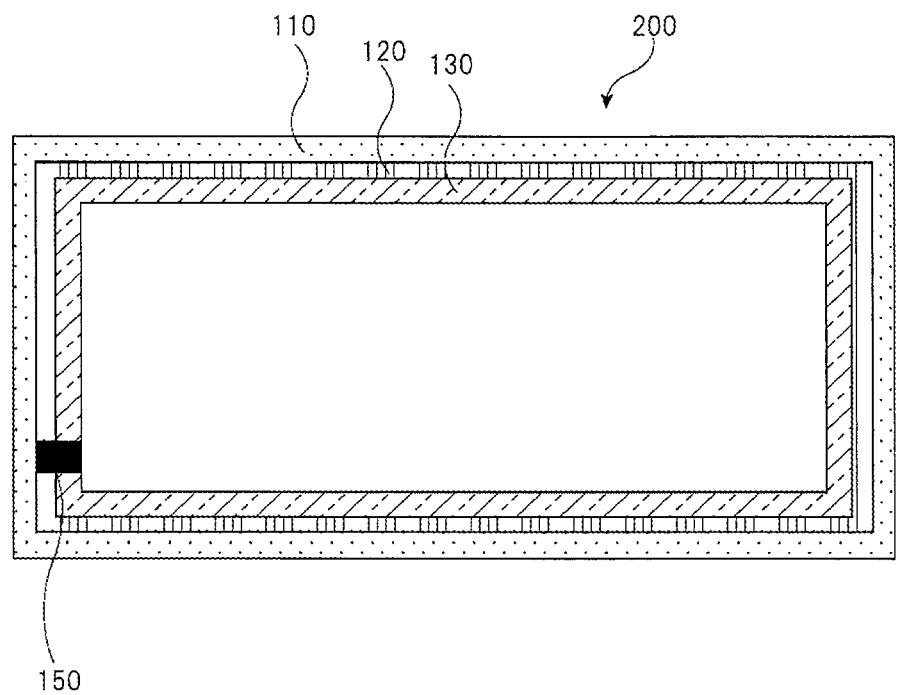

LAMINATE

CROSS REFERENCE TO RELATED APPLICATIONS

This application is a National Stage of International Application No. PCT/JP2016/077088 filed Sep. 14, 2016, claiming priority based on Japanese Patent Application No. 2015-185305 filed Sep. 18, 2015, Japanese Patent Application No. 2015-223845 filed Nov. 16, 2015, Japanese Patent Application No. 2016-008854 filed Jan. 20, 2016 and Japanese Patent Application No. 2016-038360 filed Feb. 29, 2016, all of which are incorporated herein by reference.

TECHNICAL FIELD

The present invention relates to laminate containing ultrafine cellulose fibers.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far. As for the cellulose fibers, ultrafine cellulose fibers, which have a fiber diameter of 1 μm or less, are also known.

When glass substrates are replaced with resin substrates, which are advantageous in weight reduction, reinforcing the resin substrate with fibers has heretofore been performed. In particular, ultrafine cellulose fibers have been gathering attention since they can reinforce the resin substrate while ensuring transparency. By way of example, in order to reinforce polycarbonate to obtain a resin substrate with a high elastic modulus and a low linear expansion coefficient, it is known to form a composite by impregnating polycarbonate or the like into a nonwoven fabric composed of ultrafine cellulose fibers (cellulose nonwoven fabric) and integrating the resin and cellulose fibers. However, it is difficult to control the impregnation state of the resin into the cellulose nonwoven fabric and the production yield rate is low. Therefore, it has been proposed to heat-fuse a polycarbonate sheet onto a cellulose nonwoven fabric to form a laminate (Patent Document 1). In Patent Document 1, it has also been proposed to heat-fuse a polycarbonate sheet with a cellulose nonwoven fabric impregnated in advance with a priming liquid, such as an acrylic primer, to form a laminate.

In addition, as for the composite, by way of example, a sheet obtained by dispersing ultrafine cellulose fibers into a resin composition including acrylic monomers, etc. and curing it (for example, Patent Documents 2 and 3), or a sheet obtained by impregnating a resin composition including acrylic monomers, etc. into a porous sheet containing ultrafine cellulose fibers (for example, Patent Documents 4 and 5) are known. Furthermore, as for the composite, those described in Patent Documents 6 to 9, for example, are also known.

PRIOR ART DOCUMENTS

Patent Documents

Patent Document 1: JP-A-2010-023275
Patent Document 2: JP-A-2012-167202
Patent Document 3: JP-A-2012-252038
Patent Document 4: JP-A-2006-316253
Patent Document 5: JP-A-2008-106152
Patent Document 6: JP-A-2014-065837
Patent Document 7: JP-A-2014-079938
Patent Document 8: International Publication WO 2012/070441
Patent Document 9: International Publication WO 2015/163281

SUMMARY OF INVENTION

Object to be Solved by the Invention

However, in laminates obtained through the prior art, the interlayer adhesion properties are not sufficient, and thus the improvement has been desired. The present invention was made considering the above-described circumstances, and it is an object of the present invention to provide a laminate excellent in interlayer adhesion properties.

Means for Solving the Object

Specifically, the present invention is configured as follows:

[1] A laminate comprising:
a fiber layer formed of cellulose fibers having a fiber width of 1000 nm or less;
a resin layer; and
an adhesive layer provided between the fiber layer and the resin layer.

[2] The laminate according to [1], wherein the adhesive layer comprises a functional group (A), which forms a covalent bond with a (meth)acryloyl group, and further comprises at least one selected from a functional group (B), which forms a covalent bond with a hydroxy group, and a hydrolyzed group of the functional group (B); and wherein the resin layer comprises a polymer of acrylic monomers.

[3] The laminate according to [2], wherein the functional group (A) is at least two selected from a (meth)acryloyl group and a group represented by $H_2C=CR^2-CH(-OH)-$, wherein $R^2$ represents a hydrogen atom or a methyl group.

[4] The laminate according to [2] or [3], wherein the functional group (B) is at least one selected from an isocyanate group, a carbodiimide group, an epoxy group, an alkoxysilyl group, a silanol group and an oxazoline group.

[5] The laminate according to any one of [2] to [4], wherein the adhesive layer comprises a polymer having the functional group (A) and a compound having the functional group (B).

[6] The laminate according to any one of [2] to [5], wherein the adhesive layer further comprises a polymerization initiator.

[7] The laminate according to any one of [2] to [6], wherein the resin layer further comprises a polymerization initiator.

[8] The laminate according to any one of [2] to [7], produced by applying a composition comprising a resin having the functional group (A) and a hydroxy group, as well as a compound having at least two functional groups (B) onto at least one surface of the fiber layer, to form the adhesive layer, and applying a resin composition comprising acrylic monomers onto the adhesive layer to form the resin layer.

[9] The laminate according to [1], wherein the adhesive layer comprises a urethane (meth)acrylate resin.
[10] The laminate according to [9], wherein the resin layer comprises at least one selected from a polycarbonate resin and an acrylic resin.
[11] The laminate according to [9] or [10], wherein the resin layer has a first layer arranged on a side of the adhesive layer and a second layer arranged on one side of the first layer, which is on the opposite side of the adhesive layer; and
wherein the first layer comprises an acrylic resin and the second layer comprises a polycarbonate resin.
[12] The laminate according to [11], wherein the first layer comprises an alkyl (meth)acrylate resin.
[13] The laminate according to [11], wherein the first layer comprises an epoxy (meth)acrylate resin.
[14] The laminate according to any one of [11] to [13], wherein the resin layer is a coextruded film having the first layer and the second layer.
[15] The laminate according to any one of [9] to [14], wherein the urethane (meth)acrylate resin comprised in the adhesive layer comprises urethane units and acrylic units, and when the content of the urethane units (% by mass) is defined as P and the content of the acrylic units (% by mass) is defined as Q, P/Q is 0.1 or more and 0.9 or less.
[16] The laminate according to [1], wherein the adhesive layer comprises one or two or more selected from (meth)acrylic acid ester polymers, α-olefin copolymers, ethylene-acetate vinyl copolymers, polyvinyl alcohol, polyurethane, styrene-butadiene copolymers, polyvinyl chloride, epoxy resins, melamine resins, silicone resins, caseins, natural rubbers, and starches.
[17] The laminate according to any one of [1] to [16], wherein the density of the fiber layer is 1.0 g/cm$^3$ or more.
[18] The laminate according to any one of [1] to [17], wherein the amount of the adhesive layer applied and dried is 0.5 g/m$^2$ or more and 5.0 g/m$^2$ or less.
[19] The laminate according to any one of [1] to [18], wherein a hydrophilic, oxygen-containing organic compound (except cellulose fibers) is contained in the fiber layer.
[20] The laminate according to [19], wherein the total mass of the cellulose fibers and the oxygen-containing organic compound is 90% by mass or more based on the overall mass of the fiber layer.
[21] The laminate according to any one of [1] to [20], wherein the ratio of the total thickness of the resin layer to the total thickness of the fiber layer (the total thickness of the resin layer/the total thickness of the fiber layer) is 10 or more. [22] The laminate according to any one of [1] to [21], wherein the thickness of one fiber layer is 10 μm or more.
[23] The laminate according to any one of [1] to [22], wherein two or more fiber layers are comprised, and the total thickness of fiber layers is 20 μm or more.
[24] The laminate according to any one of [1] to [23], wherein the total light transmittance of one fiber layer is 70% or more.
[25] The laminate according to any one of [1] to [24], wherein the haze of one fiber layer is 20% or less.
[26] The laminate according to any one of [1] to [25], wherein the thickness is 0.5 mm or more.
[27] The laminate according to any one of [1] to [26], wherein the total light transmittance is 60% or more.
[28] The laminate according to any one of [1] to [27], wherein the haze is 30% or less.
[29] The laminate according to any one of [1] to [28], wherein, when a thickness from one surface of the laminate to the center is defined as T, the percentage of the thickness of the fiber layer present in a region from the one surface to a thickness of T×0.2 is 30% or more and 100% or less based on the overall region.
[30] The laminate according to any one of [1] to [29], wherein a plurality of fiber layers are laminated on a side of at least one surface of the resin layer, and these fiber layers are bonded to each other only via the adhesive layer or directly.
[31] The laminate according to any one of [1] to [30], wherein the tensile elastic modulus is 5 GPa or more.
[32] The laminate according to any one of [1] to [31], wherein the adhesive layer is an applied adhesive layer, and the resin layer is an applied resin layer.
[33] The laminate according to any one of [1] to [32], wherein, when a cross cut test in accordance with JIS K 5400 is conducted after placing the laminate in a condition at a temperature of 85° C. and a relative humidity of 85% for 240 hours, the peeled number in 100 grids of the fiber layer is 10 or less.

The present invention may be an invention pertaining to the following production methods.
[34] A production method for laminate, having:
obtaining a fiber layer comprising ultrafine cellulose fibers having a fiber width of 1000 nm or less;
applying a composition comprising a functional group (A), which forms a covalent bond with a (meth)acryloyl group, and a functional group (B), which forms a covalent bond with a hydroxy group, onto at least one surface of the fiber layer, to form an adhesive layer; and applying a resin composition comprising acrylic monomers to form a resin layer.
[35] The production method for laminate according to [34], wherein the functional group (A) is at least one selected from a (meth)acryloyl group and a group represented by $H_2C=CR^2—CH(—OH)—$, wherein $R^2$ represents a hydrogen atom or a methyl group.
[36] The production method for laminate according to [34] or [35], wherein the functional group (B) is at least one selected from an isocyanate group, a carbodiimide group, an epoxy group, an alkoxysilyl group, a silanol group and an oxazoline group.
[37] The production method for laminate according to any one of [34] to [36], wherein the composition comprising the functional group (A) and the functional group (B) comprises:
a resin having the functional group (A) and a hydroxy group: and
a compound having at least two functional groups (B).
[38] The production method for laminate according to any one of [34] to [37], wherein the composition comprising the functional group (A) and the functional group (B) further comprises a polymerization initiator.
[39] The production method for laminate according to any one of [34] to [38], wherein the resin composition further comprises a polymerization initiator.
[40] A production method for laminate, having:
obtaining a fiber layer comprising cellulose fibers having a fiber width of 1000 nm or less;
applying a resin composition comprising urethane (meth)acrylate onto at least one surface of the fiber layer to form an adhesive layer; and
laminating a resin layer onto one surface of the adhesive layer, which is on the opposite side of the fiber layer.

[41] The production method for laminate according to [40], wherein the resin layer has a first layer arranged on a side of the adhesive layer and a second layer arranged on one side of the first layer, which is on the opposite side of the adhesive layer;

wherein the first layer comprises an epoxy (meth)acrylate resin and the second layer comprises a polycarbonate resin; and wherein the resin layer is formed by applying an epoxy (meth)acrylate-containing composition onto the second layer.

[42] The production method for laminate according to [40], wherein the resin layer has a first layer arranged on a side of the adhesive layer and a second layer arranged on one side of the first layer, which is on the opposite side of the adhesive layer;

wherein the first layer comprises an alkyl (meth)acrylate resin and the second layer comprises a polycarbonate resin; and wherein the resin layer is formed by coextruding the first layer and the second layer.

Advantageous Effects of Invention

According to the present invention, laminate which is excellent in interlayer adhesion properties can be obtained.

BRIEF DESCRIPTION OF DRAWINGS

FIG. 1 is a cross-sectional view of a laminate 10A, which is an example of the present invention.

FIG. 2 is a cross-sectional view of a laminate 10B, which is an example of the present invention.

FIG. 3 is a cross-sectional view of a laminate 10C, which is an example of the present invention.

FIG. 4 is a cross-sectional view exemplifying a production method for laminate, which is an example of the present invention.

FIG. 5 is a cross-sectional view of a laminate made in Example 5 according to the present invention.

FIG. 6 is a cross-sectional view of a laminate made in Example 6 according to the present invention.

FIG. 7 is a cross-sectional view of a laminate made in Example 7 according to the present invention.

FIG. 8 is a graph showing the relationship between the amount of NaOH added dropwise to a fiber raw material and electrical conductivity.

FIG. 9 is a cross-sectional view of a laminate 10, which is an example of the present invention.

FIG. 10 is a schematic view illustrating the structure of a glass cell for molding a resin layer in embodiments.

EMBODIMENT OF CARRYING OUT THE INVENTION

Hereinafter, the present invention will be described in detail. The description for components described below will be based on representative embodiments or specific examples; however, the present invention will not be limited to such embodiments. It is to be noted that a numerical range represented herein by using "to" is meant to be a range including the numerical values before and after "to" as the lower limit value and the upper limit value. In addition, as used herein, "(meth)acrylate" is meant to include both "acrylate" and "methacrylate."

(Laminate)

A laminate of the present invention comprises: a fiber layer formed of cellulose fibers having a fiber width of 1000 nm or less; a resin layer; and an adhesive layer provided between the fiber layer and the resin layer.

The number of the fiber layer and resin layer, which constitute the laminate, is not limited to one layer, and may be two or more layers. When two or more fiber layers are comprised, an adhesive layer may be provided between one fiber layer and another fiber layer. The adhesive layer bonding fiber layers to each other may be the same as or different from the adhesive layer bonding the resin layer and the fiber layer. Fiber layers may be directly in contact with and bonded to each other, but from the viewpoint of improving the adhesive forth between fiber layers, fiber layers are preferably bonded to each other via the adhesive layer. It is to be noted that a method of directly bonding fiber layers to each other includes, for example, an approach of multiplying.

When two or more resin layers are comprised, the adhesive layer is provided between at least one resin layer and at least one fiber layer.

A plurality of fiber layers may be laminated on a side of at least one surface of the resin layer, which constitutes the laminate of the present invention. These fiber layers may be bonded to each other only via the adhesive layer or directly.

Since a plurality of fiber layers are laminated as described above, at least one of the bending elastic modulus and linear expansion coefficient of the laminate can be improved.

Moreover, another resin layer may be sandwiched between a plurality of fiber layers. In this case, an adhesive layer is preferably intercalated between a fiber layer and the other resin layer, but it may be not.

Examples for the laminated structure of the laminate of the present invention include FIGS. 1 to 3 and FIGS. 5 to 7.

A laminate 10A in FIG. 1 has a laminated structure, in which a first resin layer 1A (1), a first adhesive layer 2A (2), a fiber layer 3, a second adhesive layer 2B (2), and a second resin layer 1B (1) are laminated successively.

A laminate 10B in FIG. 2 has a laminated structure, in which a resin layer 1, an adhesive layer 2, and a fiber layer 3 are laminated successively.

A laminate 10C in FIG. 3 has a laminated structure, in which a first fiber layer 3A (3), a first adhesive layer 2A (2), a second fiber layer 3B (3), a second adhesive layer 2B (2), a resin layer 1, a third adhesive layer 2C (2), a third fiber layer 3C (3), a fourth adhesive layer 2D (2), and a fourth fiber layer 3D (3) are laminated successively.

When two or more fiber layers are comprised, these fiber layers are preferably laminated evenly on each of one side (the surface side) and the other side (the back surface side) of the resin layer. Examples include a structure, in which one to three, or even four to ten fiber layers are laminated on the surface side of a resin layer, and fiber layers with an equivalent thickness to the total thickness of the fiber layers on the surface side are laminated on the back surface side of the resin layer, as shown in FIGS. 3 and 6.

When the total thickness of the fiber layers comprised on the surface side of the resin layer is equivalent to the total thickness of the fiber layers comprised on the back surface side, the balance of mechanical strength between the surface side and the back surface side of the laminate are adjusted evenly. As a result, the mechanical strength of the laminate can be improved in a well-balanced manner. Furthermore, retroflexion upon production of the laminate, or accompanied with deterioration due to usage or aging can be prevented from occurring.

In the above-described structure, when the total thickness of the fiber layers comprised on the surface side of the resin layer is equivalent to the total thickness of the fiber layers comprised on the back surface side, the balance is adjusted as described above, whether the laminated number of fiber layers laminated on the surface side and the back surface side of the resin layer are the same or different, and the effects described above can be obtained. However, considering the fact that adhesive layers are intercalated between fiber layers, in order to adjust the balance more precisely, the laminated numbers of fiber layers on the surface side and the back surface side of the resin layer are preferably the same.

The resin layers are preferably laminated on each of the surface side and the back surface side of one fiber layer, which constitute the laminate of the present invention, via an adhesive layer. Such a laminated structure can keep the fiber layer from absorbing moisture or being subject to contamination from outside. In addition, at least one of the topmost surface and the bottommost surface constituting the outermost layer for the laminate of the present invention is preferably a resin layer. By making the outermost layer a resin layer, the water resistance, chemical resistance, weather resistance, etc. of the laminate are ensured more reliably.

In the laminate of the present invention, when a thickness from its surface to the back surface is defined as 2T and a thickness from any one of the surface and the back surface to the center (the middle from one surface to the other) is defined as T, the percentage of the thickness of the fiber layer present in a region from the one surface to a thickness of $T \times 0.2$ is, relative to the thickness of the overall region (100%), preferably 30% or more and 100% or less, more preferably 50% or more and 100% or less, and further preferably 70% or more and 100% or less.

Within the above-described range, the bending elastic modulus of the laminate in accordance with the present invention may be further increased and the linear expansion coefficient may be further lowered.

In this context, the reason that the region from the one surface to the thickness of 0.2T is focused on is that when the percentage of fiber layers near the surface (near the surface layer) of the laminate is high, at least one of the bending elastic modulus and linear expansion coefficient of the laminate can be improved.

The surface and the back surface are preferably generally parallel. When they are not generally parallel, on one surface, three arbitrary points that are not along one straight line are decided, and the average value of results from the percentage at each of these three points is calculated. If this average value is within the above-described range, at least a laminate comprising the plane defined by the three points has excellent physical properties similar to those described above.

In the fiber layer, adhesive layer and resin layer, which constitute the laminate of the present invention, the relative relationship of thickness for layers adjacent to each other is preferably the resin layer>the fiber layer≥the adhesive layer. When they satisfy this relationship, the fiber layer reinforces the resin layer, and the mechanical properties owned by the resin layer may be further improved by the fiber layer.

The thickness ratio between the fiber layer and the resin layer bonded to the fiber layer via the adhesive layer (the thickness of the resin layer/the thickness of the fiber layer) is preferably 1.5 or more, more preferably 10 or more, further preferably 20 or more, and particularly preferably 30 or more. By making the ratio of the thickness of the resin layer/the thickness of the fiber layer within the above-described range, the mechanical strength of the laminate is further improved. The upper limit value of the above-described thickness ratio is not particularly limited and appropriately set depending on use. For example, it may be 50 to 100 or more.

When the laminate comprises a plurality of at least one of the fiber layers and the resin layers, the ratio of the total thickness of resin layers to the total thickness of fiber layers (the total thickness of resin layers/the total thickness of fiber layers) is preferably 1.5 or more, more preferably 10 or more, further preferably 20 or more, and particularly preferably 30 or more. By making the ratio of the total thickness of resin layers/the total thickness of fiber layers within the above-described range, the mechanical strength of the laminate is further improved. The upper limit value of the above-described thickness ratio is not particularly limited and appropriately set depending on use. For example, it may be 50 to 100 or more. It is to be noted that when the laminate comprises only one fiber layer, the total thickness of the fiber layer comprised in the laminate equals to the thickness of the only one fiber layer.

The thickness of the laminate is not particularly limited, and for example, it is preferably 50 μm or more, more preferably 100 μm or more, further preferably 200 μm or more, preferably 0.5 mm or more, more preferably 1 mm or more, and further preferably 2 mm or more. In addition, the thickness of the laminate is preferably 20 mm or less. By making the thickness of the laminate not less than the above-described lower limit value, it becomes easy to apply the laminate of the present invention to the use for which glass has been conventionally applied.

The total light transmittance of the laminate is not particularly limited, and for example, it is preferably 60% or more, more preferably 65% or more, and further preferably 70% or more. Moreover, the total light transmittance of the laminate may be 85% or more, 87% or more, or 90% or more. By making the total light transmittance of the laminate within the above-described range, it becomes easy to apply the laminate of the present invention to the use for which transparent glass has been conventionally applied. In this context, the total light transmittance of the laminate is a value measured with a haze meter (manufactured by MURAKAMI COLOR RESEARCH LABORATORY CO., Ltd., HM-150) in accordance with JIS K 7361.

The haze of the laminate is not particularly limited, and for example, it is preferably 20% or less, more preferably 15% or less, and further preferably 10% or less. In addition, the haze of the laminate may be 5% or less. The lower the haze is, the easier it becomes to apply the laminate of the present invention to the use for which transparent glass has been conventionally applied. In this context, the haze is a value measured using a haze meter (manufactured by MURAKAMI COLOR RESEARCH LABORATORY CO., Ltd., HM-150) in accordance with JIS K 7136.

(First Aspect)

The first aspect relates to a laminate having a fiber layer, an adhesive layer and a resin layer in this order. In the laminate, the fiber layer comprises ultrafine cellulose fibers having a fiber width of 1000 nm or less. The adhesive layer comprises a functional group (A), which forms a covalent bond with a (meth)acryloyl group, and further comprises at least one selected from a functional group (B), which forms a covalent bond with a hydroxy group, and a hydrolyzed group of the functional group (B). Then, the resin layer comprises a polymer of acrylic monomers. In the first aspect, the laminate having a high transparency and a sufficient strength, which is capable of exhibiting excellent interlayer adhesion properties even under harsh environments, may be obtained.

The laminate according to the first aspect has a fiber layer comprising ultrafine cellulose fibers, an adhesive layer comprising particular functional groups, and a resin layer comprising a polymer of acrylic monomers; therefore, the laminate is excellent in transparency and strength. Furthermore, the laminate according to the first aspect has a good durability. In this context, a good durability refers to the laminate being excellent in interlayer adhesion properties and capable of exhibiting good adhesion properties even under severe conditions, such as a high temperature and high humidity condition. It is believed that this is achieved because functional groups (B) comprised in a composition forming the adhesive layer covalently bond to hydroxy groups of ultrafine cellulose fibers comprised in the fiber layer; functional groups (A) comprised in the composition forming the adhesive layer form covalent bonds with acryloyl groups comprised in the resin layer; and furthermore, hydroxy groups and functional groups (B) comprised in the composition forming the adhesive layer form covalent bonds. That is, it is believed that in the adhesive layer, a series of crosslinked structures that link the fiber layer and the resin layer are formed, and interlayer adhesion of the laminate is strengthened.

The laminate according to the first aspect may be a laminate with three layers containing at least one layer each of the fiber layer, adhesive layer and resin layer, but may be a laminate with four layers or more having two or more layers of any of them. For example, as shown in FIG. 1, the laminate according to the first aspect may be a laminate 10 with a combination of an adhesive layer 2 and a resin layer 1 on each of both surfaces of a fiber layer 3, or may be a laminate having a structure of five layers. The laminate according to the first aspect may also be a laminate with a combination of an adhesive layer and a fiber layer on each of both surfaces of a resin layer.

When the laminate has a structure illustrated in FIG. 1, resin layers may serve as a layer coating surfaces of the fiber layer. On the other hand, when the laminate has a structure illustrated in FIG. 5, fiber layers may have a function of reinforcing the resin layer and fiber layers can serve as a reinforcing layer. As such, each layer may exhibit a variety of functions depending on use or structure. Moreover, the thickness of each layer is preferably appropriately selected depending on use or structure.

The thickness of the resin layer is preferably 1 μm or more, more preferably 3 μm or more, and further preferably 5 μm or more. When the resin layer serves as a layer coating surfaces of the fiber layer, it may be a thin film. The thickness of the resin layer is also preferably 10 mm or less and more preferably 5 mm or less. In a structure where the fiber layer reinforces the resin layer, the resin layer preferably has a certain amount of thickness.

The thickness of the fiber layer is preferably 1 μm or more, more preferably 3 μm or more, and further preferably 5 μm or more. The thickness of the fiber layer is preferably 1 mm or less and more preferably 100 μm or less.

The thickness of the adhesive layer is preferably 0.1 μm or more, more preferably 0.5 μm or more, and further preferably 1 μm or more. The thickness of the fiber layer is preferably 100 μm or less and more preferably 50 μm or less. By making the thickness of the adhesive layer within the above-described range, the interlayer adhesion properties in the laminate can be enhanced more effectively.

The laminate mentioned above has excellent adhesion properties between each layer, and the fiber layer is strongly bonded to the resin layer via the adhesive layer. Specifically, in a cross cut test on the laminate in accordance with JIS K 5400, the peeled number in 100 grids of the fiber layer is preferably 10 or less, more preferably 5 or less, and further preferably 3 or less.

A method for evaluating adhesion properties in accordance with JIS K 5400 is specifically as follows: First, 100 cross cuts of 1 mm$^2$ are made on a surface of the laminate on the side of the fiber layer. A cellophane tape (manufactured by NICHIBAN CO., LTD.) is attached thereon and pressed with load of 1.5 kg/cm$^2$. Then the tape is peeled in the 90° direction, and the number of peeled grids (1 min square grids) is counted. The number of these grids is defined as a peeled number in 100 grids.

The laminate according to the first aspect may also be characterized in that the adhesion properties between each layer do not decline even under severe conditions, such as a high temperature and high humidity condition. Even when the laminate is placed under a high temperature and high humidity condition for an extended period of time, the fiber layer is strongly bonded to the resin layer via the adhesive layer. Specifically, when a cross cut test in accordance with JIS K 5400 is conducted after placing the laminate in a condition at a temperature of 85° C. and a relative humidity of 85% for 240 hours, the peeled number in 100 grids of the fiber layer is preferably 20 or less, more preferably 10 or less, further preferably 5 or less, and particularly preferably 3 or less.

The tensile elastic modulus of the laminate according to the first aspect is preferably 5 GPa or more, more preferably 7 GPa or more, and further preferably 9 GPa or more. The tensile elastic modulus of the laminate is a value measured in accordance with JIS P 8113, and is a tensile elastic modulus at a temperature of 23° C. and a relative humidity of 50%. As a tensile testing machine, Tensile Tester CODE SE-064 (manufactured by Lorentzen & Wettre Ltd.) may be used.

The total light transmittance of the laminate according to the first aspect is preferably 85% or more, more preferably 87% or more, and further preferably 90% or more. The total light transmittance of the laminate is a value measured with a haze meter (manufactured by MURAKAMI COLOR RESEARCH LABORATORY CO., Ltd., HM-150) in accordance with JIS K 7361.

The haze value of the laminate according to the first aspect is preferably 20% or less, more preferably 15% or less, and further preferably 10% or less. The haze value of the laminate is a value measured using a haze meter (manufactured by MURAKAMI COLOR RESEARCH LABORATORY CO., Ltd., HM-150) in accordance with JIS K 7136.

The laminate according to the first aspect is preferably produced by applying a composition comprising a resin having the functional group (A) and a hydroxy group, as well as a compound having at least two functional groups (B) onto at least one surface of a fiber layer comprising ultrafine cellulose fibers having a fiber width of 1000 nm or less, to form an adhesive layer, and applying a resin composition comprising acrylic monomers onto the adhesive layer to form the resin layer. That is, in the laminate according to the first aspect, preferably, the adhesive layer is an applied adhesive layer and the resin layer is an applied resin layer. In this context, the applied adhesive layer is meant to be a layer obtained by applying a composition as mentioned above and then curing it. In addition, the applied resin layer is meant to be a layer obtained by applying a resin composition comprising acrylic monomers and then curing it.

In the first aspect, by forming the adhesive layer and the resin layer according to the above-described method, a series of crosslinked structures that link the fiber layer and the resin layer are formed in the adhesive layer. Accordingly, it becomes possible to enhance the interlayer adhesion properties in the laminate more effectively.

(Second Aspect)

The second aspect relates to a laminate having a fiber layer comprising ultrafine cellulose fibers having a fiber width of 1000 nm or less, an adhesive layer comprising a urethane (meth)acrylate resin and a resin layer in this order. The laminate according to the second aspect has the above-described structure; therefore, it is excellent in adhesion properties between the fiber layer comprising cellulose fibers having a fiber width of 1000 nm or less and the resin layer. Moreover, the laminate of the present invention may exhibit excellent adhesion properties even upon imparting bending stress.

The laminate of the present invention may have at least one layer each of the fiber layer 2, adhesive layer 4 and resin layer 6, but may have two or more layers of the fiber layer 2, two or more layers of the adhesive layer 4, or two or more layers of the resin layer 6. For example, FIG. 1 illustrates a laminate 10 having two layers each of the resin layer 1 and adhesive layer 2. As shown in FIG. 1, two layers of the resin layer 1 may be provided on both surfaces of the fiber layer 3. In this case, preferably, the adhesive layer 2 is provided on each of both surfaces of the fiber layer 2 and the resin layer 1 is laminated via the adhesive layer 2. It is to be noted that in the structure as in FIG. 1, the fiber layer 3 may be a fiber layer having a multilayer structure.

The overall thickness of the laminate of the present invention is not particularly limited, but preferably 50 µm or more, more preferably 100 µm or more, and further preferably 200 µm or more. In addition, the overall thickness of the laminate is preferably 20 mm or less. The thickness of the laminate is preferably appropriately adjusted depending on use.

The thickness of the fiber layer of the laminate is preferably 5 µm or more, more preferably 10 µm or more, and further preferably 20 µm or more. The thickness of the fiber layer is also preferably 500 µm or less, more preferably 200 µm or less, and further preferably 100 µm or less. In this context, the thickness of the fiber layer, which constitutes the laminate, is a value measured by cutting out a cross section of the laminate with the ultramicrotome UC-7 (manufactured by JEOL Ltd.) and observing the cross section with an electron microscope or a magnifying glass, or visually. When the laminate comprises a plurality of fiber layers, the total thickness of these fiber layers are preferably within the above-described range.

The thickness of the adhesive layer of the laminate is preferably 0.1 µm or more, more preferably 1 µm or more, and further preferably 2 µm or more. The thickness of the adhesive layer is also preferably 50 µm or less, more preferably 20 µm or less, and further preferably 10 µm or less. In this context, the thickness of the adhesive layer, which constitutes the laminate, is a value measured by cutting out a cross section of the laminate with the ultramicrotome UC-7 (manufactured by JEOL Ltd.) and observing the cross section with an electron microscope or a magnifying glass, or visually. When the laminate comprises a plurality of adhesive layers, the total thickness of these adhesive layers are preferably within the above-described range.

In addition, the thickness of the resin layer of the laminate is preferably 10 µm or more, more preferably 20 µm or more, further preferably 50 µm or more, even further preferably 100 µm or more, and particularly preferably 200 µm or more. The thickness of the resin layer is also preferably 15000 µm or less, more preferably 5000 µm or less, and further preferably 500 µm or less. In this context, the thickness of the resin layer, which constitutes the laminate, is a value measured by cutting out a cross section of the laminate with the ultramicrotome UC-7 (manufactured by JEOL Ltd.) and observing the cross section with an electron microscope or a magnifying glass, or visually. When the laminate comprises a plurality of resin layers, the total thickness of these resin layers is preferably within the above-described range.

In the laminate of the present invention, the thickness of the resin layer is preferably 30% or more and more preferably 100% or more of the thickness of the fiber layer. In addition, when the laminate has a plurality of at least one of the fiber layers and the resin layers, the ratio of the total thickness of resin layers to the total thickness of fiber layers (the total thickness of resin layers/the total thickness of fiber layers) is preferably 0.5 or more. By making the ratio of the total thickness of resin layers to the total thickness of fiber layers within the above-described range, the mechanical strength of the laminate can be enhanced.

The total light transmittance of the laminate is, for example, preferably 60% or more, more preferably 65% or more, further preferably 70% or more, and particularly preferably 85% or more. By making the total light transmittance of the laminate in the above-described range, it becomes easy to apply the laminate of the present invention to the use for which transparent glass has been conventionally applied. In this context, the total light transmittance is a value measured using a haze meter (manufactured by MURAKAMI COLOR RESEARCH LABORATORY CO., Ltd., HM-150) in accordance with JIS K 7361.

The haze of the laminate is preferably 20% or less, more preferably 15% or less, further preferably 10% or less, and particularly preferably 5% or less. The lower the haze is, the easier it becomes to apply the laminate of the present invention to the use for which transparent glass has been conventionally applied. In this context, the haze is a value measured using a haze meter (manufactured by MURAKAMI COLOR RESEARCH LABORATORY CO., Ltd., HM-150) in accordance with JIS K 7136.

The tensile elastic modulus of the laminate at a temperature of 23° C. and a relative humidity of 50% is preferably 2.5 GPa or more, more preferably 5.0 GPa or more, and further preferably 10 GPa or more. The tensile elastic modulus of the laminate at a temperature of 23° C. and a relative humidity of 50% is also preferably 30 GPa or less, more preferably 25 GPa or less, and further preferably 20 GPa or less. The tensile elastic modulus of the laminate is a value measured in accordance with JIS P 8113.

Hereinafter, each layer, which constitutes the laminate of the present invention, will be described specifically.

(Fiber Layer)

A fiber layer is a layer formed of cellulose fibers having a fiber width of 1000 nm or less. The fiber layer is a dense layer in which cellulose fibers are physically intertwined with each other and chemically crosslinked. Moreover, since the fiber width of cellulose fibers is 1000 nm or less, the fiber layer may be a transparent layer that transmits visual light readily.

The content of ultrafine cellulose fibers comprised in the fiber layer is preferably 50% by mass or more, preferably 60% by mass or more, more preferably 70% by mass or more, and further preferably 80% by mass or more based on the overall mass of the fiber layer. The content of ultrafine cellulose fibers comprised in the fiber layer is also preferably 100% by mass or less, more preferably 95% by mass or less, and further preferably 90% by mass or less based on the overall mass of the fiber layer.

It is to be noted that the content of each fiber layer in the laminate may be the same as or different from each other. By making the content not less than the lower limit value of the above-described range, a physical intertwinement of cellulose fibers with each other and a chemical crosslinking are sufficiently formed so that the strength of the fiber layer may be sufficiently enhanced. By making the content not more than the upper limit value of the above-described range, it is possible to retain an optional component between cellulose fibers while maintaining the strength of the fiber layer.

The thickness of one fiber layer is, for example, preferably 1 μm or more, more preferably 3 μm or more, further preferably 5 μm or more, even further preferably 10 μm or more, particularly preferably 20 μm or more, and the most preferably 30 μm or more. The thickness of one fiber layer is preferably 1 mm or less, more preferably 500 μm or less, further preferably 300 μm or less, even further preferably 200 μm or less, and particularly preferably 100 μm or less. When the thickness of one fiber layer is not less than the above-described lower limit value, reinforcing effects on the strength of the laminate by the fiber layer are enhanced. In addition, when the thickness of one fiber layer is not more than the above-described upper limit value, it becomes easy to form a fiber layer with a uniform thickness upon production and to reduce the occurrence of partial unevenness in the strength of the laminate. In this context, the thickness of one fiber layer, which constitutes the laminate, is a value measured by cutting out a cross section of the laminate with the ultramicrotome UC-7 (manufactured by JEOL Ltd.) and observing the cross section with an electron microscope.

When the laminate comprises two or more fiber layers, the thickness of each fiber layer is, each independently, preferably 10 μm or more, more preferably 20 μm or more, and further preferably 30 μm or more. The thickness of each fiber layer may be the same as or different from each other. By making the thickness of each fiber layer not less than 10 μm, reinforcing effects on the resin layer by each fiber layer may be obtained reliably.

When the laminate comprises two or more fiber layers, the total thickness of fiber layers is preferably 20 μm or more, more preferably 50 μm or more, and further preferably 100 μm or more. By making the total thickness not less than 20 μm, reinforcing effects on the resin layer by the entire fiber layer may be even further enhanced.

The density of each fiber layer in the laminate is, each independently, preferably 1.0 g/cm$^3$ or more, more preferably 1.2 g/cm$^3$ or more, and further preferably 1.4 g/cm$^3$ or more. The density of each fiber layer is also, each independently, preferably 2.0 g/cm$^3$ or less, more preferably 1.7 g/cm$^3$ or less, further preferably 1.65 g/cm$^3$ or less, and even further preferably 1.6 g/cm$^3$ or less. The density of each fiber layer in the laminate may be the same as or different from each other. When the density of the fiber layer is not less than the above-described lower limit value, reinforcing effects on the strength of the laminate by the fiber layer are even further enhanced. When the density of the fiber layer is not more than the above-described upper limit value, adhesion properties between the fiber layer and the adhesive layer are improved. The density of the fiber layer correlates with the surface smoothness of the fiber layer, and the surface of the fiber layer tends to become smoother as the density rises. It is believed that when the density of the fiber layer is not more than the above-described upper limit value, an appropriate roughness is left on the surface of the fiber layer and it becomes easier for the adhesive layer to anchor to the surface, thereby enhancing the adhesion properties.

In this context, the density of one fiber layer, which constitutes the laminate, is a value calculated from the basis weight and thickness of one fiber layer, which constitutes the laminate, in accordance with the JIS standard P 8118:2014. The basis weight of one fiber layer can be calculated in accordance with the JIS standard P 8124:2011 by cutting the laminate with the ultramicrotome UC-7 (manufactured by JEOL Ltd.) such that only the fiber layer is left. It is to be noted that the density of each fiber layer is a density including optional components other than cellulose fibers.

In the present invention, the fiber layer may also be characterized by being a nonporous layer. In this context, a nonporous fiber layer means that the density of the entire fiber layer is 1.0 g/cm$^3$ or more. When the density of the entire fiber layer is 1.0 g/cm$^3$ or more, it means that the porosity included in the fiber layer is suppressed not more than a predetermined value, distinguishing the fiber layer from porous sheets or layers.

Moreover, the nonporous fiber layer may be characterized in that the porosity is 15% by volume or less. In this context, the porosity of the fiber layer is simply obtained through Equation (a) below:

$$\text{Equation } (a): \text{Porosity (\% by volume)} = \{1 - B/(M \times A \times t)\} \times 100$$

wherein, A is the area of the fiber layer (cm$^2$), t is the thickness of the fiber layer (cm), B is the mass of the fiber layer (g), and M is the density of cellulose.

Each fiber layer in the laminate may, each independently, comprises optional components other than cellulose fibers. Optional components are preferably substances capable of improving the strength, density, chemical resistance and the like of the fiber layer, and examples thereof include hydrophilic, oxygen-containing organic compounds (except the above-described cellulose fibers). The type and content of optional components comprised in each fiber layer in the laminate may be the same as or different from each other. In addition, the oxygen-containing organic compound is preferably nonfibrous, and such nonfibrous, oxygen-containing organic compounds do not include ultrafine cellulose fibers or thermoplastic resin fibers.

The oxygen-containing organic compound is preferably a hydrophilic, organic compound. Hydrophilic, oxygen-containing organic compounds may improve the strength, density, chemical resistance and the like of the fiber layer. Preferably, hydrophilic, oxygen-containing organic compounds have a SP value of 9.0 or more. In addition, hydrophilic, oxygen-containing organic compounds are preferably such that 1 g or more of the oxygen-containing organic compound is dissolved in 100 ml of ion exchanged water.

Examples of oxygen-containing organic compounds include: for example, hydrophilic macromolecules, such as polyethylene glycol, polyethylene oxide, casein, dextrin, starches, modified starches, polyvinyl alcohol, modified polyvinyl alcohol (such as, acetoacetylated polyvinyl alcohol), polyvinyl pyrrolidone, polyvinyl methyl ether, polyacrylates, polyacrylamide, alkyl acrylate ester copolymers, urethane-based copolymers and cellulose derivatives (such as, hydroxyethyl cellulose, carboxyethyl cellulose, carboxymethyl cellulose); and hydrophilic small molecules, such as glycerin, sorbitol and ethylene glycol. Among them, from the viewpoint of improving the strength, density, chemical resistance and the like of the fiber layer, oxygen-containing organic compounds are preferably polyethylene glycol, polyethylene oxide, glycerin and sorbitol, more preferably at least one selected from polyethylene glycol and polyethylene oxide, and further preferably polyethylene glycol.

The oxygen-containing organic compound is preferably an organic compound macromolecule having a molecular weight of 50,000 or more and 8,000,000 or less. The molecular weight of the oxygen-containing organic compound is also preferably 100,000 or more and 5,000,000 or less, but for example, it may be a small molecule having a molecular weight of less than 1000.

The content of oxygen-containing organic compounds comprised in the fiber layer is preferably 1 part by mass or more and 40 parts by mass or less, more preferably 10 parts by mass or more and 30 parts by mass or less, and more preferably 15 parts by mass or more and 25 parts by mass or less based on 100 parts by mass of ultrafine cellulose fibers comprised in the fiber layer. When the content of oxygen-containing organic compounds is not less than the above-described lower limit value, the strength, density, chemical resistance and the like of the fiber layer may be further improved. In addition, when the content of oxygen-containing organic compounds is not more than the above-described upper limit value, a physical intertwinement of cellulose fibers with each other and a chemical crosslinking structure are sufficiently maintained so that the strength of the fiber layer is sufficiently kept. That is, when the content of oxygen-containing organic compounds is within the above-described range, a balance of the content of oxygen-containing organic compounds relative to ultrafine cellulose fibers may become satisfactory, thereby further improving the strength, density, chemical resistance and the like of the fiber layer.

The total mass of ultrafine cellulose fibers and oxygen-containing organic compounds is preferably 90% by mass or more and more preferably 95 to 100% by mass based on the overall mass of a single fiber layer. By making the total mass not less than 90% by mass, the strength, density, chemical resistance and the like of the fiber layer may be further improved.

The fiber layer may include organic ions as optional components. Examples of organic ions include tetraalkylammonium ions or tetraalkylphosphonium ions. Examples of tetraalkylammonium ions include, for example, a tetramethylammonium ion, tetraethylammonium ion, tetrapropylammonium ion, tetrabutylammonium ion, tetrapentylammonium ion, tetrahexylammonium ion, tetraheptylammonium ion, tributylmethylammonium ion, lauryltrimethylammonium ion, cetyltrimethylammonium ion, stearyltrimethylammonium ion, octyldimethylethylammonium ion, lauryldimethylethylammmonium ion, didecyldimethylammonium ion, lauryldimethylbenzylammonium ion, and tributylbenzylammonium ion. Examples of tetraalkylphosphonium ions include, for example, a tetramethylphosphonium ion, tetraethylphosphonium ion, tetrapropylphosphonium ion, tetrabutylphosphonium ion, and lauryltrimethylphosphonium ion. In addition, tetrapropylonium ions and tetrabutylonium ions may include tetra-n-propylonium ions and tetra-n-butylonium ions, respectively.

The total light transmittance of one fiber layer is preferably 70% or more, more preferably 80% or more, and further preferably 90% or more. The higher the total light transmittance is, the easier it becomes to apply the laminate of the present invention to the use for which transparent glass has been conventionally applied. In this context, the total light transmittance of one fiber layer, which constitutes the laminate, is a value measured using a haze meter (manufactured by MURAKAMI COLOR RESEARCH LABORATORY CO., Ltd., "HM-150") in accordance with the JIS standard K 7361:1997 by cutting the laminate with the ultramicrotome UC-7 (manufactured by JEOL Ltd.) such that only the fiber layer is left.

The haze (haze value) of one fiber layer is preferably 2.0% or less, more preferably 1.5% or less, and further preferably 1.0% or less. The lower the haze is, the easier it becomes to apply the laminate of the present invention to the use for which transparent glass has been conventionally applied. In this context, the haze of one fiber layer, which constitutes the laminate, is a value measured using a haze meter (manufactured by MURAKAMI COLOR RESEARCH LABORATORY CO., Ltd., "HM-150") in accordance with the JIS standard K 7136:2000 by cutting the laminate with the ultramicrotome UC-7 (manufactured by JEOL Ltd.) such that only the fiber layer is left.

Cellulose fibers that constitute the fiber layer are ultrafine cellulose fibers having the average fiber width of 1000 nm or less (which, hereinafter, may also be referred to as ultrafine fibrous cellulose). When the average fiber width is 1000 nm or less, this width is significantly narrower than that of fibers comprised in normal paper pulp, exhibiting strong mechanical properties different from those of normal paper pulp. Ultrafine cellulose fibers are preferably an aggregate of cellulose molecules with a type I crystal structure (parallel strand). In this context, the average fiber width of the cellulose fibers, which constitute the fiber layer of the laminate, is an average value obtained by cutting out a cross section of the laminate with the ultramicrotome UC-7 (manufactured by JEOL Ltd.) to expose the fiber layer, observing the fiber layer with an electron microscope, and measuring the width of at least 20 cellulose fibers through image analysis processing. In this context, "width" means a shorter distance between one end and the other of the cellulose fiber.

<Ultrafine Cellulose Fibers>

Although there is no particular restriction on a cellulose fiber raw material for yielding ultrafine cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A sheet containing the ultrafine cellulose fibers having a long fiber length with a high aspect ratio tends to exhibit a high strength.

The average fiber width of the cellulose fibers is 1000 nm or less. Ultrafine cellulose fibers are for example monofibrous cellulose having a fiber width of 1000 nm or less. The average fiber width is preferably 1 nm or more, more preferably 1 nm or more, and further preferably 3 nm or more. The average fiber width is preferably 200 nm or less, more preferably 100 nm or less, further preferably 50 nm or less, even further preferably 25 nm or less, and particularly preferably 10 nm or less. When the average fiber width is 1 nm or more, dissolution as cellulose molecules into water may be suppressed, thereby expressing physical properties as ultrafine fibers (strength, rigidity and dimensional stability) readily. When the average fiber width is 200 nm or less, it is sufficiently smaller than the wavelength of visual light; therefore, refraction of visual light is unlikely to occur at an interface with the adhesive layer and the transparency improves, which is preferred.

When the average fiber width of the cellulose fibers are within the above-described range, it is not necessary for all cellulose fibers to have a fiber width within the above-described fiber width range, and some cellulose fibers may have a fiber width greater than the upper limit or less than the lower limit. That is, thicker fibers or narrower fibers may be mixed.

The measurement of the average fiber width of the cellulose fibers is carried out as follows. A slurry containing ultrafine fibers of 0.05 to 0.1% by mass in concentration is prepared, and the prepared slurry is then cast on a carbon film-coated grid which has been subjected to a hydrophilic treatment to thereby make a sample for TEM observation. In the case where the slurry contains fibers having large widths, the SEM image of the surface of the slurry cast on a glass may be observed. The sample is observed by electron microscopy imaging at a magnification of 1000, 5000, 10000 or 50000, depending on the width of fibers constituting the sample. Provided that the sample, the observation condition and the magnification are adjusted so as to meet the following conditions.

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width is an average value of the fiber widths thus read.

The average fiber length of the cellulose fibers is preferably 100 nm or more, more preferably 1 µm or more, and further preferably 10 µm or more. The average fiber length of the cellulose fibers is also preferably 2.0 mm or less, more preferably 1.0 mm or less, further preferably 800 µm or less, even further preferably 600 µm or less, and particularly preferably 500 µm or less. By making the fiber length within the above-described range, destruction of the crystalline region of the ultrafine cellulose fibers may be suppressed, and the slurry viscosity of the ultrafine cellulose fibers may also be set within an appropriate range. It is to be noted that by making the average fiber length of the cellulose fibers not less than the above-described lower limit value, it becomes easier for the cellulose fibers to be intertwined with each other, and the strength of the fiber layer is improved. By making the average fiber length of the cellulose fibers not more than the above-described upper limit value, the mechanical strength of individual cellulose fibers is enhanced, and the strength of the fiber layer is improved.

In this context, the average fiber length of the cellulose fibers, which constitute the fiber layer of the laminate, is an average value obtained by cutting out a cross section of the laminate with the ultramicrotome UC-7 (manufactured by JEOL Ltd.) to expose the fiber layer, observing the fiber layer with an electron microscope, and measuring the length of at least 20 cellulose fibers through image analysis processing. Specifically, it can be obtained by an image analysis with TEM, SEM or AFM.

The axial ratio of the cellulose fibers (long axis/short axis) is obtained as a value of the above-described average fiber length divided by the average fiber width. That is, the "long axis" means the average fiber length, and the "short axis" means the average fiber width. The axial ratio of the cellulose fibers is preferably in a range of 20 to 10,000. When the axial ratio is 20 or more, the intertwinement of the cellulose fibers, which constitute the fiber layer, with each other is enhanced, thereby improving the strength of the fiber layer. When the axial ratio is 10,000 or less, the density of the fiber layer is increased, thereby further improving the strength of the fiber layer. Moreover, the axial ratio in the range of 20 to 10,000 allows the water filtering property to be maintained high when a cellulose fiber dispersion is made into paper upon formation of the fiber layer.

Ultrafine cellulose fibers preferably have a type I crystal structure. In this regard, that ultrafine cellulose fibers have a type I crystal structure may be identified by a diffraction profile obtained from a wide angle X-ray diffraction photograph using CuKα ($\lambda$=1.5418 Å) monochromatized with graphite. Specifically, it may be identified by that there are typical peaks at two positions near 2θ=14 to 17°, and near 2θ=22 to 23°.

The percentage of the type I crystal structure occupied in the ultrafine cellulose fibers is preferably 30% or more, more preferably 50% or more, and further preferably 70% or more.

The rate of a crystal portion comprised in ultrafine cellulose fibers is not particularly limited in present invention. It is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

Chemical modification for substituting hydroxy groups in cellulose to other substituents (functional groups) may be performed on the cellulose fibers that form the fiber layer. Chemical modification is conducted via known methods. Examples of substituents introduced to cellulose via chemical modification include, for example, a phosphoric acid group, acyl groups such as an acetyl group, acryloyl group, methacryloyl group, propionyl group and propioloyl group, isocyanate groups, such as a 2-methacryloyloxyethylisocyanoyl group, alkyl groups, such as a methyl group, ethyl group, propyl group, 2-propyl group, butyl group, 2-butyl group and tert-butyl group, aryl groups, such as a benzoyl group and naphthoyl group. Among them, substituents are preferably anionic groups. The anionic group is preferably at least one selected from, for example, a phosphoric acid group or a substituent derived from a phosphoric acid group (which may simply be referred to as a phosphoric acid group), a carboxyl group or a substituent derived from a carboxyl group (which may simply be referred to as a carboxyl group), and a sulfone group or a substituent derived from a sulfone group (which may simply be referred to as a sulfone group), more preferably at least one selected from a phosphoric acid group and a carboxyl group, and particularly preferably a phosphoric acid group.

The percentage of chemically modified hydroxy groups among all hydroxy groups in cellulose (chemical modification rate) is not particularly limited, and is preferably adjusted appropriately in a range of, for example, 0.1 mmol/g to 5.0 mmol/g, and preferably adjusted appropriately in a range of 0.1 mmol/g to 3.5 mmol/g. Normally, when the rate is 0.1 mmol/g or more, it becomes easier for the effects through chemical modification (for example, effects of preventing coloring due to heating) to be obtained. When the rate is 5.0 mmol/g or less, the crystallinity of the cellulose fibers is sufficiently maintained so that the linear expansion coefficient of the fiber layer and the laminate can be further lowered. In addition, by making the percentage of chemically modified hydroxy groups in 0.1 mmol/g to 3.5 mmol/g, it becomes easier for the ultrafine cellulose fibers to be made ultrafine due to electrostatic repulsion effects.

Measurement of the introduction amount of substituents into cellulose fibers (titrimetry) is conducted according to the following method:

A fiber-containing slurry comprising approximately 0.04 g of cellulose fibers in absolute dry mass is prepared, and is diluted to approximately 50 g using ion exchanged water. While stirring this solution, change in a value of electrical conductivity is measured upon adding a 0.01 N sodium hydroxide aqueous solution dropwise. Then, the amount of 0.01 N sodium hydroxide aqueous solution added dropwise when the value of electrical conductivity becomes minimum is determined as the amount added dropwise at a titration end point.

The amount of substituents in cellulose fibers, X, is expressed by: X (mmol/g)=0.01 (mol/l)×V (ml)/W (g), wherein, V (ml) is an amount of 0.01 N sodium hydroxide aqueous solution added dropwise and W (g) is cellulose fibers comprised in the fiber-containing slurry.

It is to be noted that the chemical modification rate may also be determined via analytical methods, such as weight increase rate, elemental analysis, neutralization titrimetry other than the above, FT-IR and proton NMR The ultrafine cellulose fibers preferably have phosphoric acid groups or substituents derived from the phosphoric acid group. The phosphoric acid group is a divalent functional group corresponding to a phosphoric acid from which a hydroxyl group is removed. Specifically, it is represented by —PO$_3$H$_2$. The substituents derived from the phosphoric acid group include substituents, such as groups that phosphoric acid groups are condensation-polymerized into, salts of the phosphoric acid group and phosphoric acid ester groups, and they may be an ionic substituent or nonionic substituent.

In the present invention, the phosphoric acid group or a substituent derived from the phosphoric acid group may be a substituent represented by Formula (1) below:

[Formula 1]

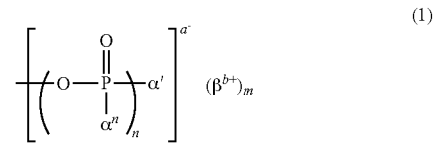

In Formula (1), a, b, m and n each independently represent an integral number (provided that a=b×m); $\alpha^n$ (n is an integral number from 1 to n) and $\alpha'$ each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof; β is a monovalent or higher valent cation consisting of organic matter or inorganic matter.

<General Chemical Treatments>

There is no particular restriction on a method of chemical treatment of a cellulose raw material, insofar as it is a method capable of obtaining ultrafine fibers. Examples of a chemical treatment include an acid treatment, an ozone treatment, TEMPO (2,2,6,6-tetramethylpiperidine-1-oxyl radical) oxidation treatment, an enzymatic treatment, and a treatment with a compound capable of forming a covalent bond with a functional group in cellulose or a fiber raw material.

As an example of an acid treatment, there is a method described in Otto van den Berg, Jeffrey R. Capadona; Christoph Weder; Biomacromolecules 2007, 8, 1353-1357. Specifically, ultrafine cellulose fibers are hydrolyzed by sulfuric acid, hydrochloric acid, or the like. In the case of a product by a high-concentration acid treatment, almost all amorphous regions are decomposed so that short fibers are produced (also called as cellulose nanocrystals), but these are also included in ultrafine cellulose fibers.

An example of the ozone treatment is the method described in JP 2010-254726 A, but the example of the ozone treatment is not particularly limited thereto. Specifically, fibers are treated with ozone and are then dispersed in water, and the thus obtained aqueous dispersion of fibers is subjected to a pulverization treatment.

As an example of TEMPO oxidation, there is a method described in Saito, T, et al., "Homogeneous suspensions of individualized microfibrils from TEMPO-catalyzed oxidation of native cellulose", Biomacromolecules, 2006, 7(6), 1687-91. Specifically, after a TEMPO oxidation treatment of fibers, the same are dispersed in water, and the obtained aqueous suspension of the fibers is subjected to a pulverization treatment.

One example of the enzyme treatment can include, but are not particularly limited to, a method described in International Publication No. WO 2013/176033 (the contents described in International Publication No. WO 2013/176033 are incorporated herein by reference in its entirety). Specifically, this method involves treating the fiber raw material with an enzyme at least under a condition where the ratio between the EG activity and the CBHI activity of the enzyme is 0.06 or more.

As an example of a treatment with a compound capable of forming a covalent bond with a functional group in cellulose or a fiber raw material, there is a method described in International Publication WO2013/073652 (PCT/JP2012/079743) in which "at least one compound selected out of an oxo acid, or a polyoxoic acid, having a phosphorus atom in the structure, and salts thereof" is used.

<Anionic Substituent Introduction>

The ultrafine cellulose fibers preferably have anionic substituents. Among others, the anionic group is preferably at least one selected from a phosphoric acid group, a carboxyl group and a sulfone group, more preferably at least one selected from a phosphoric acid group and a carboxyl group, and particularly preferably a phosphoric acid group.

<Amount of Substituents Introduced>

The amount of anionic substituents introduced is not particularly limited, but it is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of anionic substituents introduced is also preferably 3.5 mmol/g or less, more preferably 3.0 mmol/g or less, further preferably 2.5 mmol/g or less, and particularly preferably 2.0 mmol/g or less. By setting the amount of anionic substituents introduced within the above-described range, it may become easy to make the fiber raw material ultrafine, and the stability of the ultrafine cellulose fibers can be enhanced.

<Introduction of Phosphoric Acid Groups>

In the present invention, the ultrafine cellulose fibers preferably have phosphoric acid groups or substituents derived from the phosphoric acid group.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into slurry of the fiber raw material.

The phosphoric acid group introduction step may be performed by allowing at least one selected from a compound having phosphoric acid groups and salts thereof (a phosphorylating reagent or compound A) to react with the fiber raw material including cellulose. It is to be noted that this reaction may be performed in the presence of at least one selected from urea and derivatives thereof (hereinafter, referred to as "compound B").

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is at least one selected from a compound having phosphoric acid groups and salts thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferred. Sodium dihydrogenphosphate, or disodium hydrogenphosphate is more preferred.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably 7 or lower because the efficiency in introduction of a phosphoric acid group is high, and more preferably 3 to 7 from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

The amount of the compound A added to the fiber raw material is not particularly limited, but when the amount of the compound A added is converted to the amount of phosphorus atoms, the amount of phosphorus atoms added to the fiber raw material (absolute dry mass) is preferably 0.5% by mass or more and 100% by mass or less, more preferably 1% by mass or more and 50% by mass or less, and the most preferably 2% by mass or more and 30% by mass or less. When the amount of phosphorus atoms added to the fiber raw material is within the above range, the yield of ultrafine cellulose fibers may be more improved. When the amount of phosphorus atoms added to the fiber raw material exceeds 100% by mass, the effect of improving the yield levels off, and the cost of the Compound A used increases. On the other hand, by adjusting the amount of phosphorus atoms added to the fiber raw material not less than the lower limit, the yield may be increased.

Examples of the compound B used in the present embodiment include urea, thiourea, biuret, 1-phenyl urea, 1-benzyl urea, 1-methyl urea, 1-ethyl urea and the like. In addition, dimethyl urea, diethyl urea, tetramethyl urea, benzoylene urea, hydantoin and the like may also be used.

The compound B, as with the compound A, is preferably used as an aqueous solution. An aqueous solution containing both of the compound A and the compound B dissolved therein is preferably used because of the enhanced homogeneity of the reaction. The amount of the compound B added to the fiber raw material (absolute dry mass) is preferably 1% by mass or more, more preferably 10% by mass or more, further preferably 100% by mass or more, and particularly preferably 150% by mass or more. The amount of the compound B added to the fiber raw material (absolute dry mass) is also preferably 500% by mass or less, more preferably 400% by mass or less, further preferably 350% by mass or less, and particularly preferably 300% by mass or less.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferred to perform heat treatment. For the temperature of heat treatment, it is preferred to select a temperature that allows an efficient introduction of phosphoric acid groups while suppressing the thermal decomposition or hydrolysis reaction of fibers. Specifically, the temperature is preferably 50° C. or more and 300° C. or less, more preferably 100° C. or more and 250° C. or less, and further preferably 130° C. or more and 200° C. or less. The temperature of heat treatment may also be 150° C. or more and 200° C. or less. In addition, a vacuum dryer, an infrared heating device, or a microwave heating device may be used for heating.

Upon heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method may be employed of heat drying or vacuum drying the fiber raw material while kneading or stirring with the compound A using a kneader or the like.

As a heating device used for heat treatment, a device capable of always discharging moisture retained by slurry or moisture generated by an addition reaction of phosphoric acid groups with hydroxy groups of the fiber to the outside of the device system is preferred, and for example, forced convection ovens or the like are preferred. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less after moisture is substantially removed from the fiber raw material slurry. In the present invention, by setting the heating temperature and heating time within an appropriate range, the amount of phosphoric acid groups introduced can be set within a preferred range.

<Amount of Phosphoric Acid Groups Introduced>

The amount of phosphoric acid groups introduced is, per 1 g (mass) of the ultrafine cellulose fibers, preferably 0.1 mmol/g or more, more preferably 0.14 mmol/g or more, further preferably 0.2 mmol/g or more, even further preferably 0.3 mmol/g or more, still further preferably 0.4 mmol/g or more, particularly preferably 0.5 mmol/g or more, and the most preferably 0.6 mmol/g or more. The amount of phosphoric acid groups introduced is also, per 1 g (mass) of the ultrafine cellulose fibers, preferably 3.5 mmol/g or less, more preferably 3.0 mmol/g or less, further preferably 2.5 mmol/g or less, even further preferably 2.0 mmol/g or less, and particularly preferably 1.8 mmol/g or less. By setting the amount of phosphoric acid groups introduced within the above-described range, it may become easy to make the fiber raw material ultrafine, and the stability of the ultrafine cellulose fibers can be enhanced. In addition, by making the amount of phosphoric acid groups introduced within the above-described range, the slurry viscosity of the ultrafine cellulose fibers may be adjusted within an appropriate range.

An amount of phosphoric acid introduced into a fiber raw material may be measured by a conductometric titration method. Specifically, an amount introduced may be measured by performing fibrillation to ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 8 as an alkali is added. First, the electrical conductivity is rapidly reduced (hereinafter, this region is referred to as the "first region"). Then, the conductivity starts rising slightly (hereinafter, this region is referred to as the "second region"). Then, the increment of the conductivity is increased (hereinafter, this region is referred to as the "third region"). The boundary point between the second region and the third region is defined as a point at which the secondary differential value of conductivity, that is, the change in the increment (gradient) of conductivity becomes maximum. In short, three regions appear. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "amount of the phosphoric acid group introduced (or amount of the phosphoric acid group)" or "amount of the substituent introduced (or amount of the substituent)" refers to the amount of the strongly acidic group. Specifically, the amount of the alkali (mmol) required for the first region in the curve shown in FIG. 8 is divided by the solid content (g) in the slurry to be titrated to determine the amount of substituents introduced (mmol/g).

The phosphoric acid group introduction step may be performed at least once, but may be repeated multiple times as well. This case is preferred since more phosphoric acid groups are introduced.

<Introduction of Carboxyl Groups>

In the present invention, when the ultrafine cellulose fibers have carboxyl groups, they can be introduced to the fibers by oxidation treatment, such as the TEMPO oxidation treatment mentioned above, or treatment using a compound having groups derived from a carboxylic acid, derivatives, or acid anhydrides or derivatives thereof.

Although there is no particular restriction on a compound having a carboxyl group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxyl group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxyl group, examples thereof include an imide of an acid anhydride of a compound having a carboxyl group, and a derivative of an acid anhydride of a compound having a carboxyl group. Although there is no particular restriction on the imide of an acid anhydride of a compound having a carboxyl group, examples thereof include an imide of a dicarboxylic acid compound, such as maleimide, succinimide, and phthalimide.

There is no particular restriction on a derivative of an acid anhydride of a compound having a carboxyl group. Examples thereof include an acid anhydride of a compound having a carboxyl group, at least a part of the hydrogen atoms of which is substituted with a substituent (e.g. an alkyl group, and a phenyl group), such as dimethylmaleic anhydride, diethylmaleic anhydride, and diphenylmaleic anhydride.

<Amount of Carboxyl Groups Introduced>

The amount of carboxyl groups introduced is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of carboxyl groups introduced is also preferably 3.5 mmol/g or less, more preferably 3.0 mmol/g or less, further preferably 2.5 mmol/g or less, and particularly preferably 2.0 mmol/g or less. By setting the amount of carboxyl groups introduced within the above-described range, it may become easy to make the fiber raw material ultrafine, and the stability of the ultrafine cellulose fibers can be enhanced.

<Cationic Substituent Introduction>

In this embodiment, a cationic substituent may be introduced into ultrafine cellulose fibers as an ionic substituent. For example, a cationic substituent may be introduced into a fiber raw material, by adding a cationizing agent and an alkaline compound to a fiber raw material and causing a reaction. As the cationizing agent, one having a group reactive with a quaternary ammonium group and a hydroxy group of cellulose may be used. Examples of the group reactive with a hydroxyl group of cellulose include an epoxy group, a functional group having a structure of halohydrin, a vinyl group, and a halogen group. Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

The alkali compound contributes to promotion of a cationization reaction. The alkali compound may be an inorganic alkali compound, such as an alkali metal hydroxide, an alkaline earth metal hydroxide, an alkali metal carbonate, an alkaline earth metal carbonate, an alkali metal phosphate, an alkaline earth metal phosphate; or an organic alkali compound, such as ammonia, an aliphatic amine, an aromatic amine, an aliphatic ammonium, an aromatic ammonium, a heterocyclic compound and a hydroxide, a carbonate, a phosphate, etc. thereof. A measurement of an amount of a cationic substituent introduced may be carried out, for example, by an elemental analysis.

<Alkali Treatment>

In the case of producing the ultrafine cellulose fibers, alkali treatment may be performed between the substituent introduction step and a defibration treatment step mentioned later. Examples of the alkali treatment method include, but are not particularly limited to, a method of immersing the phosphoric acid group-introduced fibers in an alkali solution.

There is no particular restriction on an alkali compound contained in the alkaline solution, and it may be an inorganic alkaline compound or an organic alkali compound. The solvent of the alkaline solution may be either of water and an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is especially preferred, because of their multiplicity of uses.

The temperature of the alkali solution in the alkali treatment step is not particularly limited, but it is preferably 5° C. or more and 80° C. or less and more preferably 10° C. or more and 60° C. or less.

The immersion time in the alkali solution in the alkali treatment step is not particularly limited, but it is preferably 5 minutes or more and 30 minutes or less and more preferably 10 minutes or more and 20 minutes or less.

The amount of the alkali solution used in the alkali treatment is not particularly limited, but it is preferably 100% by mass or more and 100000% by mass or less and more preferably 1000% by mass and 10000% by mass or less, with respect to the absolute dry mass of the phosphoric acid group-introduced fibers.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The substituent-introduced fibers are subject to defibration treatment in a defibration treatment step. In the defibration treatment step, in general, using a defibration treatment device, the defibration treatment is performed on fibers, so as to obtain a slurry comprising ultrafine cellulose fibers. However, the treatment device and the treatment method are not particularly limited thereto.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and free from apprehension of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

According to the present invention, a defibration treatment may be performed after ultrafine cellulose fibers are concentrated and dried. In this case, there is no particular restriction on the method of concentration and drying, and examples thereof include a method in which a concentrating agent is added into a slurry comprising ultrafine cellulose fibers, and a method using a dehydrator, a press, a dryer, and the like used generally. Further, publicly known methods, for example as described in WO2014/024876, WO2012/107642, and WO2013/121086, may be used. Also, the concentrated ultrafine cellulose fibers may be formed into a sheet. It is also possible that the sheet may be pulverized and subjected to a defibration treatment.

As a pulverizing device used for pulverizing ultrafine cellulose fibers, a high-speed defibrator, a grinder (stone mill-type grinder), a high-pressure homogenizer, an ultrahigh pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

The material comprising ultrafine cellulose fibers with phosphoric acid groups, obtained from the method mentioned above, is a slurry comprising ultrafine cellulose fibers, and it may be diluted with water to a desired concentration. The slurry comprising ultrafine cellulose fibers is made into a sheet and a fiber layer is formed according to a method mentioned later.

(Adhesive Layer)

An adhesive layer is a layer bonding a fiber layer and a resin layer. The laminate of the present invention comprises an adhesive layer bonding a fiber layer and a resin layer; therefore, it has a superior mechanical strength, such as bending elastic modulus and linear expansion coefficient, compared to a laminate without an adhesive layer.

The amount of one adhesive layer applied and dried is preferably 0.5 g/m$^2$ or more, more preferably 1.0 g/m$^2$ or more, and further preferably 1.5 g/m$^2$ or more. The amount applied and dried may also be 100 g/m$^2$ or less, and is preferably 5.0 g/m$^2$ or less, more preferably 4.0 g/m$^2$ or less, and further preferably 3.0 g/m$^2$ or less. When the amount of one adhesive layer applied and dried is not less than the above-described lower limit value, a sufficient adhesion force between the fiber layer and the resin layer is obtained, improving the mechanical strength. When the amount of one adhesive layer applied and dried is not more than the above-described upper limit value, the total light transmittance may be increased and the haze may be suppressed low.

The thickness of one adhesive layer is, for example, preferably 0.1 μm or more, more preferably 0.5 μm or more, further preferably 1 μm or more, and particularly preferably 2 μm or more. The thickness of one adhesive layer is also preferably 100 μm or less, more preferably 50 μm or less, further preferably 30 μm or less, even further preferably 20 μm or less, particularly preferably 10 μm or less, and the most preferably 7 μm or less. When the thickness of one adhesive layer is not less than the above-described lower limit value, a sufficient adhesion force between the fiber layer and the resin layer is obtained, improving the mechanical strength. When the thickness is not more than the above-described upper limit value, the total light transmittance may be increased and the haze may be suppressed low. It is to be noted that when the laminate comprises a plurality of adhesive layers, the total thickness of these adhesive layers are preferably within the above-described range.

In this context, the thickness of the adhesive layer, which constitutes the laminate, is a value measured by cutting out a cross section of the laminate with the ultramicrotome UC-7 (manufactured by JEOL Ltd.) and observing the cross section with an electron microscope.

The adhesive layer preferably comprises, as main components, one or two or more adhesives selected from (meth)acrylic acid ester polymers, α-olefin copolymers, ethylene-acetate vinyl copolymers, polyvinyl alcohol, polyurethane, styrene-butadiene copolymers, polyvinyl chloride, epoxy resins, melamine resins, silicone resins, caseins, natural rubbers, and starches. In this context, "as main components" is meant to be 50% by mass or more based on the total mass of the adhesive layer (100% by mass).

Among them, preferred examples also include an aspect including a (meth)acrylic acid ester polymer, which is excellent in a balance between improvement of adhesion force and mechanical strength and improvement of transparency. For example, a composite of silica particles and/or a compound having silanol groups with a (meth)acrylic acid ester polymer is also a preferred aspect from the viewpoint of improving adhesion force.

In this context, the above-described (meth)acrylic acid ester polymers include polymers formed by graft polymerizing synthetic resins other than (meth)acrylic resins, such as an epoxy resin and urethane resin, and copolymers formed by copolymerizing a (meth)acrylic acid ester with another monomer. However, the mole fraction of the monomer other than the (meth)acrylic acid ester in the copolymer is 50 mole % or less. The content of graft polymerized synthetic resins other than (meth)acrylic resins is also 50% by mass or less in the (meth)acrylic acid ester polymer (100% by mass).

From the viewpoint of enhancing the adhesion force with the fiber layer, the adhesive layer more preferably comprises a compound that forms covalent bonds between hydroxy groups of the fiber layer and/or functional groups introduced to the cellulose fibers, and the main component of the adhesive layer. The type of the compound that forms covalent bonds is preferably at least any one of compounds that comprise, for example, a silanol group, an isocyanate group, a carbodiimide group, an epoxy group, or an oxazoline group. Among the above, compounds that comprise a silanol group or an isocyanate group, which are excellent in reactivity with hydroxy groups of the fiber layer and/or functional groups introduced to the cellulose fibers are more preferred.

From the viewpoint of enhancing the adhesion force with the resin layer, the main component of the adhesive layer is more preferably a compound that induces physical interactions with the resin layer. That is, the solubility parameters (SP value) of the main component of the adhesive layer and the resin layer are preferably closer. The difference in the SP values of the main component of the adhesive layer and the resin layer is preferably 10 or less, more preferably 5 or less, and further preferably 1 or less. However, from the viewpoint of enhancing the significance of providing the adhesive layer, the main component of the adhesive layer and the synthetic resin that constitutes the resin layer are preferably different from each other.

(First Aspect)

In the first aspect, the adhesive layer may comprise a functional group (A), which forms a covalent bond with a (meth)acryloyl group, and further comprises at least one selected from a functional group (B), which forms a covalent bond with a hydroxy group, and a hydrolyzed group of the functional group (B). That is, the adhesive layer may comprise the functional group (A) as well as the functional group (B) or a group derived from the functional group (B). In the present invention, by having the adhesive layer contain such multiple types of functional groups, the interlayer adhesion properties in the laminate can be enhanced.

The adhesive layer preferably comprises a compound a, which has the functional group (A), and a compound b, which has the functional group (B). However, it may comprise a compound that has at least one each of the functional group (A) and the functional group (B) in a single molecule. It is to be noted that the compound a having the functional group (A) is preferably a polymer (resin) having the functional group (A), and when both the functional group (A) and the functional group (B) are comprised in a single molecule, such a compound is preferably a polymer (resin) as well.

The functional group (A), which forms a covalent bond with a (meth)acryloyl group, is preferably at least one selected from a (meth)acryloyl group (H$_2$C=CR$^1$—C(=O)—) and a group represented by H$_2$C=CR$^2$—CH(—OH)—. It is to be noted that "a (meth)acryloyl group", as used herein, indicates an acryloyl group or a methacryloyl group. R$^1$ and R$^2$ represent a hydrogen atom or a methyl group.

In the present invention, a polymer (resin) having the functional group (A) is preferably an acrylic resin having at least one selected from a (meth)acryloyl group and a group represented by H$_2$C=CR$^2$—CH(—OH)—, more preferably an acrylic resin in which at least one selected from (meth) acryloyl groups and groups represented by H$_2$C=CR$^2$—CH(—OH)— are graft polymerized, and particularly preferably an acrylic resin in which both (meth)acryloyl groups and groups represented by H$_2$C=CR$^2$—CH(—OH)— are graft polymerized.

The functional group (B), which forms a covalent bond with a hydroxy group, is preferably at least one selected from an isocyanate group, a carbodiimide group, an epoxy group, an alkoxysilyl group, a silanol group and an oxazoline group, and more preferably an isocyanate group.

In addition, a hydrolyzed group of the functional group (B) is a group obtained by hydrolyzing the above mentioned functional groups, and is a group derived from the functional group (B).

The compound b having the functional group (B) is preferably an isocyanate compound. Examples of isocyanate compounds include, for example, tolylene diisocyanate, xylylene diisocyanate, hexamethylene diisocyanate, isophorone diisocyanate and the like. Isocyanate compounds include polyisocyanates, such as those of the biuret type, the nurate type and the adduct type, and such polyisocyanates can be used as well. Among them, from the viewpoint of suppressing coloring due to heating and deterioration with time, polyisocyanates of the nurate type are suitable. It is to be noted that in the compound b detected in the adhesive layer, at least one of isocyanate groups of the above-described isocyanate compounds may be a hydrolyzable group that has been hydrolyzed.

The functional group (A) is a group that forms covalent bonds with acryloyl groups that the polymer of acrylic monomers comprised in the resin layer has. The functional group (B) is a group that forms covalent bonds with hydroxy groups that the ultrafine cellulose fibers comprised in the fiber layer have. Furthermore, the functional group (B) is a group that covalently binds to hydroxy groups comprised in the compound that has the functional group (A). For example, the functional group (B) is a group that covalently binds to the hydroxy group in the structure below, comprised in the adhesive layer, but a group that the functional group (B) covalently binds to is not limited thereto.

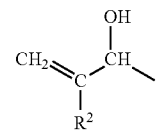

[Formula 2]

In the above-described structural formula, R$^2$ represents a hydrogen atom or a methyl group.

For example, by having an adhesive composition, which forms the adhesive layer, contain the compound a, which has at least one each of the functional group (A) and a hydroxy group, as well as the compound b, which has two or more functional groups (B) in a single molecule, the hydroxy group of the compound a first forms a covalent bond with the first functional group (B) in the compound b, and the functional group (A) of the compound a forms a covalent bond with an acryloyl group that the polymer of acrylic monomers comprised in the resin layer has. Then, the second functional group (B) in the compound b forms a covalent bond with a hydroxy group that the ultrafine cellulose fibers comprised in the fiber layer have. As such, the ultrafine cellulose fibers comprised in the fiber layer and the polymer of acrylic monomers comprised in the resin layer are linked by crosslinked structures in which respective functional groups in the compound a and the compound b covalently bind to each other. That is, the component comprised in the adhesive layer forms covalent bonds with either of the component comprised in the fiber layer or the component comprised in the resin layer. In the adhesive layer, a series of crosslinked structures above-described are comprised;

therefore, it is believed that the adhesion properties between each layer in the laminate improves.

The adhesive layer is preferably an applied adhesive layer, which is formed by coating, and the compound a, which has at least one each of the functional group (A) and a hydroxy group, as well as the compound b, which has two or more functional groups (B) in a single molecule, is preferably comprised in the composition (coating liquid) that forms the adhesive layer. The compound a more preferably has at least one each of a (meth)acryloyl group and a group represented by $H_2C=CR^2—CH(—OH)—$. It is to be noted that when two or more groups represented by $H_2C=CR^2—CH(—OH)—$ are comprised as the functional group (A) comprised in the compound a, the first group represented by $H_2C=CR^2—CH(—OH)—$ is counted as the functional group (A), and the second group represented by $H_2C=CR^2—CH(—OH)—$ is counted as the number of the hydroxy group.

Upon formation of the adhesive layer, a step of applying and then curing such a composition is comprised, and in this curing step, each functional group forms a covalent bond. In the adhesive layer after being cured, residual functional groups (A) and functional groups (B) that were not subject to the covalent bond will be detected. It is to be noted that there are some cases where the functional group (B) comprised in the adhesive layer is easy to be hydrolyzed, and thus, a hydrolyzed group of the functional group (B) may be detected instead of the functional group (B) from the adhesive layer. Inclusion of each functional group may also be confirmed by detecting a structure in which each functional group forms a covalent bond.

It is to be noted that the functional group (B) is a group that forms covalent bonds with hydroxy groups that the ultrafine cellulose fibers comprised in the fiber layer have, but it may form covalent bonds with other substituents that the ultrafine cellulose fibers have. For example, the functional group (B) may form a covalent bond with $—O—Na^+$ of a phosphoric acid group, which is an ionic substituent that the ultrafine cellulose fibers have.

Examples of detecting devices for the functional group (A), the functional group (B) and the hydrolyzed group of the functional group (B) include, for example, a nuclear magnetic resonance analyzing device, an infrared spectroscopic analyzing device, an X-ray photoelectron analyzing device, a Raman spectroscopic device, and the like. Upon detection of the functional group (A), the functional group (B) and the hydrolyzed group of the functional group (B) comprised in the adhesive layer, analysis may be performed on a cross section of the adhesive layer, or on a polished surface after the laminate has been polished via physical polishing to expose the adhesive layer.

The adhesive layer preferably comprises a resin, and more preferably comprises a polymer (resin) having the functional group (A). That is, the adhesive layer is preferably a layer obtained by polymerization curing a curable composition that comprises curable monomer components, which constitute such a resin, via known curing methods. Examples of curing methods include, for example, heat curing, radiation curing or the like, and heat curing is preferred. It is to be noted that examples of radiation include infrared radiation, visible radiation, ultraviolet radiation, electron beam or the like, but a light that is an electromagnetic wave with a wavelength of 1 nm or more and 1000 nm or less is preferred. An electromagnetic wave with a wavelength of 200 nm or more and 450 nm or less is more preferred, and ultraviolet radiation with a wavelength of 300 nm or more and 400 nm or less is further preferred.

The curable composition that forms the adhesive layer preferably comprises a polymerization initiator. As such, at least a part of the polymerization initiator will remain in the adhesive layer as well; therefore, the adhesive layer preferably comprises the polymerization initiator. Since the curable composition contains the polymerization initiator, the hardness of the adhesive layer may be adjusted.

To the curable composition, a thermal polymerization initiator that generates radicals or acids through heating is preferably added. To the curable composition, a photopolymerization initiator that generates radicals or acids via radiation, such as ultraviolet radiation, is also preferably added. It is to be noted that both a thermal polymerization initiator and a photopolymerization initiator may be added to the curable composition to employ a method of performing polymerization through a combination of heat and light.

Examples of thermal polymerization initiators include, for example, hydroperoxides, dialkyl peroxides, peroxy esters, diacyl peroxides, peroxycarbonates, peroxy ketals, ketone peroxides or the like. Specifically, benzoyl peroxide, diisopropyl peroxycarbonate, tert-butyl peroxy (2-ethylhexanoate), dicumyl peroxide, di-test-butyl peroxide, tert-butyl peroxy benzoate, tert-butyl hydroperoxide, diisopropylbenzene hydroperoxide, 1,1,3,3-tetramethylbutyl hydroperoxide or the like may be used. These polymerization initiators may be used singly or in combination of two or more kinds thereof.

If thermal polymerization initiates upon light irradiation, it gets difficult to control the polymerization; therefore, the one minute half life temperature of the thermal polymerization initiator is preferably 120° C. or more and 300° C. or less.

The amount of the thermal polymerization initiator added is preferably 0.1% by mass or more and 2% by mass or less and more preferably 0.3% by mass or more and 1% by mass or less, with respect to the overall mass of the curable monomer components.

Examples of photopolymerization initiators include photo-radical generators or photo cationic polymerization initiators. Photopolymerization initiators may be used singly or in combination of two or more kinds thereof.

Examples of photo-radical generators include, for example, benzophenone, benzoin methyl ether, benzoin propyl ether, diethoxyacetophenone, 1-hydroxycyclohexyl phenyl ketone, 2,6-dimethylbenzoyl diphenyl phosphine oxide, 2,4,6-trimethylbenzoyl diphenyl phosphine oxide or the like. Among them, benzophenone or 2,4,6-trimethylbenzoyl diphenyl phosphine oxide is preferred.

Photo cationic polymerization initiators are a compound that initiates cationic polymerization via irradiation of radiation, such as ultraviolet radiation or electron beam, and include, for example, aromatic sulfonium salts, aromatic iodonium salts, aromatic diazonium salts, aromatic ammonium salts and the like.

Examples of aromatic sulfonium slats include bis[4-(diphenylsulfonio)phenyl]sulfide bis hexafluorophosphate, bis[4-(diphenylsulfonio)phenyl]sulfide bis hexafluoroantimonate, bis[4-(diphenylsulfonio)phenyl]sulfide bis hexafluoroborate, bis[4-(diphenylsulfonio)phenyl]sulfide tetrakis(pentafluorophenyl)borate, diphenyl-4-(phenylthio) phenyl sulfonium hexafluoro, diphenyl-4-(phenylthio)phenyl sulfonium hexafluoroantimonate, diphenyl-4-(phenylthio)phenyl sulfonium tetrafluoroborate, diphenyl-4-(phenylthio)phenyl sulfonium tetrakis(pentafluorophenyl) borate, triphenyl sulfonium hexafluorophosphate, triphenyl sulfonium hexafluoroantimonate, triphenyl sulfonium tetrafluoroborate, triphenyl sulfonium tetrakis(pentafluorophenyl)borate, bis[4-(di(4-(2-hydroxyethoxy))phenylsulfonio)phenyl]sulfide bis hexafluorophosphate, bis [4-(di(4-(2-hydroxyethoxy))phenylsulfonio)phenyl] sulfide bis hexafluoroantimonate, bis [4-(di(4-(2-hydroxyethoxy))phenylsulfonio)phenyl] sulfide tetrafluoroborate, bis [4-(di(4-(2-hydroxyethoxy))phenylsulfonio)phenyl] sulfide tetrakis (pentafluorophenyl)borate or the like.

Examples of aromatic iodonium salts include diphenyl iodonium hexafluorophosphate, diphenyl iodonium hexafluoroantimonate, diphenyl iodonium tetrafluoroborate, diphenyl iodonium tetrakis(pentafluorophenyl)borate, bis (dodecylphenyl)iodonium hexafluoroantimonate, bis(dodecylphenyl)iodonium tetrakis(pentafluorophenyl)borate, 4-methylphenyl-4-(1-methylethyl)phenyl iodonium hexafluorophosphate, 4-methylphenyl-4-(1-methylethyl) phenyl iodonium hexafluoroantimonate, 4-methylphenyl-4-(1-methylethyl)phenyl iodonium hexafluoroborate, 4-methylphenyl-4-(1-methylethyl)phenyl iodonium tetrakis (pentafluorophenyl)borate or the like.

Examples of aromatic diazonium salts include phenyl diazonium hexafluorophosphate, phenyl diazonium hexafluoroantimonate, diphenyl iodonium tetrafluoroborate, diphenyl iodonium tetrakis(pentafluorophenyl)borate or the like.

Examples of aromatic ammonium salts include 1-benzyl-2-cyano pyridinium hexafluorophosphate, 1-benzyl-2-cyano pyridinium hexafluoroantimonate, 1-benzyl-2-cyano pyridinium tetrafluoroborate, 1-benzyl-2-cyano pyridinium tetrakis(pentafluorophenyl)borate, 1-(naphthylmethyl)-2-cyano pyridinium hexafluorophosphate, 1-(naphthylmethyl)-2-cyano pyridinium hexafluoroantimonate, 1-(naphthylmethyl)-2-cyano pyridinium tetrafluoroborate, 1-(naphthylmethyl)-2-cyano pyridinium tetrakis (pentafluorophenyl)borate or the like. Examples of (2,4-cyclopentadiene-1-yl)[(1-methylethyebenzene]-iron salts include (2,4-cyclopentadiene-1-yl)[(1-methylethyebenzene]-iron(II) hexafluorophosphate, (2,4-cyclopentadiene-1-yl)[(1-methylethyl)benzene]-iron(II) hexafluoroantimonate, (2,4-cyclopentadiene-1-yl)[(1-methylethyl)benzene]-iron (II) tetrafluoroborate, (2,4-cyclopentadiene-1-yl)[(1-methylethyl)benzene]-iron(II) tetrakis(pentafluorophenyl)borate or the like.

Examples of commercial products of these photo cationic polymerization initiators include, for example, UVI6990, UVI6979 manufactured by Union Carbide Corporation, SP-150, SP-170 or SP-172 manufactured by ADEKA CORPORATION, IRGACURE 261 or IRGACURE 250 manufactured by Ciba-Geigy Ltd., RHODORSIL PI2074, JMF-2456 manufactured by Rhodia, or SAN-AID SI-60L, SI-80L, SI-100L, SI-110L, SI-180L or SI-100L manufactured by SANSHIN CHEMICAL INDUSTRY CO., LTD.

Furthermore, other than photo cationic polymerization initiators, curing agents for curing cationically polymerizable monomers may be added. Examples of curing agents include, for example, amine compounds, compounds synthesized from amine compounds, such as polyaminoamide compounds, tertiary amine compounds, imidazole compounds, hydrazide compounds, melamine compounds, acid anhydrides, phenol compounds, thermal latent cationic polymerization catalysts or dicyanamides, and derivatives thereof.

Photo sensitizers may also be added. Specifically, examples include pyrene, perylene, acridine orange, thioxanthone, 2-chlorothioxanthone, benzoflavine and the like.

The amount of the photopolymerization initiator added is preferably 0.001% by mass or more and 5% by mass or less, more preferably 0.01% by mass or more and 2% by mass or less, and further preferably 0.05% by mass or more and 0.1% by mass or less, with respect to the overall mass of the curable monomer components.

(Second Aspect)

In the second aspect, the adhesive layer may comprise a urethane (meth)acrylate resin. The urethane (meth)acrylate resin is a (meth)acrylate resin that has urethane bonds.

The urethane (meth)acrylate resin comprises urethane units and acrylic units. In this context, the urethane unit is a unit represented by the structural formula below. It is to be noted that in the structural formula below, $R^1$ is a linking group that comprises two or more isocyanate structures or structures derived from the isocyanate structure, and $R^2$ is a linking group that comprises two or more hydroxyl groups or groups derived from the hydroxyl group.

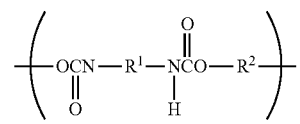

[Formula 3]

On the other hand, the acrylic unit is a unit represented by the structural formula below. It is to be noted that in the structural formula below, $R^1$ represents a hydrogen atom or a methyl group.

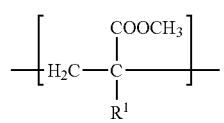

[Formula 4]

When the content of the urethane units (% by mass) in the urethane (meth)acrylate resin is defined as P and the content of the acrylic units (% by mass) is defined as Q, P/Q is preferably 0.1 or more and 0.9 or less. The ratio, P/Q is more preferably 0.8 or less and further preferably 0.7 or less. By using the urethane (meth)acrylate resin comprising the urethane units and acrylic units in the above-described ratio, the adhesion properties between the resin layer and the fiber layer can be enhanced more effectively.

In addition, when the resin layer has the first layer and the second layer, wherein the first layer comprises an alkyl (meth)acrylate resin, P/Q is preferably 0.6 or less and more preferably 0.5 or less. By using the urethane (meth)acrylate resin comprising the urethane units and acrylic units in the above-described ratio, the adhesion properties between the resin layer and the fiber layer can be enhanced more effectively.

In this context, the content of the urethane units (% by mass) may be measured by analysis with a nuclear magnetic resonance device, an infrared spectroscopic analyzing device, or a trace nitrogen analyzing device. The content of the acrylic units (% by mass) may be measured by a nuclear magnetic resonance device or an infrared spectroscopic analyzing device.

The glass transition temperature of the urethane (meth) acrylate resin comprised in the adhesive layer is preferably 50° C. or more, more preferably 60° C. or more, and further preferably 70° C. or more. The glass transition temperature of the urethane (meth)acrylate resin is also preferably 200° C. or less. By making the glass transition temperature of the urethane (meth)acrylate resin within the above-described range, the adhesion properties between the resin layer and the fiber layer can be enhanced more effectively.

(Resin Layer)

A resin layer is a layer that has a resin, such as a natural resin or synthetic resin, as a main component. In this context, the main component refers to a component comprised in 50% by mass or more based on the overall mass of the resin layer. The content of the resin is preferably 60% by mass or more, more preferably 70% by mass or more, further preferably 80% by mass or more, and particularly preferably 90% by mass or more based on the overall mass of the resin layer. It is to be noted that the content of the resin may be 100% by mass or 95% by mass or less.

Examples of natural resins may include, for example, rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly (meth)acrylate.

Examples of polycarbonates, which constitute the resin layer, include, for example, aromatic polycarbonate-based resins and aliphatic polycarbonate-based resins. These specific polycarbonate-based resins are known, and a polycarbonate-based resin described in JP Patent Publication (Kokai) No. 2010-023275 A is included, for example.

Optional components other than synthetic resins may be comprised in the resin layer. Examples of optional components include known components used in the resin film field, such as fillers, pigments, dyes and ultraviolet absorbing agents.

The thickness of one resin layer is preferably 1 μm or more, more preferably 3 μm or more, further preferably 5 μm or more, even further preferably 10 μm or more, still further preferably 20 μm or more, even still further preferably 50 μm or more, more particularly preferably 100 μm or more, and the most preferably 200 μm or more. The thickness of one resin layer may also be 500 μm or more or 1000 μm or more. It is to be noted that the upper limit of the thickness of the resin layer is not particularly limited and appropriately set depending on use. For example, the thickness may be approximately 10 mm to 50 mm. More specifically, the thickness of one resin layer is preferably 15 mm or less, more preferably 10 mm or less, and further preferably 5 mm or less. It is to be noted that 500 μm or less may be preferred depending on use. When the thickness of the resin layer is not less than the above-described lower limit value, the mechanical strength of the laminate is sufficiently stabilized. It is to be noted that when the laminate comprises a plurality of resin layers, the total thickness of these resin layers is preferably within the above-described range.

In this context, the thickness of the resin layer, which constitutes the laminate, is a value measured by cutting out a cross section of the laminate with the ultramicrotome UC-7 (manufactured by JEOL Ltd.) and observing the cross section with an electron microscope or a magnifying glass, or visually.

(First Aspect)

In the first aspect, the resin layer may comprise a polymer of acrylic monomers. The resin layer is preferably an applied resin layer, which is formed by coating, and acrylic monomers are preferably comprised in a coating liquid, which forms the resin layer (resin composition).

The resin layer is preferably an applied resin layer, which is formed by coating, and preferably a layer obtained by polymerization curing a resin composition comprising acrylic monomers via known curing methods. Examples of curing methods include, for example, heat curing, radiation curing or the like, and radiation curing is preferred.

The resin composition that forms the resin layer preferably comprises a polymerization initiator. As such, at least a part of the polymerization initiator will remain in the resin layer as well; therefore, the resin layer preferably comprises the polymerization initiator. It is to be noted that thermal polymerization initiators and photopolymerization initiators mentioned above may be exemplified as a polymerization initiator added to the resin composition.

Acrylic monomers or a prepolymer of acrylic monomers may be comprised in the coating liquid, which forms the resin layer (resin composition). The prepolymer may be comprised of one kind of acrylic monomers mentioned later or may be comprised of a combination of two or more kinds thereof. The prepolymer may also be a copolymer obtained by copolymerizing acrylic monomers mentioned later and a urethane structure or an epoxy structure.

Examples of acrylic monomers may include, for example, 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth)acrylate, caprolactone modified dicyclopentenyl di(meth)acrylate, EO modified phosphoric acid di(meth)acrylate, allylated cyclohexyl di(meth)acrylate, isocyanurate di(meth)acrylate, trimethylolpropane tri(meth)acrylate, ethyleneoxide modified trimethylolpropane tri(meth)acrylate, dipentaerythritol tri(meth)acrylate, propionic acid modified dipentaerythritol tri(meth)acrylate, pentaerythritol tri(meth)acrylate, PO modified trimethylolpropane tri(meth)acrylate, tris(acryloxyethyl)isocyanurate, pentaerythritol tetraacrylate, ditrimethylolpropane tetraacrylate, dipentaerythritol penta(meth)acrylate, propionic acid modified dipentaerythritol penta(meth)acrylate, dipentaerythritol hexa(meth)acrylate, caprolactone modified dipentaerythritol hexa(meth)acrylate, 1,10-decanediol diacrylate and the like. Among them, the acrylic monomer is preferably at least one selected from pentaerythritol tetraacrylate, dipentaerythritol hexaacrylate and 1,10-decanediol diacrylate. The acrylic monomer may be used singly or in combination of two or more kinds thereof.

Furthermore, for acrylic monomers, it is also preferred to use a monofunctional alkyl (meth)acrylate in combination with polyfunctional acrylic monomers mentioned above. Examples of monofunctional alkyl (meth)acrylates may include, for example, pentyl (meth)acrylate, hexyl (meth)acrylate, heptyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, lauryl (meth)acrylate, stearyl (meth)acrylate, isostearyl (meth)acrylate, isobornyl (meth)acrylate, 2-ethylhexyl (meth)acrylate and the like.

It is to be noted that acrylic resins that have pentaerythritol tetraacrylate or dipentaerythritol hexaacrylate as monomer components tend to contract greatly upon curing. Accordingly, when such monomer components are used, it tends to become more difficult to enhance the adhesion properties between the adhesive layer and the fiber layer, and the resin layer; however, in the first aspect, the adhesive layer contains particular functional groups, and thus the interlayer adhesion properties may be enhanced even when monomer components that have a large degree of contraction upon curing are used.

(Second Aspect)

The resin layer may have a single layer structure or may have a multi-layer structure. When the resin layer has a multi-layer structure, the resin layer preferably has a first layer disposed on the side of the adhesive layer and a second layer provided on one surface of the first layer, which is on the side opposite to the adhesive layer. In the Second Aspect, it is also preferred to use a resin layer having such a multi-layer structure.

FIG. 9 is a cross-sectional view illustrating the constitution of a laminate 10 when a fiber layer 3 has a first layer 11 and a second layer 12. As shown in FIG. 9, the first layer 11 is laminated so as to come in contact with an adhesive layer 2 to thereby constitute the laminate 10.

When the resin layer has a multi-layer structure, the first layer preferably contains an acrylic resin. The second layer contains preferably at least one selected from a polycarbonate resin and an acrylic resin, more preferably a polycarbonate resin. When the resin layer has a multi-layer structure described above, it is possible to effectively improve the adhesion properties between the resin layer and a fiber layer bonded via an adhesive layer.

When the resin layer has the first layer and second layer as mentioned above, the first layer preferably contains an acrylic resin. The acrylic resin is, for example, preferably a polymer of acrylic monomers having at least one selected from an alkyl group, a hydroxyl group, an epoxy group, an alkoxy group, an ethylene oxide group, an amino group, an amide group, a carboxyl group, a urethane group, and a phenyl group. Of these, the acrylic resin is more preferably a polymer of acrylic monomers having at least one selected from an alkyl group and an epoxy group. That is, the first layer is preferably a layer containing at least one selected from an alkyl (meth)acrylate resin and an epoxy (meth)acrylate resin.

Examples of alkyl (meth)acrylate include methyl (meth)acrylate, ethyl (meth)acrylate, isopropyl (meth)acrylate, lauryl (meth)acrylate, stearyl (meth)acrylate, butyl (meth)acrylate, hexyl (meth)acrylate, cyclohexyl (meth)acrylate, 2-ethylhexyl (meth)acrylate, isoamyl (meth)acrylate, isooctyl (meth)acrylate, n-octyl (meth)acrylate, dodecyl (meth)acrylate, and isobutyl (meth)acrylate. Of these, the alkyl (meth)acrylate is preferably methyl (meth)acrylate or ethyl (meth)acrylate, more preferably methyl (meth)acrylate.

Examples of epoxy (meth)acrylate include glycidyl (meth)acrylate and methylglycidyl (meth)acrylate. The above epoxy (meth)acrylate herein include polymers obtained by graft polymerization of a component other than epoxy (meth)acrylate, such as urethane (meth)acrylate and copolymers obtained by copolymerization of epoxy (meth)acrylate and other monomers. In this case, the content of the components other than epoxy (meth)acrylate in the copolymer is preferably is 50% by mass or less.

The second layer preferably contains a polycarbonate resin, and preferred polycarbonate resins are as described above.

When the resin layer has a first layer and a second layer, such a layer constitution may be formed by applying, onto either one of the layers, the other layer. Alternatively, the layer structure may be formed by coextruding resins each constituting the first layer and the second layer. For example, when the first layer contains an alkyl (meth)acrylate resin, the resin layer is preferably formed by coextrusion. Specifically, coextrusion of an alkyl (meth)acrylate resin and a polycarbonate resin can form a resin layer. That is, the resin layer may be a coextruded film.

When the first layer contains an epoxy (meth)acrylate resin, a resin layer may be formed by applying a resin composition containing monomers or a polymer component constituting the first layer onto at least one surface of the second layer. Example of a coater for applying a resin composition containing monomers or a polymer component constituting the first layer that can be used include bar coaters, roll coaters, gravure coaters, die coaters, curtain coaters, and air doctor coaters. Bar coaters, die coaters, curtain coaters, and spray coaters are preferred because more even thickness can be provided.

After coating, a curing step is preferably provided. Examples of the curing step can include a heating step and a light irradiation step. In the present invention, preferably, a polycarbonate film is used as the second layer and an ultraviolet irradiation step is provided after an epoxy (meth)acrylate resin is applied on the film.

The fiber layer-side surface of the resin layer may be surface-treated. Alternatively, one surface of the second layer which is on the side of the first layer may be surface-treated. Examples of the surface treatment method can include corona treatment, plasma discharge treatment, UV irradiation treatment, electron beam irradiation treatment, and flame treatment. Of these, the surface treatment is preferably at least one selected from corona treatment and plasma discharge treatment. Note that the plasma discharge treatment is preferably vacuum plasma discharge treatment.

On the fiber layer-side surface of the resin layer, an ultrafine uneven structure may be formed. Alternatively, one surface of the second layer which is on the side of the first layer may be surface-treated. When the surface has an ultrafine uneven structure, it is possible to more effectively improve the adhesion properties between the fiber layer and the resin layer or the adhesion properties between the first layer and the second layer. When the fiber layer-side surface of the resin layer has an ultrafine uneven structure, such a structure is preferably formed by a treatment step such as blasting treatment, embossing treatment, etching treatment, corona treatment, and plasma discharge treatment.

Note that an ultrafine uneven structure herein refers to a structure in which 10 or more recesses exist on a straight line of 1 mm in length drawn at any given area. The number of recesses can be measured by immersing the laminate in ion exchange water for 24 hours, detaching the fiber layer from the resin layer, and then, scanning the fiber layer-side surface of the resin layer by a stylus-type surface roughness measuring instrument (manufactured by Kosaka Laboratory Ltd., Surfcorder series). When recesses and projections has extremely small pitches of a submicron or nanometer order, the number of recesses and projections can be measured from observed images obtained by a scanning probe microscope (manufactured by Hitachi High-Tech Science Corporation, AFM5000II and AFM5100N).

(Inorganic Film Laminate)

The laminate of the present invention may further have an inorganic film (hereinafter, also referred to as an inorganic layer). The inorganic layer may be laminated on the side of the fiber layer or may be laminated on the side of the resin layer. The inorganic layer may be laminated on both sides of the laminate.

Substances constituting the inorganic layer are not particularly limited and examples thereof include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferred.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

The thickness of the inorganic layer is not particularly limited and is preferably 5 nm or larger, more preferably 10 nm or larger, further preferably 20 nm or larger, for exerting stable moisture bather performance. The thickness of the inorganic layer is preferably 1000 nm or less, more preferably 800 nm or less, further preferably 600 nm or less, from the viewpoint of transparency and flexibility.

(Method for Producing Laminate)

The laminate of the present invention can be produced by bonding a fiber layer and a resin layer to each other with an adhesive. As a method of applying an adhesive onto the lamination surface of the fiber layer or the resin layer, a known method is employed. Specifically, exemplified is a method for producing a laminate by applying an adhesive onto at least one surface of a fiber layer, which is to be a lamination surface, using a coater or the like and drying the adhesive to obtain a laminated material including the fiber layer and an adhesive layer laminated, and bonding a resin layer to the adhesive layer of the laminated material. Note that adjusting the amount of the adhesive to be applied can adjust the dried amount of the adhesive layer applied.

As a method (step) of bonding a resin layer to the adhesive layer of a laminated material, exemplified is a method in which a resin sheet material to constitute a resin layer is placed on the adhesive layer of a laminated material and the layers are heat-pressed. Also exemplified is a method in which a laminated material is placed in a mold for injection molding such that its adhesive layer is exposed to the injection space side (the center side inside the mold) and a heat-melted resin is injected in the mold to bond a resin layer constituted by the resin injected to the adhesive layer of the laminated material. From the viewpoint of improving the adhesion properties between the fiber layer and the resin layer, it is preferred to produce a laminate by an injection molding method.

An example of a method for producing a laminate by an injection molding will be described hereinbelow.

First, an adhesive is applied to both the surfaces of a fiber layer and dried to produce a laminated material 6 including an adhesive layer formed on each surface of the fiber layer. A resin sheet 7 to be placed, together with the laminated material 6, in an injection molding mold is also provided. This resin sheet 7 is thermocompression-bonded to the laminated material 6 in the mold by the injection pressure of a resin to be injected to form a resin layer 1.

Subsequently, as shown in FIG. 4, at each of two places on the inner wall surface of a planar mold 5 for injection molding, the resin sheet 7 and the laminated material 6 are sequentially placed and fixed with heat-resistant tape 4. Next, the inner wall surface of the planar mold 5 on which the resin sheets 7 and laminated materials 6 are placed is arranged so as to correspond to the positions each of the upper surface and the lower surface of a laminate 10D to be formed to assemble the planar mold 5. Then, a heat-melted resin is injected from an injection port 5a at an appropriate pressure and molded at an appropriate temperature, with appropriate mold clamping force for an appropriate retention time to obtain the laminate 10D. Both edges including the heat-resistant tape 4 are cut off as required to form a finished laminate 10D.

The pressure for injecting a resin is, for example, preferably 10 MPa to 500 MPa, more preferably 50 MPa to 400 MPa, still more preferably 100 MPa to 300 MPa.

The resin melt temperature upon molding is, for example, preferably 100 to 400° C., more preferably 150 to 400° C., still more preferably 200 to 400° C.

The mold clamping force upon molding is, for example, preferably 200 kN to 100000 kN, more preferably 500 kN to 50000 kN, still more preferably 1000 kN to 10000 kN.

The retention time upon molding is, for example, preferably 0.1 to 600 seconds, more preferably 1 to 300 seconds, still more preferably 10 to 60 seconds.

The mold temperature upon molding is, for example, preferably 100 to 400° C., more preferably 100 to 300° C., still more preferably 150 to 250° C.

In a method for obtaining ultrafine cellulose fibers, pulp containing cellulose fibers can be wet-milled or dry-milled using a known crusher or beater for papermaking to obtain ultrafine cellulose fibers. Ultrafine cellulose fibers also can be obtained by the method described in the section <Ultrafine cellulose fibers> mentioned above.

As a method for producing a fiber layer, exemplified is a method in which fiber slurry containing cellulose fibers dispersed in a dispersion medium is prepared, and this dispersion is made into paper or applied and dried to form a fiber layer (fiber sheet).

<Coating Step>

A coating step is a step of applying ultrafine cellulose fiber-containing slurry on a base material, drying the slurry to form an ultrafine cellulose fiber-containing sheet, and detaching the sheet from the base material to obtain a sheet (fiber layer). Use of a coating apparatus and a long base material can continuously produce sheets. The concentration of slurry to be applied is not particularly limited and is preferably 0.05% by mass or more and 5% by mass or less.

The quality of the base material used in the coating step is not particularly limited. Although a base material having higher wettability to the ultrafine cellulose fiber-containing slurry is preferred because shrinkage of the sheet or the like upon drying is suppressed, it is preferred to select one from which a sheet formed after drying can be easily detached. Of these, a resin plate or a metal plate is preferred, without particular limitation. Examples thereof that can be used include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the ultrafine cellulose fiber-containing slurry has a low viscosity and spreads on the base material in the coating step, a damming frame is fixed and used on the base material in order to obtain an ultrafine cellulose fiber-containing sheet having a predetermined thickness and basis weight. The material of the damming frame is not particularly limited, and it is preferred to select ones from which edges of the sheet adhere after drying can be easily detached. Of these, frames formed from resin plates or metal plates are preferred, without particular limitation. Example thereof that can be used include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying ultrafine cellulose fiber-containing slurry that can be used include roll coaters, gravure coaters, die coaters, curtain coaters, and air doctor coaters. Die coaters, curtain coaters, and spray coaters are preferred because more even thickness can be provided.

The coating temperature is not particularly limited, and is preferably 20° C. or more and 45° C. or less, more preferably 25° C. or more and 40° C. or less, still more preferably 27° C. or more and 35° C. or less. When the coating temperature is equal to or higher than the lower limit described above, it is possible to easily apply the ultrafine cellulose fiber-containing slurry. When the coating temperature is equal to or lower than the upper limit described above, it is possible to prevent volatilization of the dispersion medium upon coating.

In the coating step, it is preferred to apply the slurry so as to achieve a finished basis weight of the sheet of 10 g/m$^2$ or more and 100 g/m$^2$ or less, preferably 20 g/m$^2$ or more and 50 g/m$^2$ or less. Applying the slurry so as to achieve a basis weight within the above range can give a fiber layer having excellent strength.

A step of obtaining a fiber layer containing ultrafine cellulose fibers preferably includes a step of drying the ultrafine cellulose fiber-containing slurry applied on the base material. The drying method is not particularly limited, and any of a contactless drying method and a method of drying the sheet while locking the sheet can be used, or these methods may be combined.

The contactless drying method is not particularly limited, and a method for drying by heating with hot air, infrared, far-infrared, or near-infrared (drying method by heating) or a method for drying in vacuum (vacuum drying method) can be utilized. Although the drying method by heating and the vacuum drying method may be combined, the drying method by heating is usually utilized. The drying with infrared, far-infrared, or near-infrared can be performed using an infrared apparatus, a far-infrared apparatus, or a near-infrared apparatus without particular limitations. The heating temperature for the drying method by heating is not particularly limited, and is preferably 20° C. or more and 120° C. or less, more preferably 25° C. or more and 105° C. or less. At the heating temperature equal to or higher than the lower limit described above, the dispersion medium can be rapidly volatilized. At the heating temperature equal to or lower than the upper limit described above, cost required for the heating can be reduced and the thermal discoloration of the ultrafine cellulose fibers can be suppressed.

After the drying, the ultrafine cellulose fiber-containing sheet is detached from the base material. When the base material is a sheet, the ultrafine cellulose fiber-containing sheet and base material may be rolled up in the laminated state, and the ultrafine cellulose fiber-containing sheet may be detached from the base material just before use of the ultrafine cellulose fiber-containing sheet.

When optional components are added to the fiber layer, the dispersion liquid of the ultrafine cellulose fibers preferably contains oxygen-containing organic compound. The content of the oxygen-containing organic compound is preferably 1 part by mass or more and 40 parts by mass or less, more preferably 10 parts by mass or more and 30 parts by mass or less, still more preferably 15 parts by mass or more and 25 parts by mass or less based on 100 parts by mass of the ultrafine cellulose fibers contained in the dispersion liquid of the ultrafine cellulose fibers.

<Papermaking Step>

The step of obtaining a fiber layer containing ultrafine cellulose fibers may include a step of papermaking from ultrafine cellulose fiber-containing slurry. Examples of a paper machine in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the ultrafine cellulose fiber-containing slurry is wire-filtered and dehydrated to obtain a sheet in a wet state. Then, the wet sheet is pressed and dried to obtain a sheet. The solid concentration of the slurry is not particularly limited, and is preferably 0.05% by mass or more, more preferably 0.1% by mass or more, still more preferably 0.5% by mass or more. The solid concentration of the slurry is also preferably 10% by mass or less, more preferably 5% by mass or less. When the solid concentration of the slurry is equal to or higher than the lower limit described above, a fiber layer is easily produced by papermaking. The solid concentration of the slurry is equal to or lower than the upper limit described above, formation of aggregates in the slurry can be prevented. The slurry may contain known papermaking chemicals such as a sizing agent or a paper strength improver as required.

Upon filtration and dehydration of slurry, filter fabric for filtration is not particularly limited. It is important that ultrafine cellulose fibers do not pass through filter fabric and the filtration speed is not excessively slow. Such filter fabric is not particularly limited, and a sheet comprising organic polymers, woven fabric, or porous membrane is preferred. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 µm or more and 20 µm or less, for example, 1 µm and woven fabric made of polyethylene terephthalate or polyethylene having a pore size of 0.1 µm or more and 20 µm or less, for example, 1 µm.

A method for producing a sheet from ultrafine cellulose fiber-containing slurry is not particularly limited, and an example thereof is the method disclosed in WO2011/013567 comprising using a production apparatus. The production apparatus comprises a dewatering section for ejecting slurry containing ultrafine cellulose fibers on the upper surface of an endless belt and dewatering a dispersion medium contained in the ejected slurry to form a web and a drying section for drying the web to produce a fiber sheet. The endless belt is provided across from the dewatering section to the drying section, and the web formed in the dewatering section is transferred to the drying section while being placed on the endless belt.

A dehydration method that can be used in the present invention is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a yankee dryer, hot air drying, a near-infrared heater, or an infrared heater is preferred.

Examples of a method for drying slurry to form a fiber sheet include heat drying, air-blow drying, and drying under reduced pressure. Pressure may be applied in parallel with the drying. The heating temperature is preferably of the order of 50° C. to 250° C. Within the temperature range described above, it is possible to complete the drying in a short period to thereby suppress discoloration and coloring. The pressure to be applied is preferably 0.01 MPa to 5 MPa. Within the pressure range described above, it is possible to suppress occurrence of cracking and wrinkles to thereby enhance the density of the fiber layer.

In the papermaking step, the finished basis weight of the sheet is preferably 1 g/m$^2$ or more and 200 g/cm$^2$, more preferably 10 g/m$^2$ or more and 100 g/cm$^2$, still more preferably 25 g/m$^2$ or more and 75 g/cm$^2$. The basis weight of the fiber sheet herein is a value measured by the method described in JIS P 8124:2011.

When an optional component is added to the fiber layer, it is preferred to homogeneously mixing the optional component in the fiber slurry to form a fiber layer in which the optional component is dispersed. For example, when an oxygen-containing organic compound as an optional component is mixed in fiber slurry, in a process in which a thin film of the fiber slurry obtained by papermaking or application of the fiber slurry is dried to form a fiber layer, drying mildly progresses and thus, occurrence of cracking and wrinkles in the fiber layer can be suppressed. As a result, it is possible to form a transparent film-like fiber layer having a high density.

Instead of the method described above, after a fiber layer is formed, the fiber layer may be impregnated with an optional component. When the optional component is a hydrophilic polymer, the hydrophilic polymer is preferably homogeneously mixed in slurry to form a fiber layer. This formation method enables the fiber layer to homogeneously contain the hydrophilic polymer at higher efficiency than that in the case where the fiber layer is impregnated with the hydrophilic polymer afterward.

An increase in the optional component to be added to the fiber layer leads to a relative decrease in the content of the cellulose fiber with respect to the total mass of the fiber layer. Accordingly, adjusting the amount of the optional component added appropriately enables the content of the cellulose fiber in the fiber layer to be adjusted within a suitable range.

The density of a fiber sheet used for producing a laminate is preferably 1.0 g/cm$^3$ or more and 1.7 g/cm$^3$ or less, more preferably 1.2 g/cm$^3$ or more and 1.65 g/cm$^3$ or less, still more preferably 1.4 g/cm$^3$ or more and 1.6 g/cm$^3$ or less.

The density of the fiber sheet herein is a value calculated from the basis weight and thickness of the fiber sheet in compliance with JIS standard P 8118:2014. Note that the density of the fiber sheet is a density including the optional component other than the cellulose fiber.

(First Aspect)

A production step of a laminate in First Aspect may include a step of obtaining a fiber layer containing ultrafine cellulose fibers having a fiber width of 1000 nm or less, a step of forming an adhesive layer by applying a composition containing a functional group (A) that forms a covalent bond with a (meth)acryloyl group and a functional group (B) that forms a covalent bond with a hydroxyl group on at least one surface of the fiber layer, and a step of forming a resin layer by applying a resin composition containing acrylic monomers.

The step of obtaining a fiber layer in First Aspect is the same as the step mentioned above.

In the step of forming an adhesive layer, a composition containing a functional group (A) that forms a covalent bond with a (meth)acryloyl group and a functional group (B) that forms a covalent bond with a hydroxyl group is applied on at least one surface of the fiber layer.

Here, as the functional group (A) and the functional group (B), the functional groups mentioned above are each preferably selected. Of these, the functional group (A) is preferably at least one selected from a (meth)acryloyl group and a group represented by H$_2$C=CR$^2$—CH(—OH)—, and the functional group (B) is preferably at least one selected from an isocyanate group, a carbodiimide group, an epoxy group, an alkoxysilyl group, a silanol group, and an oxazoline group.

The composition containing the functional group (A) and the functional group (B) preferably contains a compound a having at least one functional group (A) and at least one hydroxyl group and a compound b having at least two functional groups (B), but may contain a compound having at least one functional group (A) and at least one functional group (B) in one molecule.

The compound a having at least one functional group (A) and at least one hydroxyl group is preferably a polymer (resin) having a functional group (A). Additionally, the polymer (resin) having a functional group (A) is preferably an acrylic resin having at least one selected from a (meth)acryloyl group and a group represented by H$_2$C=CR$^2$—CH(—OH)—, more preferably an acrylic resin to which at least one selected from a (meth)acryloyl group and a group represented by H$_2$C=CR$^2$—CH(—OH)— is graft-polymerized.

The compound b having at least two functional group (B) is preferably an isocyanate compound. Examples of the isocyanate compound include tolylene diisocyanate, xylylene diisocyanate, hexamethylene diisocyanate, and isophorone diisocyanate. Isocyanate compounds include biuret-type, nurate-type, and adduct-type polyisocyanates, and these polyisocyanates also can be used. Of these, from the viewpoint of suppressing coloring due to heating and degradation over time, nurate-type polyisocyanurate is suitable.

The compound a contains preferably at least one functional group (A) and at least one hydroxyl group. The hydroxyl group of the compound a, first forms a covalent bond with one functional group (B) of the compound b, and the functional group (A) of the compound a forms a covalent bond with an acryloyl group possessed by a polymer of acrylic monomers contained in the resin layer. Then, the second functional group (B) of the compound b forms a covalent bond with a hydroxyl group possessed by ultrafine cellulose fibers contained in the fiber layer. As described above, the ultrafine cellulose fibers contained in the fiber layer are bound to the polymer of acrylic monomers contained in the resin layer via a cross-linked structure in which functional groups of the compound a and the compound b are each covalently bonded.

The composition containing the functional group (A) and the functional group (B) preferably contains 0.5 mol or more and 5.0 mol or less of the functional group (B), more preferably 0.5 mol or more and 3.0 mol or less of the functional group (B), with respect to 1 mol of the functional group (A). When the molar ratio of the functional group (B) with respect to 1 mol of the functional group (A) is set within the range described above, it is possible to form a cross-linked structure more effectively and further enhance the interlayer adhesion properties in the laminate.

The composition containing the functional group (A) and the functional group (B) preferably further contains a polymerization initiator. Examples of the polymerization initiator include polymerization initiators mentioned above. Of these, a photopolymerization initiator is preferably contained in the composition containing the functional group (A) and the functional group (B). When the composition containing the functional group (A) and the functional group (B) is allowed to contain a photopolymerization initiator, the hardness of the adhesive layer can be further enhanced by radiation to be applied upon curing of the resin layer.

The composition containing the functional group (A) and the functional group (B) may further contain a solvent. Examples of the solvent include organic solvents, such as esters such as ethyl acetate, butyl acetate, and propyl acetate, ketones such as methyl ethyl ketone, methyl isobutyl, dibutyl ketone, and cyclohexanone, aromatics such as toluene, xylene, and hexane, and hydrocarbons.

In the step of forming an adhesive layer, a composition containing a functional group (A) that forms a covalent bond with a (meth)acryloyl group and a functional group (B) that forms a covalent bond with a hydroxyl group is applied on at least one surface of the fiber layer. Examples of a coater that can be used in the coating step include bar coaters, roll coaters, gravure coaters, die coaters, curtain coaters, and air doctor coaters.

After coating, a polymerization step is preferably provided, and a thermal polymerization step is more preferably provided. In the thermal polymerization step, heating is preferably conducted, for example, at 70° C. or more and 200° C. or less for 0.1 hours or more and 10 hours or less. In the thermal polymerization step, for example, a method for drying by heating with hot air, infrared, far-infrared, or near-infrared (drying method by heating) or a method for drying in vacuum (vacuum drying method) can be utilized.

In the polymerization step, photopolymerization step may be employed, or the thermal polymerization step and the photopolymerization step may be carried out simultaneously. In this case, in the photopolymerization step, ultraviolet rays of 300 nm or more and 450 nm or less are applied in the range of 10 mJ/cm² or more and 8000 mJ/cm² or less.

In the step of forming a resin layer, a resin composition containing at least either one selected from acrylic monomers or prepolymers of acrylic monomers is applied.

Examples of the acrylic monomer contained in the resin composition include acrylic monomers mentioned above. Of these, the acrylic monomer is preferably at least one selected from pentaerythritol tetraacrylate, dipentaerythritol hexaacrylate, and 1,10-decanediol diacrylate. Examples of the prepolymer of acrylic monomers include copolymers obtained by copolymerizing the acrylic monomers mentioned above and a urethane structure or an epoxy structure.

The resin composition preferably contains a solvent. Examples of the solvent include organic solvents, such as esters such as ethyl acetate, butyl acetate, and propyl acetate, ketones such as methyl ethyl ketone, methyl isobutyl, dibutyl ketone, and cyclohexanone, aromatics such as toluene, xylene, and hexane, and hydrocarbons.

The resin composition preferably further contains a polymerization initiator. Examples of the polymerization initiator include polymerization initiators mentioned above. Of these, a photopolymerization initiator is preferably contained in the resin composition.

In the step of forming a resin layer, a resin composition is applied on the surface of the adhesive layer formed on at least one surface of the fiber layer. Examples of a coater that can be used in the coating step include bar coaters, roll coaters, gravure coaters, die coaters, curtain coaters, and air doctor coaters.

After the resin composition is applied, heating is preferably conducted, for example, at 70° C. or more and 200° C. or less for 0.1 hours or more and 10 hours or less in order to volatilize the solvent. In the heating step, for example, a method for drying by heating with hot air, infrared, far-infrared, or near-infrared (drying method by heating) or a method for drying in vacuum (vacuum drying method) can be employed.

After the solvent is volatilized, a step of curing the resin composition is preferably provided. Here, it is preferred to polymerize and cure the composition by radiation irradiation.

The radiation may be applied at any dose provided that the dose is within the range in which the photopolymerization initiator allows radicals to be generated. Specifically, ultraviolet rays of 300 nm or more and 450 nm or less are applied in the range of 10 mJ/cm² or more and 8000 mJ/cm² or less. Alternatively, application of radiation is also preferably divided into two or more sessions. Specific examples of a lamp used for radiation irradiation include metal halide lamps, high-pressure mercury lamps, ultraviolet lamps, and electrodeless mercury lamps.

In the step of curing the resin composition, photopolymerization and thermal polymerization may be carried out simultaneously. In this case, curing is carried out by heating the resin composition at 70° C. or more and 200° C. or less simultaneously with the radiation irradiation.

(Second Aspect)

A production step of a laminate in Second Aspect may include a step of obtaining a fiber layer containing cellulose fibers having a fiber width of 1000 nm or less, a step of forming an adhesive layer by applying a resin composition containing urethane (meth)acrylate at least one surface of the fiber layer, and step of laminating the resin layer on one surface of the adhesive layer, which is on the opposite side to the fiber layer.

The step of obtaining a fiber layer in Second Aspect is the same as the step mentioned above.

In the step of forming an adhesive layer, a resin composition is applied on at least one surface of the resin layer containing urethane (meth)acrylate. The resin composition contains at least urethane (meth)acrylate and preferably further contains a cross-linking agent such as an isocyanate compound and the like. The resin composition may also contain a polymerization initiator for carrying out a polymerization reaction of acrylic units of urethane (meth)acrylate. Furthermore, the resin composition may contain an optional diluent solvent for adjusting its coatability.

Examples of a coater that can be used for applying a resin composition containing urethane (meth)acrylate include bar coaters, roll coaters, gravure coaters, die coaters, curtain coaters, and air doctor coaters.

After coating, a step of curing the resin is preferably provided. In the curing step, heating is preferably carried out such that the temperature reaches 20° C. or more and 150° C. or less. The heating time is preferably 0.1 hours or more and 10 hours or less.

In the step of laminating the resin layer, the resin layer is laminated on one surface of the adhesive layer, which is on the opposite side to the fiber layer. That is, in the step of laminating the resin layer, the fiber layer is bonded to the resin layer via the adhesive layer. In the step of laminating the resin layer, after the fiber layer is bonded to the resin layer via the adhesive layer, the laminate is preferably sandwiched with plate-like articles from the fiber layer side and the resin layer side and then pressed. It is also preferred to heat the laminate upon pressing. The pressing pressure in this case is preferably 0.1 MPa or more, more preferably 0.5 MPa or more, still more preferably 1 MPa or more, and may be 3 MPa or more. The pressing pressure is also preferably 20 MPa or less, more preferably 10 MPa or less. The heating temperature is preferably 20° C. or more and 250° C. or less. The press time is preferably 10 seconds or more and 10 minutes or less.

The step of producing a laminate of the present invention preferably further includes a step of forming a resin layer having a first layer and a second layer disposed on one surface of the first layer, which is on the side opposite to the adhesive layer, before the step of laminating the resin layer. In this case, the resin layer may be formed by applying, onto either one of the first layer or the second layer, the other layer. Alternatively, the resin layer may be formed by coextruding resins each constituting the first layer and the second layer.

When the first layer contains an epoxy (meth)acrylate resin, the step of forming a resin layer preferably includes a step of applying an epoxy (meth)acrylate-containing composition on the second layer. In this case, the second layer contains preferably at least one of a polycarbonate resin or an acrylic resin, more preferably a polycarbonate resin. That is, preferably, the first layer of the resin layer contains an epoxy (meth)acrylate resin, the second layer contains a polycarbonate resin, and the resin layer is formed by applying an epoxy (meth)acrylate-containing composition on the second layer.

The epoxy (meth)acrylate-containing composition preferably contains at least epoxy (meth)acrylate. The epoxy (meth)acrylate-containing composition may also contain a polymerization initiator for carrying out a polymerization reaction of acrylic units of epoxy (meth)acrylate and a polymerization reaction using the epoxy group as the base point. Furthermore, the epoxy (meth)acrylate containing-composition may contain an optional diluent solvent for adjusting its coatability.

When the first layer contains an alkyl (meth)acrylate resin, the step of forming a resin layer is preferably a step of forming a first layer and a second layer by coextrusion. In this case, the second layer contains preferably at least one selected from a polycarbonate resin and an acrylic resin, more preferably a polycarbonate resin. That is, preferably, the first layer of the resin layer contains an alkyl (meth) acrylate resin, the second layer contains a polycarbonate resin, and the resin layer is formed by coextruding the first layer and the second layer.

The forming step by coextrusion enables a resin layer to be formed by coextruding an alkyl (meth)acrylate resin and a polycarbonate resin.

In the step of forming a resin layer, at least one surface of the resin layer may be subjected to surface treatment, or at least one surface of the second layer in the resin layer may be subjected to surface treatment. Examples of the surface treatment that can be applied include corona treatment, plasma discharge treatment, UV irradiation treatment, electron beam irradiation treatment, and flame treatment.

The step of forming a resin layer also may include a step of forming an ultrafine uneven structure or may include a step of forming an ultrafine uneven structure on at least one surface of the second layer in the resin layer. Examples of the step of forming an ultrafine uneven structure include blasting treatment, embossing treatment, etching treatment, corona treatment, and plasma discharge treatment.

As a method for producing a laminate, in addition to the methods mentioned above, also exemplified is a method in which a laminated sheet including a fiber layer and an adhesive layer is placed in a mold for injection molding such that the adhesive layer is exposed and a heat-melted resin is injected in the mold to bond the layers.

(Uses)

A preferred embodiment of the laminate of the present invention is a laminate that is transparent, has a high mechanical strength, and has a low haze. From the viewpoint of making use of excellent optical properties, the laminate is suitable for purposes such as display elements, lighting elements, various display devices, light transmissive substrates for various solar cells, and the like. More specifically, the laminate can be used as a display such as a flexible display, a touch panel, a liquid crystal display, a plasma display, an organic EL display, a field emission display or a display for rear-projection television, or an LED element. The laminate can be also used as a substrate for solar cells such as silicon solar cells and dye-sensitized solar cells. For purposes as the substrate, a barrier film, ITO, TFT, or the like may be laminated thereon.

Furthermore, the laminate of the present invention can be used for structure materials, such as window materials for automobiles, rail vehicles, aircrafts, houses, office buildings, factories, and the like, materials for automobiles, rail vehicles, and aircrafts such as glazing, interior materials, outer panels, and bumpers, enclosures for personal computers, components for home electronics, packaging materials, building materials, construction materials, fishery materials, and other industrial materials. For the window materials, a film such as a fluorine coating or a hard coat film, or an impact-resistant or light-resistant material may be laminated thereon as required.

(Operation and Effect)

The laminate of the present invention includes an adhesive layer between a resin layer and a fiber layer. Thus, even if a material including voids such as non-woven fabric as the fiber layer is not used, sufficient adhesion properties between the resin layer and the fiber layer can be obtained.

A fiber layer including no or few voids has a high density and a large effect of reinforcing the laminate. With a high density, the laminate has an advantage also in terms of transparency.

Additionally, according to the method for producing a laminate mentioned above, injection molding a resin that forms the resin layer enables the resin layer to strongly adhere to an adhesive layer provided on the surface of the fiber layer. Also, the method can produce the laminate having excellent mechanical properties with more ease and high productivity, compared with the production method of Patent Document 1, in which a polycarbonate resin film (resin layer) is heated and melted to be thermocompression-bonded to cellulose non-woven fabric (fiber layer) in a state that the polycarbonate resin film is pressed onto the cellulose non-woven fabric.

EXAMPLES

The features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example A1

(Preparation of Ultrafine Cellulose Fiber Suspension A)

265 g of sodium dihydrogenphosphate dihydrate and 197 g of disodium hydrogenphosphate were dissolved in 538 g of water to obtain an aqueous solution of a phosphoric acid-based compound (hereinafter, referred to as "phosphorylation reagent").

Needle bleached kraft pulp (manufactured by Oji Holdings Corporation, water content 50% by mass, Canadian standard freeness (CSF) measured according to HS P 8121 700 ml) was diluted with ion-exchanged water so as to have a water content of 80% by mass, thereby obtaining a pulp suspension. 210 g of the phosphorylation reagent was added to 500 g of this pulp suspension, and the resultant mixture was dried until the mass reached a constant weight while occasionally kneading with an air dryer at 105° C. (DKM 400, Yamato Scientific Co., Ltd.). Then, the mixture was heat treated for 1 hour while occasionally kneading with an air dryer at 150° C. to introduce a phosphoric acid group into the cellulose. The amount of the phosphoric acid group introduced at this time was 0.98 mmol/g.

Next, 5000 ml of ion-exchanged water was added to the cellulose into which the phosphoric acid group had been introduced, and the resultant mixture was stirred and washed, and then dehydration was carried out. The dehydrated pulp was diluted with 5000 ml of ion-exchanged water, and a 1 N aqueous solution of sodium hydroxide was gradually added while stirring until the pH was 12 to 13 to obtain a pulp suspension. Then, this pulp suspension was dehydrated and washed with 5000 ml of ion-exchanged water. This dehydration and washing was repeated one more time.

Ion-exchanged water was added to the pulp obtained after the washing and dehydration to produce a 1.0% by mass pulp suspension. This pulp suspension was passed through a homogenizing chamber five times by a high-pressure homogenizer (Niro Soavi "Panda Plus 2000") at an operating pressure of 1200 bar to obtain an ultrafine cellulose fiber suspension. Further, the obtained ultrafine cellulose fiber suspension was passed through a treatment chamber five times by a wet atomization apparatus ("Ultimizer", manufactured by Sugino Machine Limited) at a pressure of 245 MPa to obtain an ultrafine cellulose fiber suspension A.

The average fiber width of the ultrafine cellulose fibers constituting suspension A was 5 nm.

(Production of Fiber Sheet B)

Polyethylene oxide (manufactured by Wako Pure Chemical Industries, Ltd., molecular weight: 1000000), which is a hydrophilic polymer, was added as an oxygen-containing organic compound to ultrafine cellulose fiber suspension A in a ratio of 20 parts by mass of polyethylene oxide to 100 parts by mass of ultrafine cellulose fibers. Here, the concentration was adjusted so that the solid concentration of the ultrafine cellulose fibers was 0.5% by mass. The suspension was weighed so that the sheet basis weight was 50 g/m$^2$, developed (cast) onto a commercially available acrylic plate, and dried in a 50° C. oven to obtain fiber sheet B (fiber layer).

(Production of Laminated Material C)

On one surface of fiber sheet B, as an adhesive, a mixture of 100 parts by weight of a urethane acrylic resin (Acrit 8UA-347A, manufactured by Taisei Fine Chemical Co., Ltd.), which is an acrylic resin graft-polymerized with polyurethane, and 9.7 parts by weight of an isocyanurate compound (TPA-100, manufactured by Asahi Kasei Chemicals Corporation) was applied with a bar coater and dried to obtain laminated material C provided with an adhesive layer on the fiber sheet. The amount of this adhesive layer dried and applied was 1.5 g/m$^2$.

(Production of Laminated Material D)

On the other surface of fiber sheet B, namely, the surface on which the adhesive layer of laminated material C was not provided, as an adhesive, a mixture of 100 parts by weight of a urethane acrylic resin (Acrit 8UA-347A, manufactured by Taisei Fine Chemical Co., Ltd.), which is an acrylic resin graft-polymerized with polyurethane, and 9.7 parts by weight of an isocyanurate compound (TPA-100, manufactured by Asahi Kasei Chemicals Corporation) was applied with a bar coater and dried to obtain laminated material D provided with an adhesive layer on each of both surfaces of the fiber sheet. The amount of this adhesive layer dried and applied was 1.5 g/m$^2$ for one surface and 3.0 g/m$^2$ for both surfaces.

(Production of Laminate)

Laminated material C (size: 150 mm×150 mm) was placed on the inner wall surface of the lower mold of a flat mold (size: 150 mm×150 mm) for injection molding so that the adhesive layer of laminated material C faced the injection space side of the mold, and fixed with heat-resistant tape. The flat mold for injection molding, which was constructed from a combination of the lower mold having laminated material C fixed thereto and an upper mold, was set in an injection molding tester (NEX 140, manufactured by Nissei Plastic Industrial Co., Ltd.), a polycarbonate resin (Panlite L-1250Y, manufactured by Teijin Limited) melted by heating to 300° C. was injected at a pressure of 200 MPa, and molding was carried out at a mold temperature of 200° C., a mold clamping force of 1300 kN, and a holding time of 30 seconds to obtain the laminate of Example A1.

The total thickness of the obtained laminate was 1500 μm, and the laminate structure was, in order, polycarbonate layer (thickness 1465 μm)/adhesive layer (thickness about 2 μm)/fiber sheet B (thickness 33 μm) (see FIG. 2).

The ratio of the thickness of fiber sheet B present in the region from the surface layer until a thickness of 20% (0.2 T=150 μm) to a thickness T from the surface layer to the center of the obtained laminate was 22% (=33÷(750×0.2)%).

Example A2

(Production of Laminate)

Two sheets of laminated material C were stacked on the inner wall surface of the lower mold and fixed with a heat-resistant tape. Two sheets of laminated material C were also stacked on the inner wall surface of the upper mold and fixed with a heat-resistant tape. At this time, each sheet of laminated material C was arranged so that the adhesive layer faced the resin layer side. In the same manner as in Example A1, except that a flat mold for injection molding constructed from a combination of these lower and upper molds was used, the laminate of Example A2, in which a total of four sheets of laminated material 6 were laminated, namely, two sheets on the surface side of one resin layer and two sheets on the back side, was obtained. The total thickness of the obtained laminate was 1500 µm. The laminate structure was, in order, fiber sheet B (thickness 33 µm)/adhesive layer (thickness about 2 µm)/fiber sheet B (thickness 33 µm)/adhesive layer (thickness 2 µm)/polycarbonate layer (thickness 1360 µm)/adhesive layer (thickness about 2 µm)/fiber sheet B (thickness 33 µm)/adhesive layer (thickness about 2 µm)/fiber sheet B (thickness 33 µm) (see FIG. 3).

The ratio of the thickness of fiber sheet B present in the region from the surface layer until a thickness of 20% (0.2 T=150 µm) to a thickness T from the surface layer to the center of the obtained laminate was 44% (=(33+33)÷(750×0.2)%).

Example A3

(Production of Laminate)
The laminate of Example A3 was obtained in the same manner as in Example A1, except that the adhesive of laminated material C was changed to an acryl-silica composite resin (Compoceran AC601, manufactured by Arakawa Chemical Industries, Ltd.). The total thickness of the obtained laminate was 1500 µm, and the laminate structure was almost the same as that of laminate E of Example A1 (see FIG. 2).

The ratio of the thickness of fiber sheet B present in the region from the surface layer until a thickness of 20% (0.2 T=150 µm) to a thickness T from the surface layer to the center of the obtained laminate was 22% (=33÷(750×0.2)%).

Example A4

(Production of Laminate)
A polycarbonate resin sheet (Panlite PC-1151, thickness: 1.0 mm, size: 150 mm×150 mm, manufactured by Teijin Limited) and laminated material D (size: 150 mm×150 mm) were successively placed on the inner wall surface of the lower mold of a flat mold (size: 150 mm×150 mm) for injection molding, and fixed with heat-resistant tape. The flat mold for injection molding, which was constructed from a combination of the lower mold having the polycarbonate resin sheet and laminated material D fixed thereto and an upper mold, was set in an injection molding tester (NEX 140, manufactured by Nissei Plastic Industrial Co., Ltd.), and a polycarbonate resin (Panlite L-1250Y, manufactured by Teijin Limited) melted by heating to 300° C. was injected at a pressure of 200 MPa, and molding was carried out at a mold temperature of 200° C., a mold clamping force of 1300 kN, and a holding time of 30 seconds to obtain the laminate of Example A4. Here, the above polycarbonate resin sheet placed in the mold was joined to laminated material D by thermocompression bonding from the heat and pressure of the polycarbonate injected into the mold.

The total thickness of the obtained laminate was 2000 µm, and the laminate structure was, in order, polycarbonate layer (thickness 963 µm)/adhesive layer (thickness 2 µm)/fiber sheet B (thickness 33 µm)/adhesive layer (thickness 2 µm)/polycarbonate layer (thickness 1000 µm) (see FIG. 1).

The ratio of the thickness of fiber sheet B present in the region from the surface layer until a thickness of 20% (0.2 T=200 µm) to a thickness T from the surface layer to the center of the obtained laminate was 0% (=0÷(1000×0.2)%).

Example A5

(Production of Fiber Sheet E)
Polyethylene oxide (manufactured by Wako Pure Chemical Industries, Ltd., molecular weight: 1000000), which is a hydrophilic polymer, was added as an oxygen-containing organic compound to ultrafine cellulose fiber suspension A in a ratio of 20 parts by mass of polyethylene oxide to 100 parts by mass of ultrafine cellulose fibers. Here, the concentration was adjusted so that the solid concentration of the ultrafine cellulose fibers was 0.5% by mass. The suspension was weighed so that the sheet basis weight was 300 g/m², developed (cast) onto a commercially available acrylic plate, and dried in a 50° C. oven to obtain fiber sheet E (fiber layer).
(Production of Laminated Material F)
Laminated material F was obtained in the same manner as laminated material C, except that fiber sheet B of laminated material C was changed to fiber sheet E.
(Production of Laminate)
One sheet of laminated material F was placed on the inner wall surface of the lower mold and fixed with a heat-resistant tape. One sheet of laminated material F was also placed on the inner wall surface of the upper mold and fixed with a heat-resistant tape. At this time, each sheet of laminated material F was arranged so that the adhesive layer faced the resin layer side to be formed later by injection molding. In the same manner as in Example A1, except that a flat mold for injection molding constructed from a combination of these lower and upper molds was used, the laminate of Example A5, in which a total of two sheets of laminated material F were laminated, namely, one sheet on the surface side of one resin layer and one sheet on the back side, was obtained.

The total thickness of the obtained laminate was 1760 µm. The laminate structure was, in order, fiber sheet B (thickness 198 µm)/adhesive layer (thickness about 2 µm)/polycarbonate layer (thickness 1360 µm)/adhesive layer (thickness about 2 µm)/fiber sheet B (thickness 198 µm) (see FIG. 5).

The ratio of the thickness of fiber sheet B present in the region from the surface layer until a thickness of 20% (0.2 T=176 µm) to a thickness T from the surface layer to the center of the obtained laminate was 100% (=(198−22)÷(880×0.2)%).

Example A6

(Production of Laminated Material H)
One sheet of laminated material D was stacked on one sheet of a polycarbonate film (Lumirror S10, manufactured by Toray Industries, Inc.), and stacking was further carried out so that the polycarbonate film and laminated material D were alternately stacked, to obtain laminated material H, in which a total of six sheets of polycarbonate films and a total of six sheets of laminated material D were alternately laminated.
(Production of Laminate)
One sheet of laminated material H was placed on the inner wall surface of the lower mold and fixed with a heat-resistant tape. One sheet of laminated material H was also placed on the inner wall surface of the upper mold and fixed with a heat-resistant tape. At this time, each sheet of laminated material H was arranged so that the adhesive layer faced the resin layer side to be formed later by injection molding. In the same manner as in Example A1, except that a flat mold for injection molding constructed from a combination of these lower and upper molds was used, the laminate of Example A6, in which a total of two sheets of laminated material H were laminated, namely, one sheet on the surface side of one resin layer and one sheet on the back side, was obtained.

The total thickness of the obtained laminate was 1760 µm. The laminate structure was, in order, polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 716 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm)/adhesive layer (thickness about 2 µm)/fiber sheet B (thickness 33 µm)/adhesive layer (thickness about 2 µm)/polycarbonate layer (thickness 50 µm) (see FIG. 6).

The ratio of the thickness of fiber sheet B present in the region from the surface layer until a thickness of 20% (0.2 T=176 µm) to a thickness T from the surface layer to the center of the obtained laminate was 38% (=(33+33)÷(880×0.2)%).

Example A7

(Production of Fiber Sheet I)

Polyethylene oxide (manufactured by Wako Pure Chemical Industries, Ltd., molecular weight: 1000000), which is a hydrophilic polymer, was added as an oxygen-containing organic compound to ultrafine cellulose fiber suspension A in a ratio of 20 parts by mass of polyethylene oxide to 100 parts by mass of ultrafine cellulose fibers. Here, the concentration was prepared so that the solid concentration of the ultrafine cellulose fibers was 0.5% by mass. The suspension was weighed so that the sheet basis weight was 660 g/m², developed (cast) onto a commercially available acrylic plate, and dried in a 50° C. oven to obtain fiber sheet I (fiber layer).

(Production of Laminated Material J)

On one surface of fiber sheet I, as an adhesive, a mixture of 100 parts by weight of a urethane acrylic resin (Acrit 8UA-347A, manufactured by Taisei Fine Chemical Co., Ltd.), which is an acrylic resin graft-polymerized with polyurethane, and 9.7 parts by weight of an isocyanurate compound (TPA-100, manufactured by Asahi Kasei Chemicals Corporation) was applied with a bar coater and dried to obtain laminated material J provided with an adhesive layer on the fiber sheet. The amount of this adhesive layer dried and applied was 1.5 g/m².

(Production of Laminated Material K)

On the other surface of fiber sheet I, namely, the surface on which the adhesive layer of laminated material J was not provided, as an adhesive, a mixture of 100 parts by weight of a urethane acrylic resin (Acrit 8UA-347A, manufactured by Taisei Fine Chemical Co., Ltd.), which is an acrylic resin graft-polymerized with polyurethane, and 9.7 parts by weight of an isocyanurate compound (TPA-100, manufactured by Asahi Kasei Chemicals Corporation) was applied with a bar coater and dried to obtain laminated material K provided with an adhesive layer on each of both surfaces of the fiber sheet. The amount of this adhesive layer dried and applied was 1.5 g/m² for one surface and 3.0 g/m² for both surfaces.

(Production of Laminate L)

Laminated material K (size: 150 mm×150 mm) was placed on the inner wall surface of the lower mold of a flat mold (size: 150 mm×150 mm) for injection molding so that one of the adhesive layers of laminated material K faced the injection space side of the mold, and fixed with heat-resistant tape. The flat mold for injection molding, which was constructed from a combination of the lower mold having laminated material K fixed thereto and an upper mold, was set in an injection molding tester (NEX 140, manufactured by Nissei Plastic Industrial Co., Ltd.), a polycarbonate resin (Panlite L-1250Y, manufactured by Teijin Limited) melted by heating to 300° C. was injected at a pressure of 200 MPa, and molding was carried out at a mold temperature of 200° C., a mold clamping force of 1300 kN, and a holding time of 30 seconds to obtain an intermediate laminate.

Next, a polycarbonate layer was laminated on the other adhesive layer of laminated material K constituting the intermediate laminate by injection molding in the same manner as described in the above paragraph to obtain the laminate of Example A7.

The total thickness of the obtained laminate L was 1760 µm, and the laminate structure was, in order, polycarbonate layer (thickness 680 µm)/adhesive layer (thickness about 2 µm)/fiber sheet I (thickness 396 µm)/adhesive layer (thickness about 2 µm)/polycarbonate layer (thickness 680 µm) (see FIG. 7).

The ratio of the thickness of fiber sheet I present in the region from the surface layer until a thickness of 20% (0.2 T=176 µm) to a thickness T from the surface layer to the center of the obtained laminate was 0% (=0÷(880×0.2)%).

Comparative Example A1

(Production of Molded Body)

The molded body of Comparative Example A1 was obtained in the same manner as in Example A1, except that laminated material C was not used. The thickness of the obtained molded body was 1500 µm, and the laminate structure was a single layer structure of a polycarbonate layer (thickness 1500 µm).

Comparative Example A2

(Production of Laminate)

The laminate of Comparative Example A2 was obtained in the same manner as in Example A1, except that laminated material C was changed to fiber sheet B. The total thickness of the obtained laminate was 1500 μm, and the laminate structure was a bilayer structure of, in order, polycarbonate layer (thickness 1467 μm)/fiber sheet B (thickness 33 μm).

Comparative Example A3

(Preparation of Cellulose Suspension K)

Ion-exchanged water was added to needle bleached kraft pulp (manufactured by Oji Holdings Corporation, water content 50% by mass, Canadian standard freeness (CSF) measured according to JIS P 8121 700 ml) to produce a 1.0% by mass pulp suspension. This pulp suspension was treated by a lab refiner (manufactured by Aikawa Iron Works Co., Ltd.) at 10000 rpm for 5 hours to obtain cellulose suspension K. The average fiber width of this cellulose was 3 μm.

(Production of Fiber Sheet L)

Suspension K was weighed so that the sheet basis weight was 50 g/m², developed onto a commercially available acrylic plate, and dried in a 50° C. oven to obtain a fiber sheet. Further, on one surface of the fiber sheet, as an adhesive, a mixture of 100 parts by weight of a urethane acrylic resin (Acrit 8UA-347A, manufactured by Taisei Fine Chemical Co., Ltd.), and 9.7 parts by weight of an isocyanurate compound (TPA-100, manufactured by Asahi Kasei Chemicals Corporation) was applied with a bar coater and dried to obtain fiber sheet L provided with an adhesive layer on the fiber sheet. The amount of this adhesive layer dried and applied was 1.5 g/m².

(Production of Laminate)

The laminate of Comparative Example A3 was obtained in the same manner as in Example A1, except that laminated material C was changed to fiber sheet L. The total thickness of the obtained laminate was 1500 and the laminate structure was the same trilayer structure as that of laminate E of Example A1 (see FIG. 2).

(Measurement)

The average fiber width, thickness, density, total light transmittance, and haze of the fiber layer constituting the laminate were measured for each of the laminates produced in the Examples and Comparative Examples by the following methods. The results are shown in Table 1. Here, the results and the like shown in Table 1 are the results and the like per one layer of the "fiber layer", "adhesive layer", and "resin layer" constituting each laminate.

Method for Measuring Average Fiber Width

The average fiber width of the cellulose fibers constituting the fiber layer of the laminate is a value measured by cutting a cross section of the laminate with an Ultramicrotome UC-7 (manufactured by JEOL), and observing the fiber layer in an electron microscope image. Here, the "width" means the end-to-end distance of the cellulose fibers, and the shorter distance is used.

Method for Measuring Thickness

The thickness of one fiber layer constituting the laminate is a value measured by cutting a cross section of the laminate with an Ultramicrotome UC-7 (manufactured by JEOL), and observing the cross-section in an electron microscope image.

Method for Measuring Density

The basis weight of one fiber layer constituting the laminate was calculated in accordance with JIS P 8124: 2011 by cutting only the fiber layer of the laminate with an Ultramicrotome UC-7 (manufactured by JEOL). From the basis weight calculated here and the thickness measured by the above method, the density of one fiber layer constituting the laminate was calculated in accordance with JIS P 8118: 2014.

Method for Measuring Total Light Transmittance

The total light transmittance of one fiber layer constituting the laminate was measured by cutting the laminate with an Ultramicrotome UC-7 (manufactured by JEOL) so that only the fiber layer of the laminate remained and in accordance with JIS K 7361: 1997 by using a haze meter ("HM-150", manufactured by Murakami Color Research Laboratory Co., Ltd.).

Method for Measuring Haze

The haze of one fiber layer constituting the laminate was measured by cutting the laminate with an Ultramicrotome UC-7 (manufactured by JEOL) so that only the fiber layer of the laminate remained and in accordance with JIS K 7136: 2000 by using a haze meter ("HM-150", manufactured by Murakami Color Research Laboratory Co., Ltd.).

TABLE 1

| | Fiber Layer | | | | | | Adhesive Layer | | |
| --- | --- | --- | --- | --- | --- | --- | --- | --- | --- |
| | Average Fiber Width nm | Hydrophilic Polymer Type | Thickness μm | Density g/cm³ | Total Light Transmittance % | Haze % | Type | Amount applied g/m² | Resin Layer Type |
| Example A1 | 5 | PEO | 33 | 1.52 | 91.7 | 0.7 | Acrylic Resin | 1.5 | Polycarbonate |
| Example A2 | 5 | PEO | 33 | 1.52 | 91.7 | 0.7 | Acrylic Resin | 1.5 | Polycarbonate |
| Example A3 | 5 | PEO | 33 | 1.52 | 91.7 | 0.7 | Acryl-Silica | 1.5 | Polycarbonate |
| Example A4 | 5 | PEO | 33 | 1.52 | 91.7 | 0.7 | Acrylic Resin | 1.5 | Polycarbonate |
| Example A5 | 5 | PEO | 198 | 1.52 | 89.5 | 1.2 | Acrylic Resin | 1.5 | Polycarbonate |
| Example A6 | 5 | PEO | 33 | 1.52 | 91.7 | 0.7 | Acrylic Resin | 1.5 | Polycarbonate |
| Example A7 | 5 | PEO | 396 | 1.52 | 85.5 | 1.8 | Acrylic Resin | 1.5 | Polycarbonate |
| Comparative Example A1 | — | — | — | — | — | — | — | — | Polycarbonate |
| Comparative Example A2 | 5 | PEO | 33 | 1.52 | 91.7 | 0.7 | — | 1.5 | Polycarbonate |
| Comparative Example A3 | 3000 | — | 72 | 0.69 | 60 | 70 | Acrylic Resin | 1.5 | Polycarbonate |

<Evaluation>

The laminates produced in the Examples and Comparative Examples were evaluated as follows. The results are shown in Table 2.

<Adhesion Properties>

The obtained laminate was cut to obtain five samples having a size of 10 mm in width×50 mm in length from each laminate. In order to evaluate the adhesion properties between the fiber layer and the resin layer, a cutter knife manufactured by Olfa Corporation was inserted into the adhesive layer between the fiber layer and the resin layer, and the level of peeling between the fiber layer and the resin layer was evaluated according to the following criteria.

⊙: Fiber layer and resin layer could not be peeled at all in any of the five samples.

○: Of the five samples, there was no peeling at all in four of the samples, and only one sample peeled by about 1 mm. This level of peeling is not a problem in practical use.

Δ: Peeling of 20 mm or more in all five samples. This level of peeling is problematic in practical use.

×: In all of the five samples, the fiber layer and the resin layer completely peeled off.

<Total Light Transmittance>

The total light transmittance of the obtained laminate was measured in accordance with JIS K 7361: 1997 by using a haze meter ("HM-150", manufactured by Murakami Color Research Laboratory Co., Ltd.).

<Haze>

The haze of the obtained laminate was measured in accordance with JIS K 7136: 2000 by using a haze meter ("HM-150", manufactured by Murakami Color Research Laboratory Co., Ltd.).

<Flexural Modulus>

The flexural modulus of the obtained laminate was measured in accordance with JIS K 7074: 1988 by using the Tensilon RTC-1250A.

<Linear Expansion Coefficient>

The linear expansion coefficient of the obtained laminate was measured in accordance with JIS K 7197: 2012 by using a thermal analyzer (TMA 7100, manufactured by Hitachi, Ltd.), in a temperature range of 100 to 150° C.

<Ratio of Fiber Layer Near Surface>

This ratio was calculated as the percentage of, when the thickness from the surface (the surface on one side) to the center of the obtained laminate is defined as T, the thickness of the fiber layer present in the region from the surface until a thickness T×0.2 (region near the surface). The results are shown in Table 2.

TABLE 2

| | | | | Laminate | | | | |
|---|---|---|---|---|---|---|---|---|
| | | Fiber Layer | Thickness μm | Adhesion properties | Total Light Transmittance % | Haze % | Flexural modulus GPa | Linear expansion coefficient ppm/K (100-150° C.) | Ratio of fiber layer near surface % |
| Example A1 | One sheet | 1500 | ○ | 77.1 | 8.8 | 2.67 | 45 | 22 |
| Example A2 | Four sheets | 1500 | ○ | 66.1 | 11.2 | 4.52 | 30 | 44 |
| Example A3 | One sheet | 1500 | ⊙ | 79.1 | 8.9 | 2.96 | 47 | 22 |
| Example A4 | One sheet | 2000 | ○ | 76.1 | 8.5 | 2.60 | 35 | 0 |
| Example A5 | Two sheets | 1760 | ○ | 67.1 | 11.5 | 7.20 | 24 | 100 |
| Example A6 | Twelve sheets | 1760 | ○ | 63.1 | 12.5 | 3.80 | 30 | 38 |
| Example A7 | One sheet | 1760 | ○ | 65.0 | 10.5 | 3.20 | 35 | 0 |
| Comparative Example A1 | — | 1500 | — | 89.8 | 8.2 | 2.56 | 1860 | 0 |
| Comparative Example A2 | One sheet | 1500 | X | 79.2 | 8.8 | 2.66 | 260 | 22 |
| Comparative Example A3 | One sheet | 1500 | ⊙ | 15.5 | 75.5 | 2.45 | 1000 | 48 |

From the above results, it can be seen that the laminate of the Examples received a high evaluation for all the items of adhesion properties, total light transmittance, haze, elastic modulus, and linear expansion coefficient. Example A1, which was provided with a fiber layer, an adhesive layer, and a resin layer, exhibited excellent adhesion properties, and high transparency and a low linear expansion coefficient could both be achieved. Example A2, in which a plurality of fiber layers were laminated, exhibited a high elastic modulus and a low linear expansion coefficient while maintaining adhesion properties and transparency. In Example A3, even stronger adhesion properties were obtained by using an adhesive in which silica was combined with an acrylic resin. In Example A4, by providing the resin on both surfaces of the fiber layer with an adhesive layer interposed therebetween, a thicker laminate could be obtained that had good adhesion properties and a low linear expansion coefficient. On the other hand, Comparative Example A1, which contained only a resin layer, exhibited high transparency, but had a very high linear expansion coefficient. In Comparative Example A2, which did not have an adhesive layer, the adhesion between the fiber layer and the resin layer was insufficient, and the linear expansion coefficient was also higher than in the Examples. Comparative Example A3, in which the cellulose suspension K having a fiber width of 1000 nm or more was used, had low transparency and a remarkably high linear expansion coefficient.

Looking also at the ratio (presence ratio) of the thickness of the fiber layer near the surface of each laminate, in the Examples, the higher the ratio, the higher the elastic modulus and the lower the linear expansion coefficient were obtained.

(First Aspect)

Example B1

(Preparation of Phosphorylation Reagent)

265 g of sodium dihydrogenphosphate dihydrate and 197 g of disodium hydrogenphosphate were dissolved in 538 g of water to obtain an aqueous solution of a phosphoric acid-based compound (hereinafter, referred to as "phosphorylation reagent").

Phosphorylation

Needle bleached kraft pulp (manufactured by Oji Holdings Corporation, water content 50% by mass, Canadian standard freeness (CSF) measured according to JIS P 8121 700 ml) was diluted with ion-exchanged water so as to have a water content of 80% by mass, thereby obtaining a pulp suspension. 210 g of the phosphorylation reagent was added to 500 g of this pulp suspension, and the resultant mixture was dried until the mass reached a constant weight while occasionally kneading with an air dryer at 105° C. (DKM 400, Yamato Scientific Co., Ltd.). Then, the mixture was heat treated for 1 hour while occasionally kneading with an air dryer at 150° C. to introduce a phosphoric acid group into the cellulose. The amount of the phosphoric acid group introduced at this time was 0.98 mmol/g.

Here, the amount of the phosphoric acid group introduced was measured by diluting the cellulose with ion-exchanged water to a content of 0.2% by mass, then treating with an ion-exchange resin, and titrating with alkali. In the treatment with the ion exchange resin, $1/10$ by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 8 was divided by the solid content (g) in the slurry to be titrated, and the obtained value was taken as the amount (mmol/g) of the substituent group introduced.

[Alkali Treatment and Washing]

Next, 5000 ml of ion-exchanged water was added to the cellulose into which the phosphoric acid group had been introduced, and the resultant mixture was stirred and washed, and then dehydration was carried out. The dehydrated pulp was diluted with 5000 ml of ion-exchanged water, and a 1 N aqueous solution of sodium hydroxide was gradually added while stirring until the pH was 12 or more and 13 or less to obtain a pulp dispersion. Then, the pulp dispersion was dehydrated and washed with 5000 ml of ion-exchanged water. This dehydration and washing was repeated one more time.

[Machine Treatment]

Ion-exchanged water was added to the pulp obtained after the washing and dehydration to produce a pulp dispersion having a solid concentration of 1.0% by mass. This pulp dispersion was treated using a high-pressure homogenizer (Niro Soavi "Panda Plus 2000") to obtain a cellulose dispersion. In the treatment using the high-pressure homogenizer, the pulp dispersion was passed through the homogenizing chamber five times at an operating pressure of 1200 bar. Further, the cellulose dispersion was treated using a wet atomization apparatus ("Ultimizer", manufactured by Sugino Machine Limited) to obtain an ultrafine cellulose fiber dispersion. In the treatment using the wet atomization apparatus, the cellulose dispersion was passed through the treatment chamber five times at a pressure of 245 MPa. The average fiber width of the ultrafine cellulose fibers contained in the ultrafine cellulose fiber dispersion was 4 nm.

[Sheet Forming]

The ultrafine cellulose fiber dispersion was adjusted so as to have a solid concentration of 0.5% by mass. Then, 20 parts by mass of a 0.5% by mass aqueous solution of polyethylene oxide (PEO-18, manufactured by Sumitomo Seika Chemicals Co., Ltd.) was added to 100 parts by mass of the ultrafine cellulose fiber dispersion. Next, the dispersion was weighed so that the finished basis weight of the sheet was 45.0 g/m$^2$, developed on a commercially available acrylic plate, and dried with a thermo-hygrostat at 35° C. and a relative humidity of 15%. Here, a metal frame for damming (metal frame having an inner dimension of 180 mm×180 mm) was arranged on the acrylic plate so as to have a predetermined basis weight. As a result of the above procedure, a sheet (fiber layer) containing ultrafine cellulose fibers was obtained. The thickness of the sheet containing ultrafine cellulose fibers measured by a stylus thickness gauge (Millitron 1202 D, manufactured by Mahr) was 29.8 μm, and the density calculated by dividing the basis weight by the thickness was 1.51 g/cm$^3$.

[Lamination of Adhesive Layer]

An adhesive composition was obtained by mixing 100 parts by mass of an acrylic resin graft-polymerized with an acryloyl group (Acrit 8KX-012C, manufactured by Taisei Fine Chemical Co., Ltd.), 38 parts by mass of a polyisocyanate compound (TPA-100, manufactured by Asahi Kasei Chemicals Corporation), and 2 parts by mass of a radical polymerization initiator (Irgacure 184, manufactured by BASF Co.). Next, the above adhesive composition was applied on one surface of the sheet containing ultrafine cellulose fibers with a bar coater, and then heated at 100° C. for 1 hour to cure and laminate the adhesive layer. Further, an adhesive layer was laminated on the other surface of the sheet containing ultrafine cellulose fibers by the same procedure. The thickness of the adhesive layer was 5 μm on each side. As a result of the above procedure, an adhesive layer laminate sheet (A) in which an adhesive layer was laminated on both surfaces of the sheet containing ultrafine cellulose fibers was obtained.

[Lamination of Resin Layer]

A resin composition was obtained by mixing 100 parts by mass of a urethane acrylic resin containing 5% by mass of 1-hydroxycyclohexyl phenyl ketone as a photopolymerization initiator (Beamset 575CB, manufactured by Arakawa Chemical Industries, Ltd.) and 100 parts by mass of methyl ethyl ketone. Next, the above resin composition was applied on one surface of the adhesive layer laminate sheet (A) with a bar coater and heated at 100° C. for 5 minutes to volatilize the methyl ethyl ketone. Further, 500 mJ/cm$^2$ of UV rays were radiated using a UV conveyor (ECS-4011 GX, manufactured by Eye Graphics Co., Ltd.) to cure the resin composition and form a resin layer. Further, a resin layer was also formed on the other surface of the adhesive layer laminate sheet (A) by the same procedure. The thickness of the resin layer was 10 μm on each side. As a result of the above procedure, a laminate in which a resin layer was laminated on both surfaces of the adhesive layer laminate sheet (A) was obtained.

Example B2

[Lamination of Resin Layer]

A resin composition was obtained by mixing 100 parts by mass of an acrylic resin containing pentaerythritol tetraacrylate as a main component (Beamset 710, manufactured by Arakawa Chemical Industries, Ltd.), 100 parts by mass of methyl ethyl ketone, and 5 parts by mass of a radical polymerization initiator (Irgacure 184, manufactured by BASF Co.). Next, the above resin composition was applied on one surface of the adhesive layer laminate sheet (A) obtained in Example B1 with a bar coater and heated at 100° C. for 5 minutes to volatilize the methyl ethyl ketone. Further, 500 mJ/cm$^2$ of UV rays were radiated using a UV conveyor (ECS-4011 GX, manufactured by Eye Graphics Co., Ltd.) to cure the resin composition and form a resin layer. Further, a resin layer was also formed on the other surface of the adhesive layer laminate sheet (A) by the same procedure. The thickness of the resin layer was 10 µm on each side. As a result of the above procedure, a laminate in which a resin layer was laminated on both surfaces of the adhesive layer laminate sheet (A) was obtained.

Example B3

[Lamination of Resin Layer]

A resin composition was obtained by mixing 100 parts by mass of an acrylic resin containing dipentaerythritol hexaacrylate as a main component (Beamset 710, manufactured by Arakawa Chemical Industries, Ltd.), 100 parts by mass of methyl ethyl ketone, and 5 parts by mass of a radical polymerization initiator (Irgacure 184, manufactured by BASF Co.). Next, the above resin composition was applied on one surface of the adhesive layer laminate sheet (A) obtained in Example B1 with a bar coater and heated at 100° C. for 5 minutes to volatilize the methyl ethyl ketone. Further, 500 mJ/cm$^2$ of UV rays were radiated using a UV conveyor (ECS-4011 GX, manufactured by Eye Graphics Co., Ltd.) to cure the resin composition and form a resin layer. Further, a resin layer was also formed on the other surface of the adhesive layer laminate sheet (A) by the same procedure. The thickness of the resin layer was 10 µm on each side. As a result of the above procedure, a laminate in which a resin layer was laminated on both surfaces of the adhesive layer laminate sheet (A) was obtained.

Example B4

[Preparation of Glass Cell for Molding Resin Layer]

Two of the adhesive layer laminate sheets (A) obtained in Example B1 were cut to a size of 120 mm in length and 55 mm in width. Next, a gap having a length of 95 mm, a width of 40 mm and a thickness of 2 mm was provided as a spacer in the center portion of a piece of silicone rubber having a length of 125 mm, a width of 60 mm, and a thickness of 2 mm. A glass plate was arranged on the outer periphery, and the two more adhesive layer laminate sheets (A) were inserted along the inner peripheral edge of the silicone rubber. Here, an opening having a width of 5 mm for injecting a resin composition described below into the gap was provided on the side portion of the adhesive layer laminate sheet (A) with the silicone rubber serving as the spacer. Further, two of the adhesive layer laminate sheets (A) were sandwiched above and below by two glass plates each having a length of 125 mm, a width of 60 mm, and a thickness of 3 mm, and two points on each of the left and right, and one point on each of the upper and lower sides, were fixed and sealed with a double clip. FIG. 10, which is a view as seen from above of a glass cell 200 for molding a resin layer produced as described above, is a schematic view of the glass cell for molding the resin layer in a state where the upper glass plate has been removed. As illustrated in FIG. 10, in the glass cell 200 for molding a resin layer, an adhesive layer laminate sheet (A) 130, silicone rubber 120, and a glass plate 110 are disposed around an internal space.

[Molding of Resin Layer]

A resin composition was obtained by mixing 100 parts by mass of an acrylic resin (A-DOD-N, manufactured by Shin-Nakamura Chemical Co., Ltd.) containing 1,10-decanediol diacrylate as a main component and 3 parts by mass of a radical polymerization initiator (Irgacure 184, manufactured by BASF Co.). Next, the resin composition was injected into the internal space of the glass cell 200 for molding a resin layer from the opening of the spacer by using a micropipette. Further, silicone rubber was inserted into the opening to seal the opening, and the resin composition was cured by radiating 300 mJ/cm$^2$ of UV rays 20 times using a UV conveyor (ECS-4011 GX, manufactured by Eye Graphics Co., Ltd.). Then, the glass plate and the silicone rubber were removed to obtain a laminate in which an sheet containing ultrafine cellulose fibers (fiber layer) was laminated on both surfaces of a resin layer having a thickness of 1920 µm via an adhesive layer.

Comparative Example B1

In Example B 1, a laminate was obtained in the same manner as in Example B 1, except that adhesive layer lamination was not carried out.

Comparative Example B2

In Example B2, a laminate was obtained in the same manner as in Example B2, except that adhesive layer lamination was not carried out.

Comparative Example B3

In Example B3, a laminate was obtained in the same manner as in Example B3, except that adhesive layer lamination was not carried out.

Example B5

[Lamination of Adhesive Layer]

An adhesive composition was obtained by mixing 76 parts by mass of a UV coat anchor agent (Aracoat AP2510, manufactured by Arakawa Chemical Industries, Ltd.), which is a polyester resin, 10 parts by mass of a curing agent (Aracoat CL2502, manufactured by Arakawa Chemical Industries, Ltd.), and 14 parts by mass of methyl ethyl ketone. Next, the above adhesive composition was applied on one surface of the sheet containing ultrafine cellulose fibers (fiber layer) obtained in Example B1 with a bar coater, and then heated at 100° C. for 3 hours to cure and laminate the adhesive layer. Further, an adhesive layer was laminated on the other surface of the sheet containing ultrafine cellulose fibers by the same procedure. The thickness of the adhesive layer was 5 µm on each side. As a result of the above procedure, an adhesive layer laminate sheet (B) in which an adhesive layer was laminated on both surfaces of the sheet containing ultrafine cellulose fibers was obtained.

[Lamination of Resin Layer]

A laminate was obtained by laminating a resin layer in the same manner as in Example B1 on the above adhesive layer laminate sheet (B).

Example B6

A laminate was obtained by laminating a resin layer in the same manner as in Example B2 on the adhesive layer laminate sheet (B) obtained in Example B5.

Example B7

A laminate was obtained by laminating a resin layer in the same manner as in Example B3 on the adhesive layer laminate sheet (B) obtained in Example B5.

Example B8

[Lamination of Adhesive Layer]

An adhesive composition was obtained by mixing 26 parts by mass of a silsesquioxane resin (Compoceran SQ107, manufactured by Arakawa Chemical Industries, Ltd.), 14 parts by mass of a curing agent (HBSQ202, manufactured by Arakawa Chemical Industries, Ltd.), and 60 parts by mass of isopropyl alcohol. Next, the above adhesive composition was applied onto one surface of the sheet containing ultrafine cellulose fibers obtained in Example B1 with a bar coater, and then heated at 100° C. for 5 hours to volatilize the isopropyl alcohol. Further, 300 mJ/cm$^2$ of UV rays were radiated using a UV conveyor (ECS-4011 GX, manufactured by Eye Graphics Co., Ltd.) to cure the adhesive composition and laminate the adhesive layer. Further, an adhesive layer was laminated on the other surface of the sheet containing ultrafine cellulose fibers by the same procedure. The thickness of the adhesive layer was 5 μm on each side. As a result of the above procedure, an adhesive layer laminate sheet (C) in which an adhesive layer was laminated on both surfaces of the sheet containing ultrafine cellulose fibers was obtained.

[Lamination of Resin Layer]

A laminate was obtained by laminating a resin layer in the same manner as in Example B1 on the above adhesive layer laminate sheet (C).

Example B9

A laminate was obtained by laminating a resin layer in the same manner as in Example B2 on the adhesive layer laminate sheet (B) obtained in Example B8.

Example B10

A laminate was obtained by laminating a resin layer in the same manner as in Example B3 on the adhesive layer laminate sheet (B) obtained in Example B8.

<Evaluation>

The laminates obtained in the Examples and Comparative Examples were measured by the following methods.

[Tensile Modulus]

The tensile modulus at a temperature of 23° C. and a relative humidity of 50% was measured in accordance with JIS P 8113 using a tensile tester (Tensile Tester CODE SE-064, manufactured by L & W Co.).

[Total Light Transmittance]

The total light transmittance was measured in accordance with JIS K 7361: 1997 by using a haze meter ("HM-150", manufactured by Murakami Color Research Laboratory Co., Ltd.).

[Initial Adhesion Properties]

In accordance with JIS K 5400, 100 cross cuts of 1 mm$^2$ were made on the surface of the laminate on the fiber layer side, cellophane tape (manufactured by Nichiban Co., Ltd.) was stuck thereto, a load of 1.5 kg/cm$^2$ was pressed thereon, and the tape was then peeled off in a 90° direction. The adhesion properties between the resin layer and the fiber layer (sheet containing ultrafine cellulose fibers) were evaluated based on the number of peeled squares.

[Adhesion Properties After Acceleration Test]

The laminate was placed in a thermo-hygrostat (KCL-2000, manufactured by Tokyo Science Instrument Co., Ltd.) having a temperature of 85° C. and a relative humidity of 85%, and left to stand for 240 hours. The laminate was then placed in an environment having a temperature of 23° C. and a relative humidity of 50% for 1 hour. Then, in accordance with JIS K 5400, 100 1 mm$^2$ cross cuts were made on the surface of the laminate on the fiber layer side, cellophane tape (manufactured by Nichiban Co., Ltd.) was stuck thereto, a load of 1.5 kg/cm$^2$ was pressed thereon, and the tape was then peeled off in a 90° direction. The adhesion properties between the resin layer and the fiber layer (sheet containing ultrafine cellulose fibers) were evaluated based on the number of peeled squares.

TABLE 3

| | | Example B1 | Example B2 | Example B3 | Example B4 | Comparative Example B1 | Comparative Example B2 | Comparative Example B3 |
|---|---|---|---|---|---|---|---|---|
| Adhesive layer | Main component | Acrylic Resin | Acrylic Resin | Acrylic Resin | Acrylic Resin | None | None | None |
| | Functional group (A) | Acryloyl group | Acryloyl group | Acryloyl group | Acryloyl group | — | — | — |
| | Functional group (B) | Isocyanate group | Isocyanate group | Isocyanate group | Isocyanate group | — | — | — |
| | Resin Layer | Urethane acrylic resin | Acrylic resin (pentaerythritol tetraacrylate) | Acrylic resin (dipentaerythritol hexaacrylate) | Acrylic resin (1,10-decanediol diacrylate) | Urethane acrylic resin | Acrylic resin (pentaerythritol tetraacrylate) | Acrylic resin (dipentaerythritol hexaacrylate) |
| | Fiber layer density (g/cm$^3$) | 1.51 | 1.51 | 1.51 | 1.51 | 1.51 | 1.51 | 1.51 |
| Laminate | Tensile modulus (GPa) | 9.5 | 9.5 | 9.5 | 5.1 | 9.6 | 9.8 | 9.7 |
| | Total Light Transmittance (%) | 91.0 | 91.0 | 91.0 | 85.2 | 91.0 | 91.0 | 91.0 |
| | Initial adhesion properties (number of peeled squares/100 squares) | 0/100 | 0/100 | 0/100 | 0/100 | 9/100 | 100/100 | 100/100 |

TABLE 3-continued

|  |  | | | | | | |
|---|---|---|---|---|---|---|---|
| Adhesion properties after acceleration test (number of peeled squares/ 100 squares) | | 0/100 | 0/100 | 0/100 | 0/100 | 100/100 | 100/100 | 100/100 |

|  |  | Example B5 | Example B6 | Example B7 | Example B8 | Example B9 | Example B10 |
|---|---|---|---|---|---|---|---|
| Adhesive layer | Main component | Polyester resin | Polyester resin | Polyester resin | Silsesquioxane resin | Silsesquioxane resin | Silsesquioxane resin |
|  | Functional group (A) | — | — | — | — | — | — |
|  | Functional group (B) | — | — | — | — | — | — |
|  | Resin Layer | Urethane acrylic resin | Acrylic resin (pentaerythritol tetraacrylate) | Acrylic resin (dipentaerythritol hexaacrylate) | Urethane acrylic resin | Acrylic resin (pentaerythritol tetraacrylate) | Acrylic resin (dipentaerythritol hexaacrylate) |
| | Fiber layer density (g/cm$^3$) | 1.51 | 1.51 | 1.51 | 1.51 | 1.51 | 1.51 |
| Laminate | Tensile modulus (GPa) | 9.4 | 9.4 | 9.5 | 9.2 | 9.2 | 9.2 |
|  | Total Light Transmittance (%) | 90.9 | 90.9 | 90.9 | 91.1 | 91.2 | 91.1 |
|  | Initial adhesion properties (number of peeled squares/ 100 squares) | 5/100 | 65/100 | 80/100 | 0/100 | 25/100 | 35/100 |
|  | Adhesion properties after acceleration test (number of peeled squares/ 100 squares) | 50/100 | 100/100 | 100/100 | 30/100 | 100/100 | 100/100 |

As can be seen from Table 3, in Examples B1 to B4, which contained an acryloyl group as a functional group forming a covalent bond with a (meth)acryloyl group in the adhesive layer and an isocyanate group as a functional group forming a covalent bond with a hydroxyl group, the obtained laminates had a high tensile modulus, a high total light transmittance, good initial adhesion properties, and good adhesion properties after the acceleration test. The reason for this is that strong adhesion properties could be obtained due to the formation of a covalent bond between the isocyanate group of the adhesive layer and the hydroxyl group of the sheet containing ultrafine cellulose fibers and between the acryloyl group of the adhesive layer and the acryloyl group of the resin layer, and due to the formation of a covalent bond also between the isocyanate group of the adhesive layer and the acryloyl group of the adhesive layer.

On the other hand, in Comparative Examples B1 to B3, in which no adhesive layer was laminated, the initial adhesion properties and the adhesion properties after the acceleration test were both poor. In Examples B5 to 7, in which a polyester resin was used as the adhesive layer, and Examples B8 to 10, in which a silsesquioxane resin was used, although the initial adhesion properties were comparatively good, the adhesion properties after the acceleration test were insufficient, and there is a concern in uses where use under harsh conditions is anticipated, problems in practical use may arise. Here, Comparative Example B1 exhibited better adhesion properties than Examples B6 and B7, but when compared with the same resin layer, the initial adhesion properties were better when an adhesive layer is present.

Production Examples

Example B5

Production Example 1 of Inorganic Film Laminate

An inorganic film laminate can be produced according to the following procedure by using the laminates obtained in Examples B1 to B4.

An aluminum oxide film was formed on the laminate with an atomic layer deposition apparatus (SUNALE R-100B, manufactured by Picosun). Trimethylaluminum (TMA) was used as the aluminum raw material, and H$_2$O was used for the oxidation of the TMA. The chamber temperature was set to 150° C., the TMA pulse time was 0.1 second and the purge time was 4 seconds, and the H$_2$O pulse time was 0.1 second and the purge time was 4 seconds. An inorganic film laminate in which an aluminum oxide film having a thickness of 30 nm was laminated on both surfaces of the laminate was obtained by repeating this cycle 405 times.

Example B6

Production Example 2 of Inorganic Film Laminate

An inorganic film laminate was produced according to the following procedure by using the laminates obtained in Examples B1 to B4.

A silicon oxynitride film was formed on the laminate with a plasma CVD apparatus (ICP-CVD roll-to-roll apparatus, manufactured by Selvac Corporation). The laminate was adhered to the upper surface of a carrier film (PET film) with double-sided tape, and placed in a vacuum chamber. The temperature inside the vacuum chamber was set to 50° C., and the inflow gases were silane, ammonia, oxygen, and nitrogen. Film formation was carried out for 45 minutes by generating a plasma discharge to obtain an inorganic film laminate in which a silicon oxynitride film having a thickness of 500 nm was laminated on one surface of the laminate. Further, an inorganic film laminate in which a silicon oxynitride film having a thickness of 500 nm was laminated on both surfaces of the laminate was also obtained by performing film formation on the opposite surface in the same manner as well.

(Second Aspect)

Example C1

[Phosphorylation]

As a needle bleached kraft pulp, a pulp manufactured by Oji Paper Co., Ltd. (sheet-like having a solid content of 93% and a basis weight of 208 g/m$^2$, and a Canadian standard freeness (CSF) measured according to JIS P 8121 after disintegration of 700 ml) was used. A mixed aqueous solution of ammonium dihydrogenphosphate and urea was impregnated into 100 parts by weight of the needle bleached kraft pulp (absolute dry mass), and the resultant mixture was pressed to 45 parts by mass of ammonium dihydrogenphosphate and 200 parts by mass of urea to obtain a chemical-impregnated pulp. The obtained chemical-impregnated pulp was dried and heat-treated for 200 seconds in a hot air dryer at 165° C. to introduce a phosphoric acid group into the cellulose in the pulp. The amount of the phosphoric acid group introduced at this time was 0.98 mmol/g.

The amount of the phosphoric acid group introduced was measured by diluting the cellulose with ion-exchanged water to a content of 0.2% by mass, then treating with an ion-exchange resin, and titrating with alkali. In the treatment with the ion exchange resin, 1/10 by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 8 was divided by the solid content (g) in the slurry to be titrated, and the obtained value was taken as the amount (mmol/g) of the substituent group introduced.

[Alkali Treatment and Washing]

Next, 5000 ml of ion-exchanged water was added to the cellulose into which the phosphoric acid group had been introduced, and the resultant mixture was stirred and washed, and then dehydration was carried out. The dehydrated pulp was diluted with 5000 ml of ion-exchanged water, and a 1 N aqueous solution of sodium hydroxide was gradually added while stirring until the pH was 12 or more and 13 or less to obtain a pulp dispersion. Then, the pulp dispersion was dehydrated and washed with 5000 ml of ion-exchanged water. This dehydration and washing was repeated one more time.

[Machine Treatment]

Ion-exchanged water was added to the pulp obtained after the washing and dehydration to produce a pulp dispersion having a solid concentration of 1.0% by mass. This pulp dispersion was treated using a high-pressure homogenizer (Niro Soavi "Panda Plus 2000") to obtain a cellulose dispersion. In the treatment using the high-pressure homogenizer, the pulp dispersion was passed through the homogenizing chamber five times at an operating pressure of 1200 bar. Further, the cellulose dispersion was treated using a wet atomization apparatus ("Ultimizer", manufactured by Sugino Machine Limited) to obtain an ultrafine cellulose fiber dispersion (A). In the treatment using the wet atomization apparatus, the cellulose dispersion (A) was passed through the treatment chamber five times at a pressure of 245 MPa. The average fiber width of ultrafine cellulose fibers contained in the ultrafine cellulose fiber dispersion (A) was 4 nm.

[Formation of Fiber Layer]

The ultrafine cellulose fiber dispersion (A) was adjusted so as to have a solid concentration of 0.5% by mass. Then, 20 parts by mass of a 0.5% by mass aqueous solution of polyethylene oxide (PEO-18, manufactured by Sumitomo Seika Chemicals Co., Ltd.) was added to 100 parts by mass of the ultrafine cellulose fiber dispersion (A) to obtain an ultrafine cellulose fiber dispersion (B). Next, the ultrafine cellulose fiber dispersion (B) was weighed so that the finished basis weight of the layer containing cellulose fibers (layer formed from the solid content of the ultrafine cellulose fiber dispersion (B)) was 50 g/m$^2$, applied onto a commercially available acrylic plate, and dried with a thermo-hygrostat at 35° C. and a relative humidity of 15%. A metal frame for damming (metal frame having an inner dimension of 180 mm×180 mm) was arranged on the acrylic plate so as to have a predetermined basis weight. As a result of the above procedure, a fiber layer (layer containing cellulose fibers) was obtained.

[Lamination of Adhesive Layer]

A resin composition A was obtained by mixing 100 parts by mass of urethane acrylate having a urethane/acryl ratio of 2/8 (Acrit 8UA-347A, manufactured by Taisei Fine Chemical Co., Ltd.,) and 9.7 parts by mass of an isocyanurate compound (Duranate TPA-100, manufactured by Asahi Kasei Chemicals Corporation). Next, the resin composition A was applied on one surface of the fiber layer with a bar coater and dried for 1 hour with a constant temperature drier at 100° C. As a result of the above procedure, a laminated sheet A in which an adhesive layer was laminated on one surface of the fiber layer was obtained.

[Formation of Resin Layer]

A resin composition B was obtained by mixing 39 parts by mass of epoxy urethane acrylate (Beamset 371, manufactured by Arakawa Chemical Industries, Ltd.), 21 parts by mass of methyl ethyl ketone, and 2 parts by mass of a radical polymerization initiator (Irgacure 184, manufactured by BASF Co.). Then, the resin composition B was applied on one surface of a polycarbonate film (Panlite PC-2151: thickness 300 μm, manufactured by Teijin Limited) with a bar coater and dried for 3 minutes. Next, 500 mJ/cm$^2$ of UV rays were radiated using a UV conveyor (ECS-4011 GX, manufactured by Eye Graphics Co., Ltd.) to cure the resin composition B. As a result of the above procedure, a resin layer having an epoxy urethane acrylate resin layer was formed on the polycarbonate film.

[Lamination of Laminated Sheet A and Resin Layer]

The above laminated sheet A and the resin layer were each cut into 100 mm squares. Next, the squares were stacked so that the surface on which the adhesive layer of the laminated sheet A was laminated and the epoxy urethane acrylate resin layer surface of the resin layer were in contact, and the resultant laminate was sandwiched between stainless steel plates having a thickness of 2 mm and a dimension of 200 mm×200 mm. Here, as the stainless steel plates, plates having a release agent (Tef-Release, manufactured by Audec Corporation) applied onto the sandwiching surface were used. Then, the laminate was inserted into a mini-test press (MP-WCH, manufactured by Toyo Seiki Kogyo Co., Ltd.) set to room temperature, and heated to 180° C. over 3 minutes under a pressing pressure of 1 MPa. After holding for 30 seconds in this state, the laminate was cooled to 30° C. over 5 minutes. As a result of the above procedure, a laminate in which a fiber layer was laminated on a resin layer with an adhesive layer interposed therebetween was obtained.

Example C2

A laminate in which a fiber layer was laminated on a resin layer with an adhesive layer interposed therebetween was obtained in the same manner as in Example C1, except that when laminating the laminated sheet A and the resin layer, the pressing pressure was changed from 1 MPa to 5 MPa.

Example C3

A laminate in which a fiber layer was laminated on a resin layer with an adhesive layer interposed therebetween was obtained in the same manner as in Example C1, except that when laminating the adhesive layer of Example C1, urethane acrylate having a urethane/acryl ratio of 4/6 (Acrit 8UA-540, manufactured by Taisei Fine Chemical Co., Ltd.) was used in place of the urethane acrylate having a urethane/acryl ratio of 2/8.

Example C4

A laminate in which a fiber layer was laminated on a resin layer with an adhesive layer interposed therebetween was obtained in the same manner as in Example C3, except that when laminating the laminated sheet A and the resin layer, the pressing pressure was changed from 1 MPa to 5 MPa.

Example C5

A laminate in which a fiber layer was laminated on a resin layer with an adhesive layer interposed therebetween was obtained in the same manner as in Example C2, except that a coextruded film (Iupilon MR-DF02U: thickness 300 μm) formed by coextruding a polycarbonate resin and an acrylic resin was used in place of the resin layer having an epoxy urethane acrylate resin layer on a polycarbonate film. When laminating the laminated sheet A and the resin layer, the laminated sheet A and the resin layer were stacked so that the surface on the adhesive layer side of the laminated sheet A was in contact with the surface on the acrylic resin side of the coextruded film.

Comparative Example C1

A laminate in which a fiber layer was laminated on a resin layer without an adhesive layer interposed therebetween was obtained in the same manner as in Example C1, except that lamination of an adhesive layer was not carried out, and application of the resin composition B was not carried out.

Reference Example C6

A laminate in which a fiber layer was laminated on a resin layer with an adhesive layer interposed therebetween was obtained in the same manner as in Example C2, except that when laminating the adhesive layer, the resin composition A was obtained by mixing 100 parts by mass of an acrylic resin graft-polymerized with an acryloyl group (Acrit 8KX-012C, manufactured by Taisei Fine Chemical Co., Ltd.), 38 parts by mass of an isocyanate compound (TPA- 100 manufactured by Asahi Kasei Chemicals Corporation), and 2 parts by mass of a radical polymerization initiator (Irgacure 184, manufactured by BASF Co.)

<Measurements>

The laminates obtained in the Examples and Comparative Examples were evaluated by the following methods.

[Thickness of Laminate]

The thickness of the laminate was measured using a stylus thickness gauge (Millitron 1202 D, manufactured by Mahr).

[Thickness of Fiber Layer (layer containing cellulose fibers)]

Before lamination, the thickness of the fiber layer was measured with a stylus thickness gauge (manufactured by Mahr, Millitron 1202 D) and taken as the thickness of the fiber layer in the laminate.

[Thickness of Adhesive Layer]

The thickness of the adhesive layer in the laminate was calculated by, before laminating the laminated sheet A and the resin layer, measuring the thickness of the laminated sheet A was measured with a stylus thickness gauge (Millitron 1202 D, manufactured by Mahr), and then subtracting the thickness of the fiber layer from the thickness of the laminated sheet A.

[Thickness of Resin Layer]

The thickness of the resin layer in the laminate was calculated by subtracting the thickness of the fiber layer and the thickness of the adhesive layer from the thickness of the laminate.

[Density of Fiber Layer (layer containing cellulose fibers)]

The density of the fiber layer was obtained by dividing the basis weight (50 g/m$^2$) of the fiber layer was divided by the thickness of the fiber layer.

<Evaluation>

The laminates obtained in the Examples and Comparative Examples were evaluated by the following methods.

[Adhesion Properties Between Fiber Layer and Resin Layer]

In accordance with JIS K 5400, 100 1 mm$^2$ cross cuts were made on the fiber layer of the laminates of the Examples and Comparative Examples. Next, cellophane tape (manufactured by Nichiban Co., Ltd.) was stuck thereto, a load of 1.5 kg/cm$^2$ was pressed thereon, and the tape was then peeled off in a 90° direction. The adhesion properties between the fiber layer and the resin layer were evaluated based on the number of peeled squares.

[Adhesion Properties of Fiber Layer and Resin Layer When Bending Stress Applied]

The laminates of the Examples and Comparative Examples were made to fracture by bending by 180° with the fiber layer on the inner side. The fracture behavior of the fractured laminates was observed and evaluated according to the following evaluation criteria, which were used as an index of the adhesion properties of the fiber layer and the resin layer when bending stress is applied.

⊙: No sites causing peeling are observed, and the laminate structure is maintained even after fracture.

○: Although slight peeling is observed at sites where fracture occurred, the laminate structure is maintained.

×: Peeling occurs and the laminate structure is not maintained.

<Total Light Transmittance of Laminates>

The total light transmittance of the laminates was evaluated in accordance with JIS K 7361 by using a haze meter ("HM-150", manufactured by Murakami Color Research Laboratory Co., Ltd.).

<Haze of Laminates>

The haze of the laminates was evaluated in accordance with JIS K 7136 by using a haze meter ("HM-150", manufactured by Murakami Color Research Laboratory Co., Ltd.).

parency was obtained. The adhesion properties were also good when a bending stress was applied. On the other hand, in Comparative Example C1, in which an adhesive layer was not formed, although transparency was maintained, the adhesion properties between the fiber layer and the resin layer were poor, problems in practical use may arise. Further, in Reference Example C6, in which a urethane acrylate resin layer was not formed as the adhesive layer, the results showed that the adhesion properties between the fiber layer

TABLE 4

|  |  |  | Example C1 | Example C2 | Example C3 |
|---|---|---|---|---|---|
| Fiber Layer | Ultrafine cellulose fiber | [parts by mass] | 100 | 100 | 100 |
|  | Polyethylene oxide | [parts by mass] | 20 | 20 | 20 |
| Adhesive layer type |  | [—] | Urethane acrylate resin (urethane/acryl = 2/8) | Urethane acrylate resin (urethane/acryl = 2/8) | Urethane acrylate resin (urethane/acryl = 4/6) |
| Resin Layer | First layer | [—] | Epoxy acrylate resin | Epoxy acrylate resin | Epoxy acrylate resin |
|  | Second layer | [—] | Polycarbonate film | Polycarbonate film | Polycarbonate film |
| Laminate thickness |  | [μm] | 344.0 | 343.9 | 344.0 |
| Fiber layer thickness |  | [μm] | 33.8 | 33.4 | 33.5 |
| Adhesive layer thickness |  | [μm] | 5.1 | 5.5 | 5.3 |
| Resin layer thickness |  | [μm] | 305.1 | 305.0 | 305.2 |
| Fiber layer density |  | [g/cm$^3$] | 1.48 | 1.50 | 1.49 |
| Adhesion properties of resin layer to fiber layer (number of peeled squares) |  | [—] | 45/100 | 0/100 | 0/100 |
| Adhesion properties of resin layer to fiber layer (when bending stress is applied) |  | [—] | ○ | ⊙ | ⊙ |
| Total light transmittance of laminate |  | [%] | 88.1 | 88.1 | 88.2 |
| Haze of laminate |  | [%] | 3.5 | 3.4 | 3.2 |

|  |  | Example C4 | Example C5 | Comparative Example C1 | Reference Example C6 |
|---|---|---|---|---|---|
| Fiber Layer | Ultrafine cellulose fiber | 100 | 100 | 100 | 100 |
|  | Polyethylene oxide | 20 | 20 | 20 | 20 |
| Adhesive layer type |  | Urethane acrylate resin (urethane/acryl = 4/6) | Urethane acrylate resin (urethane/acryl = 2/8) | None | Acrylic resin graft-polymerized with acryloyl group |
| Resin Layer | First layer | Epoxy acrylate resin | Acrylic film (alkyl(meth)acrylate resin) | — | Epoxy acrylate resin |
|  | Second layer | Polycarbonate film | Polycarbonate film | Polycarbonate film | Polycarbonate film |
| Laminate thickness |  | 344.1 | 344.2 | 333.7 | 338.1 |
| Fiber layer thickness |  | 33.6 | 33.3 | 33.7 | 33.0 |
| Adhesive layer thickness |  | 5.1 | 5.4 | None | 5.5 |
| Resin layer thickness |  | 305.4 | 305.5 | 300.0 | 305.1 |
| Fiber layer density |  | 1.49 | 1.50 | 1.48 | 1.52 |
| Adhesion properties of resin layer to fiber layer (number of peeled squares) |  | 0/100 | 0/100 | 100/100 | 100/100 |
| Adhesion properties of resin layer to fiber layer (when bending stress is applied) |  | ⊙ | ⊙ | X | X |
| Total light transmittance of laminate |  | 88.4 | 88.4 | 88.1 | 88.1 |
| Haze of laminate |  | 2.9 | 2.9 | 3.6 | 3.7 |

As is clear from Table 1, in the Examples in which a urethane acrylate resin layer was formed as the adhesive layer, a laminate having good adhesion properties between the fiber layer and the resin layer while maintaining transparency was obtained. The adhesion properties were also good when a bending stress was applied. On the other hand, and the resin layer were poor, but when measured under the same conditions as in Examples A1 to A7, it was confirmed that Comparative Example C1 was Fair or less and Reference Example C6 was Good or more.

Example C7

Production Example 1 of Multilayer Laminate

A multilayer laminate in which a resin layer was laminated on both sides of the fiber layer was obtained by the following procedure.

Two laminates obtained in any of Examples C1 to C5 were prepared, and water was applied onto the fiber layer of each laminate with a bar coater. Next, the fiber layer surfaces of the two laminates were adhered together, and then pressed together by applying a rubber roller from the resin layer side of one of the laminates. Further, the adhered laminates were dried at 100° C. for 1 hour in a constant temperature drier to obtain a multilayer laminate in which a resin layer was laminated on both sides of the fiber layer.

Example C8

Production Example 2 of Multilayer Laminate

Two laminates obtained in any of Examples C1 to C5 were prepared, and a UV-curable acrylic adhesive (Z-587, manufactured by Aica Kogyo Co., Ltd.) was applied onto the fiber layer of each laminate with a bar coater. Next, the fiber layer surfaces of the two laminates were adhered together, and then pressed together by applying a rubber roller from the resin layer side of one of the laminates. Further, 500 mJ/cm$^2$ of UV rays were radiated from the resin layer side of the adhered laminates three times using a UV conveyor (ECS-4011 GX, manufactured by Eye Graphics Co., Ltd.) to cure the UV-curable acrylic adhesive, whereby a multilayer laminate in which a resin layer was laminated on both sides of the fiber layer was obtained.

Example C9

Production Example 3 of Multilayer Laminate

A multilayer laminate in which a resin layer was laminated on both sides of the fiber layer was obtained by the following procedure by using laminates obtained in any of Examples C1 to C5.

First, a resin composition was obtained by mixing 100 parts by mass of an acrylic resin graft-polymerized with an acryloyl group (Acrit 8KX-012C, manufactured by Taisei Fine Chemical Co., Ltd.) and 38 parts by mass of a polyisocyanate compound (TPA-100, manufactured by Asahi Kasei Chemicals Corporation). Next, the above resin composition was applied on the layer containing cellulose fibers of a laminate with a bar coater. Further, heating was carried out at 100° C. for 1 hour for curing, whereby a multilayer laminate in which a resin layer was laminated on both sides of the layer containing cellulose fibers was obtained.

Example C10

Production Example 1 of Inorganic Film Laminate

An aluminum oxide film was formed on a laminate obtained in any of Examples C1 to C5 or a multilayer laminate obtained in any of Examples C6 to C8 with an atomic layer deposition apparatus (SUNALE R-100B, manufactured by Picosun). Trimethylaluminum (TMA) was used as the aluminum raw material, and H$_2$O was used for the oxidation of the TMA. The chamber temperature was set to 150° C., the TMA pulse time was 0.1 second and the purge time was 4 seconds, and the H$_2$O pulse time was 0.1 second and the purge time was 4 seconds. An inorganic film laminate in which an aluminum oxide film having a thickness of 30 nm as laminated on both surfaces of the laminate or multilayer laminate was obtained by repeating this cycle 405 times.

Example C11

Production Example 2 of Inorganic Film Laminate

A silicon oxynitride film as formed on a laminate obtained in any of Examples C1 to C5 or a multilayer laminate obtained in any of Examples C6 to C8 by a plasma CVD apparatus (ICP-CVD roll-to-roll apparatus, manufactured by Selvac Corporation). Specifically, the laminate or multilayer laminate was adhered to the upper surface of a carrier film (PET film) with double-sided tape, and placed in a vacuum chamber. The temperature inside the vacuum chamber was set to 50° C., and the inflow gases were silane, ammonia, oxygen, and nitrogen. Film formation was carried out for 45 minutes by generating a plasma discharge to obtain an inorganic film laminate in which a silicon oxynitride film having a thickness of 500 nm was laminated on one surface of the laminate or multilayer laminate. Further, an inorganic film laminate in which a silicon oxynitride film having a thickness of 500 nm was laminated on both surfaces of the laminate or multilayer laminate was also obtained by performing film formation on the opposite surface in the same manner as well.

REFERENCE SIGNS LIST

1 RESIN LAYER
2 ADHESIVE LAYER
3 FIBER LAYER
4 HEAT RESISTANT TAPE
5 FLAT MOLD
5a INLET
6 LAMINATED MATERIAL
7 RESIN SHEET
10A-10D LAMINATE
11 FIRST LAYER
12 SECOND LAYER
100 LAMINATE
110 GLASS PLATE
120 SILICONE RUBBER
130 ADHESIVE LAYER LAMINATED SHEET (A)
150 OPENING
200 GLASS CELL FOR MOLDING RESIN LAYER

The invention claimed is:
1. A laminate comprising:
a fiber layer formed of cellulose fibers having a fiber width of 1000 nm or less;
a resin layer; and
an adhesive layer directly laminated between the fiber layer and the resin layer,
wherein the fiber layer comprises hydrophilic macromolecules having a molecular weight of 50,000 or more and 8,000,000 or less,
the resin layer comprises a polymer of acrylic monomers,
the adhesive layer comprises a functional group (A), which forms a covalent bond with a (meth)acryloyl group included in the resin layer, and at least one selected from a functional group (B) and a hydrolyzed group of the functional group (B), which forms a covalent bond with a hydroxy group of ultrafine cellulose fibers included in the fiber layer, and the thickness of the fiber layer is 30 μm or more and 500 μm or less.

2. The laminate according to claim 1, wherein the functional group (A) is at least two selected from a (meth)acryloyl group and a group represented by $H_2C=CR^2$—CH(—OH)—, wherein $R^2$ represents a hydrogen atom or a methyl group.

3. The laminate according to claim 1, wherein the functional group (B) is at least one selected from an isocyanate group, a carbodiimide group, an epoxy group, an alkoxysilyl group, a silanol group and an oxazoline group.

4. The laminate according to claim 1, wherein the adhesive layer comprises a polymer having the functional group (A) and a compound having the functional group (B).

5. The laminate according to claim 1, wherein the adhesive layer further comprises a polymerization initiator.

6. The laminate according to claim 1, wherein the resin layer further comprises a polymerization initiator.

7. The laminate according to claim 1, produced by applying a composition comprising a resin having the functional group (A) and a hydroxy group, as well as a compound having at least two functional groups (B) onto at least one surface of the fiber layer, to form the adhesive layer, and applying a resin composition comprising acrylic monomers onto the adhesive layer to form the resin layer.

8. The laminate according to claim 1, wherein the adhesive layer comprises a urethane (meth)acrylate resin.

9. The laminate according to claim 8, wherein the resin layer comprises at least one selected from a polycarbonate resin and an acrylic resin.

10. The laminate according to claim 8, wherein the resin layer has a first layer arranged on a side of the adhesive layer and a second layer arranged on one side of the first layer, which is on the opposite side of the adhesive layer; and
wherein the first layer comprises an acrylic resin and the second layer comprises a polycarbonate resin.

11. The laminate according to claim 10, wherein the first layer comprises an alkyl (meth)acrylate resin.

12. The laminate according to claim 10, wherein the first layer comprises an epoxy (meth)acrylate resin.

13. The laminate according to claim 10, wherein the resin layer is a coextruded film having the first layer and the second layer.

14. The laminate according to claim 8, wherein the urethane (meth)acrylate resin comprised in the adhesive layer comprises urethane units and acrylic units, and when the content of the urethane units (% by mass) is defined as P and the content of the acrylic units (% by mass) is defined as Q, P/Q is 0.1 or more and 0.9 or less.

15. The laminate according to claim 1, wherein the cellulose fibers have phosphoric acid groups or substituents derived from the phosphoric acid group.

16. The laminate according to claim 1, wherein the functional group (A) is at least one selected from a (meth)acryloyl group and a group represented by $H_2C=CR^2$—CH(—OH)—, wherein $R^2$ represents a hydrogen atom or a methyl group, and
the functional group (B) is at least one selected from an isocyanate group, a carbodiimide group, an epoxy group, an alkoxysilyl group, a silanol group and an oxazoline group.

* * * * *